(12) United States Patent
Hagita et al.

(10) Patent No.: US 12,592,008 B2
(45) Date of Patent: Mar. 31, 2026

(54) INFORMATION ANALYSIS SYSTEM, INFORMATION ANALYSIS METHOD, AND NON-TRANSITORY RECORDING MEDIUM

(71) Applicants: Kentaroh Hagita, Kanagawa (JP); Takuya Nagano, Kanagawa (JP); Yuuki Suzuki, Kanagawa (JP); Ryo Saito, Kanagawa (JP); Takashi Otsuki, Hyogo (JP); Shigeru Ouchida, Tokyo (JP); Kazuma Izumiya, Miyagi (JP)

(72) Inventors: Kentaroh Hagita, Kanagawa (JP); Takuya Nagano, Kanagawa (JP); Yuuki Suzuki, Kanagawa (JP); Ryo Saito, Kanagawa (JP); Takashi Otsuki, Hyogo (JP); Shigeru Ouchida, Tokyo (JP); Kazuma Izumiya, Miyagi (JP)

(73) Assignee: Ricoh Company, Ltd., Tokyo (JP)

( * ) Notice: Subject to any disclaimer, the term of this patent is extended or adjusted under 35 U.S.C. 154(b) by 194 days.

(21) Appl. No.: 18/511,177

(22) Filed: Nov. 16, 2023

(65) Prior Publication Data

US 2024/0177380 A1 May 30, 2024

(30) Foreign Application Priority Data

Nov. 30, 2022 (JP) ................................. 2022-191494
May 26, 2023 (JP) ................................. 2023-086826

(51) Int. Cl.
G06T 11/20 (2006.01)
G06T 11/60 (2006.01)
(Continued)

(52) U.S. Cl.
CPC ............ G06T 11/206 (2013.01); G06T 11/60 (2013.01); G06V 40/174 (2022.01); G10L 15/08 (2013.01); H04N 7/15 (2013.01)

(58) Field of Classification Search
None
See application file for complete search history.

(56) References Cited

U.S. PATENT DOCUMENTS

2014/0314310 A1* 10/2014 Movellan ............... G06N 20/00
382/155
2019/0130917 A1* 5/2019 Pogorelik ............. G06F 40/169
(Continued)

FOREIGN PATENT DOCUMENTS

JP 2004-206363 A 7/2004
JP 2021-022909 A 2/2021
(Continued)

OTHER PUBLICATIONS

Kazuhiro Otsuka, et al., "Analyzing Multifunctionality of Head Movements in Face-to-Face Conversations Using Deep Convolutional Neural Networks" IEEE Access, vol. 8, 2020, p. 217169-217195.

(Continued)

*Primary Examiner* — Jason A Pringle-Parker
(74) *Attorney, Agent, or Firm* — IPUSA, PLLC

(57) ABSTRACT

An information analysis system includes a communication terminal including first circuitry and an information analysis apparatus including second circuitry. The first circuitry acquires image information and voice information of a plurality of participants participating in an online event and transmits, to the information analysis apparatus, the image information and the voice information. The second circuitry performs analysis on a state of the plurality of participants based on the image information and the voice information transmitted from the communication terminal, and generates, based on the state of the plurality of participants, a state notification to be displayed on the communication terminal.

12 Claims, 38 Drawing Sheets

(51) Int. Cl.
    *G06V 40/16*    (2022.01)
    *G10L 15/08*    (2006.01)
    *H04N 7/15*    (2006.01)

(56)           References Cited

U.S. PATENT DOCUMENTS

| | | | |
|---|---|---|---|
| 2021/0264909 A1* | 8/2021 | Reece | G06V 10/774 |
| 2021/0264921 A1* | 8/2021 | Reece | G06F 40/35 |
| 2023/0289731 A1 | 9/2023 | Saito et al. | |
| 2023/0336632 A1* | 10/2023 | Akutsu | G06F 13/00 |

FOREIGN PATENT DOCUMENTS

| | | |
|---|---|---|
| JP | 2022-028539 A | 2/2022 |
| WO | 2018/174088 A1 | 9/2018 |

OTHER PUBLICATIONS

Shunsuke Ota, et al., "Nodding detection system based on head motion and voice rhythm" Journal of Advanced Mechanical Design, Systems, and Manufacturing, vol. 15, No. 1, 2021, The Japan Society of Mechanical Engineers, p. 1-9.

* cited by examiner

INFORMATION ANALYSIS SYSTEM 1

INFORMATION ANALYSIS APPARATUS 5

COMMUNICATION NETWORK 100

COMMUNICATION TERMINAL 3L

LEADER

COMMUNICATION TERMINAL 3A

PARTICIPANT A

COMMUNICATION TERMINAL 3B

PARTICIPANT B

COMMUNICATION TERMINAL 3C

PARTICIPANT C

ONLINE EVENT SPACE

FIG. 7

| USER ID:<br>(E-MAIL ADDRESS) | GROUP (TEAM) NAME | LEADER FLAG | USER NAME |
|---|---|---|---|
| kentaroh.r@ricoh.ex.com | TeamA | TRUE | KENTAROH RICOH |
| takuya.r@ricoh.ex.com | TeamA | FALSE | TAKUYA RICOH |
| tomonori.r@ricoh.ex.com | TeamA | FALSE | TOMONORI RICOH |
| ryo.r@ricoh.ex.com | TeamA | FALSE | RYO RICOH |
| ... | ... | ... | ... |

FIG. 8

| USER ID: (E-MAIL ADDRESS) | GROUP (TEAM) NAME | DATE AND TIME | EVENT CONTENT | PARTIC-IPATION FLAG | REPORT GEN-ERATION FLAG | UNDE-TECTED TIME IN IMAGE [SEC] | NOD TIME [SEC] | SMILE TIME [SEC] | UTTE-RANCE TIME [SEC] | THE NUMBER OF EXPRES-SIONS OF APPRECI-ATION | TOTAL TIME [SEC] |
|---|---|---|---|---|---|---|---|---|---|---|---|
| kentarohr @ricoh.ex.com | TeamA | 2022/2/3 09:15:10 – 09:29:48 | SELF-IN-TRODUC-TION BY MEMBERS | TRUE | TRUE | 1.07 | 154.9 | 40.7 | 30.5 | 0 | 562.3 |
| takuya.r @ricoh.ex.com | TeamA | 2022/2/4 09:21:40 – 09:26:48 | WEEKLY WORK PROGRESS | TRUE | TRUE | 5.7 | 42.2 | 118.7 | 31.2 | 0 | 562.0 |
| tomonori.r @ricoh.ex.com | TeamA | 2022/2/18 09:21:40 – 09:26:48 | WEEKLY WORK PROGRESS | TRUE | TRUE | 3.3 | 8.2 | 32.5 | 38.5 | 2 | 560.7 |
| ryo.r @ricoh.ex.com | TeamA | 2022/2/25 09:21:40 – 09:26:48 | WEEKLY WORK PROGRESS | TRUE | TRUE | 0.7 | 64.9 | 391.3 | 82.0 | 7 | 560.0 |
| ⋮ | ⋮ | ⋮ | ⋮ | ⋮ | ⋮ | ⋮ | ⋮ | ⋮ | ⋮ | ⋮ | ⋮ |

FIG. 9

USER ID: kentaroh.r@ricoh.ex.com (PARTICIPANT A)

| DATE AND TIME | EVENT CONTENT | NOD TIME [SEC] | SMILE TIME [SEC] | INDIVIDUAL VITALITY LEVEL |
|---|---|---|---|---|
| 2022/3/11 09:25:40 ~ 09:30:50 | WEEKLY WORK PROGRESS | 5.7 | 12 | 15 |
| 2022/3/22 09:15:30 ~ 09:25:21 | NOTIFICATION OF PROTOTYPE PRESENTATION ORDER | 2 | 4 | 8 |
| 2022/3/27 09:20:10 ~ 09:30:55 | ANNOUNCEMENT OF PERSONNEL RELOCATION | 1 | 0 | 6 |
| ... | ... | ... | ... | ... |

FIG. 10

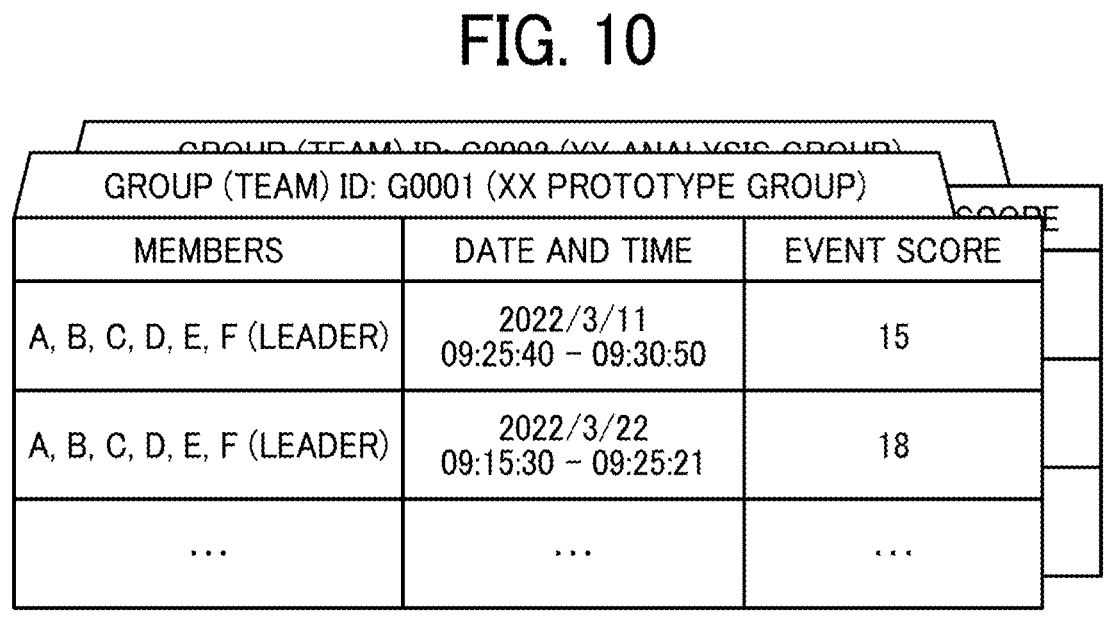

GROUP (TEAM) ID: G0002 (XX ANALYSIS GROUP)

| GROUP (TEAM) ID: G0001 (XX PROTOTYPE GROUP) | | | SCORE |
|---|---|---|---|
| MEMBERS | DATE AND TIME | EVENT SCORE | |
| A, B, C, D, E, F (LEADER) | 2022/3/11 09:25:40 – 09:30:50 | 15 | |
| A, B, C, D, E, F (LEADER) | 2022/3/22 09:15:30 – 09:25:21 | 18 | |
| ... | ... | ... | |

FIG. 11

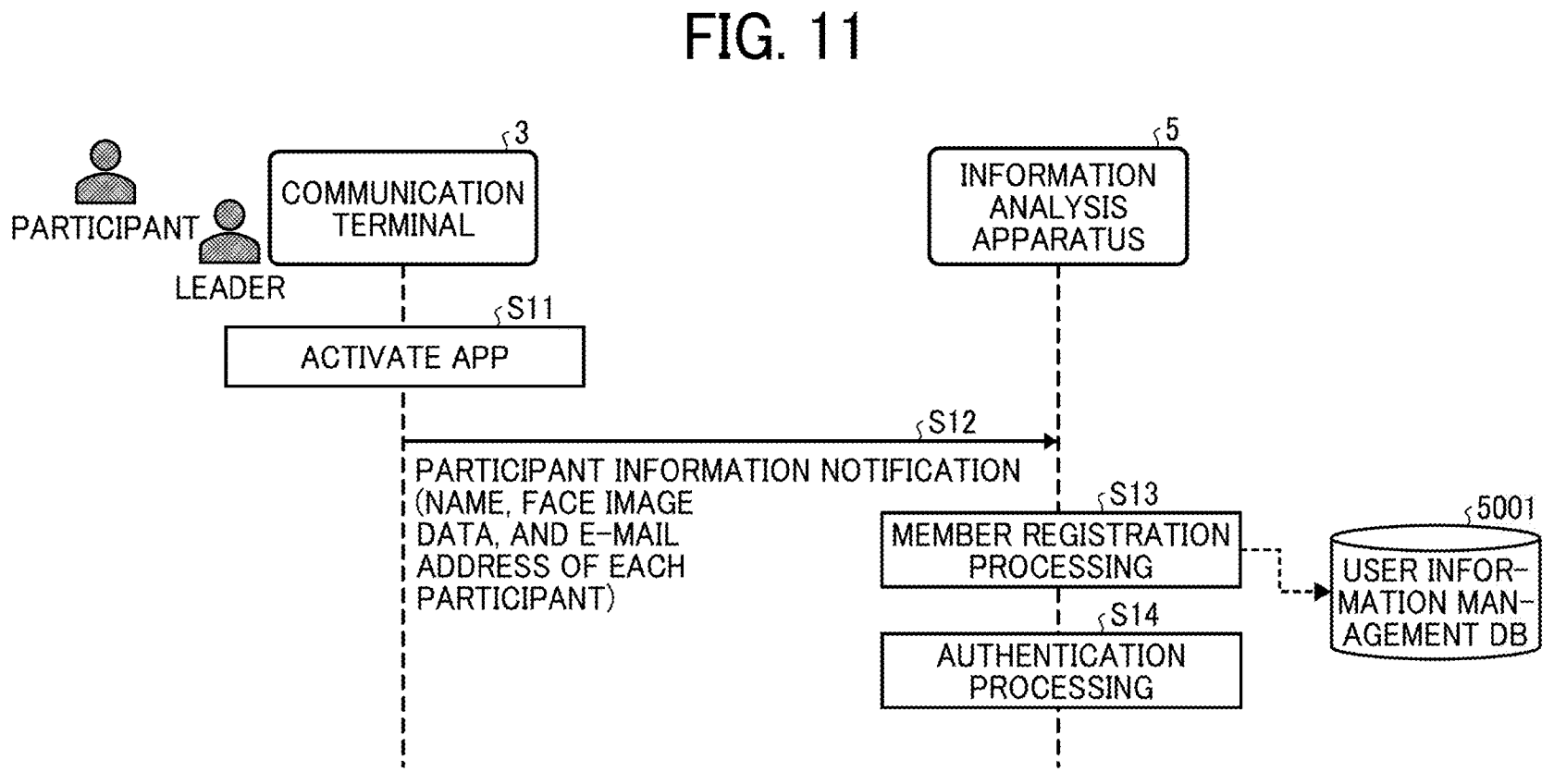

COMMUNICATION TERMINAL ~3

INFORMATION ANALYSIS APPARATUS ~5

USER INFORMATION MANAGEMENT DB ~5001

PARTICIPANT

LEADER

ACTIVATE APP ~S11

PARTICIPANT INFORMATION NOTIFICATION (NAME, FACE IMAGE DATA, AND E-MAIL ADDRESS OF EACH PARTICIPANT) ~S12

MEMBER REGISTRATION PROCESSING ~S13

AUTHENTICATION PROCESSING ~S14

Morning Meeting Score for March 11th (Fri)

80 / 100

Comments

Similar to yesterday, it was a very good morning meeting.

---

<Details>    20 points in total for each

Score for Nods    20
\*The ratio of members who nod more than four times per minute

Score for Smiles    20
\*The ratio of members who smiles more than two times in the meeting

Score for Speakers    15
\*The ratio of speakers in a meeting (higher is better)

Score for Utterance Ratio    10
\*The speaking ratio of facilitator (lower is better)

Score for Appreciation    15
\*The number of expressions of appreciation

FIG. 16

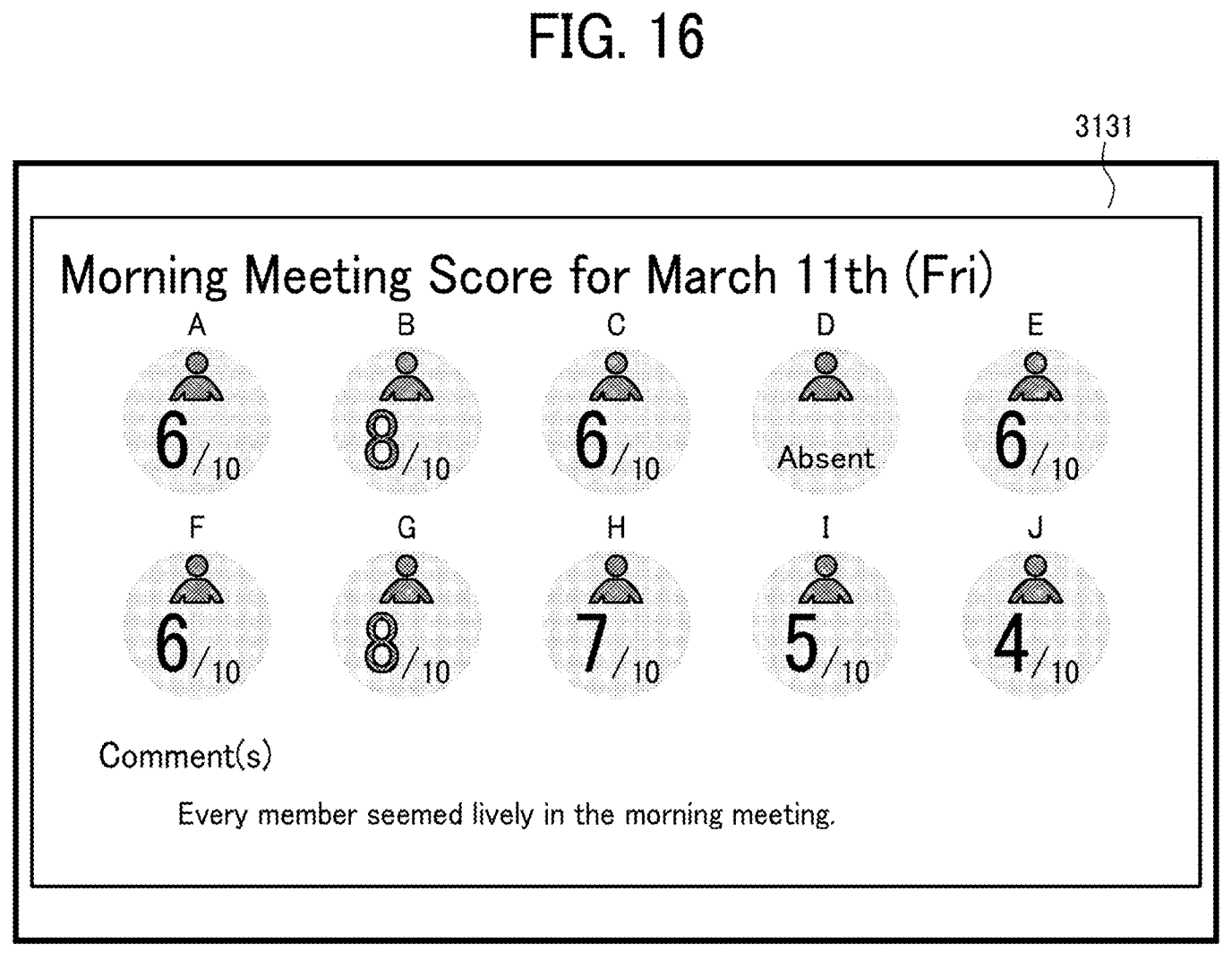

Morning Meeting Score for March 11th (Fri)

3131

A  6/10
B  8/10
C  6/10
D  Absent
E  6/10
F  6/10
G  8/10
H  7/10
I  5/10
J  4/10

Comment(s)

Every member seemed lively in the morning meeting.

|  | 2022/3/4 | 2022/3/8 | 2022/3/9 | 2022/3/10 | 2022/3/11 |
|---|---|---|---|---|---|
| Morning Meeting Score | 70 | 60 | 85 | 80 | 80 |
| Score for Nods | 20 | 15 | 20 | 20 | 20 |
| Score for Smiles | 20 | 20 | 20 | 20 | 20 |
| Score for Speakers | 20 | 10 | 20 | 15 | 15 |
| Score for Utterance Ratio | 5 | 15 | 15 | 10 | 10 |
| Score for Appreciation | 5 | 0 | 10 | 15 | 15 |

Records of Morning Meeting Scores

3171

Utterance Ratio for March 11th (Fri)

*The utterance ratio of the facilitator (lower is better)

Utterance Time for March 11th

Utterance time [sec]
700 600 500 400 300 200 100 0
A B C D E F G H I J

Today's Score for Utterance Ratio

10 /20

Members other than the facilitator also spoke out.

Comparison to Past

3/4 ~ 3/11 Comparison for Utterance Ratio

□ 2022/3/4
□ 2022/3/8
□ 2022/3/9
□ 2022/3/10
□ 2022/3/11

Utterance time [sec]
700 600 500 400 300 200 100 0
A B C D E F G H I J

The facilitator's utterance ratio is almost the same as before.

Speakers for March 11th (Fri)

*The ratio of speakers in the meeting (higher is better)

✓ : Spoke  /  Blank: Did Not Speak

| A | B | C | D | E | F | G | H | I | J |
|---|---|---|---|---|---|---|---|---|---|
| ✓ | ✓ | ✓ | Ab-sent | ✓ | ✓ | ✓ | ✓ | ✓ | ✓ |

Today's Score for Speakers

 15 /20

It's excellent.
Almost all members spoke in the meeting.

Comparison to Past

|  | A | B | C | D | E | F | G | H | I | J |
|---|---|---|---|---|---|---|---|---|---|---|
| 3/4 | ✓ | ✓ | Absent | ✓ | ✓ | ✓ | Absent | ✓ | Absent | ✓ |
| 3/8 | ✓ | ✓ | Absent | ✓ | ✓ | ✓ | ✓ | ✓ | ✓ | ✓ |
| 3/9 | ✓ | Absent | ✓ | ✓ | ✓ | ✓ | ✓ | ✓ | ✓ | ✓ |
| 3/10 | ✓ | ✓ | Absent | Absent | ✓ | ✓ | ✓ | ✓ | ✓ | ✓ |
| 3/11 | ✓ | ✓ | ✓ | Absent | ✓ | ✓ | ✓ | ✓ | ✓ | ✓ |

The members spoke out almost the same degree as before.

EVENT ID: E0002(DETAILS OF EVENT: WEEKLY WORK PROGRESS)

EVENT ID: E0001(DETAILS OF EVENT: WEEKLY WORK PROGRESS)

| USER ID:<br>(E-MAIL ADDRESS) | GROUP<br>(TEAM)<br>NAME | USER NAME | PERMISSION FOR | | PERMISSION FOR | |
|---|---|---|---|---|---|---|
| | | | PERMISSION FOR<br>DATA ACQUISITION | NOTIFICATION<br>RECEPTION | PERMISSION FOR<br>DATA DISCLOSURE | |
| takuya.r@ricoh.ex.com | TeamA | TAKUYA RICOH | PERMITTED (ON) | RECEIVE<br>NOTIFICATION (ON) | PERMITTED (ON) | |
| tomonori.r@ricoh.ex.com | TeamA | TOMONORI RICOH | NOT PERMITTED<br>(OFF) | – (OFF) | – (OFF) | |
| ryo.r@ricoh.ex.com | TeamA | RYO RICOH | PERMITTED (ON) | RECEIVE<br>NOTIFICATION (ON) | PERMITTED (ON) | |
| ... | ... | ... | ... | ... | ... | |

Figure 31:
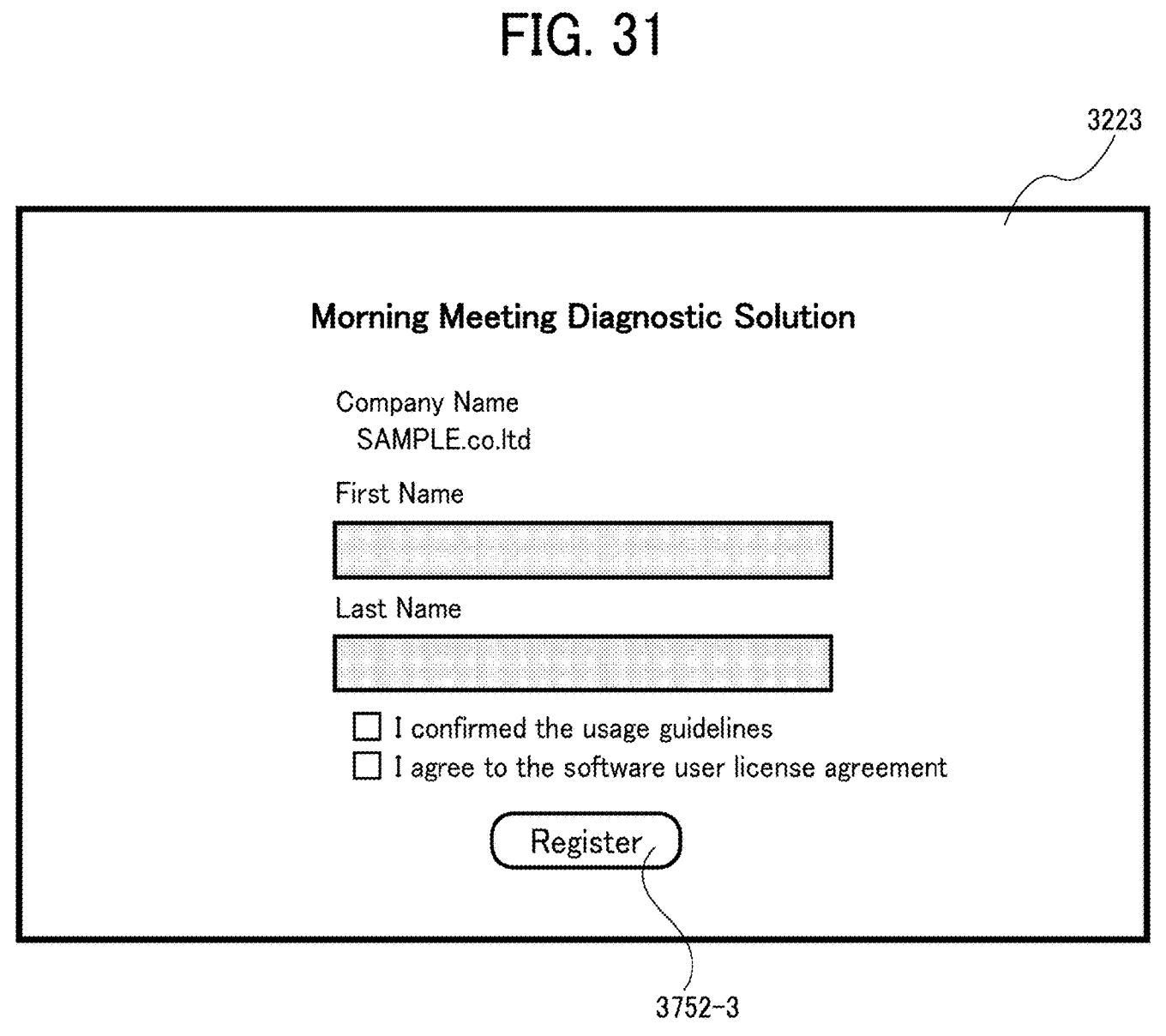

Morning Meeting Diagnostic Solution

Company Name
SAMPLE.co.ltd

First Name

Last Name

☐ I confirmed the usage guidelines
☐ I agree to the software user license agreement Register 3752-3

Figure 32:
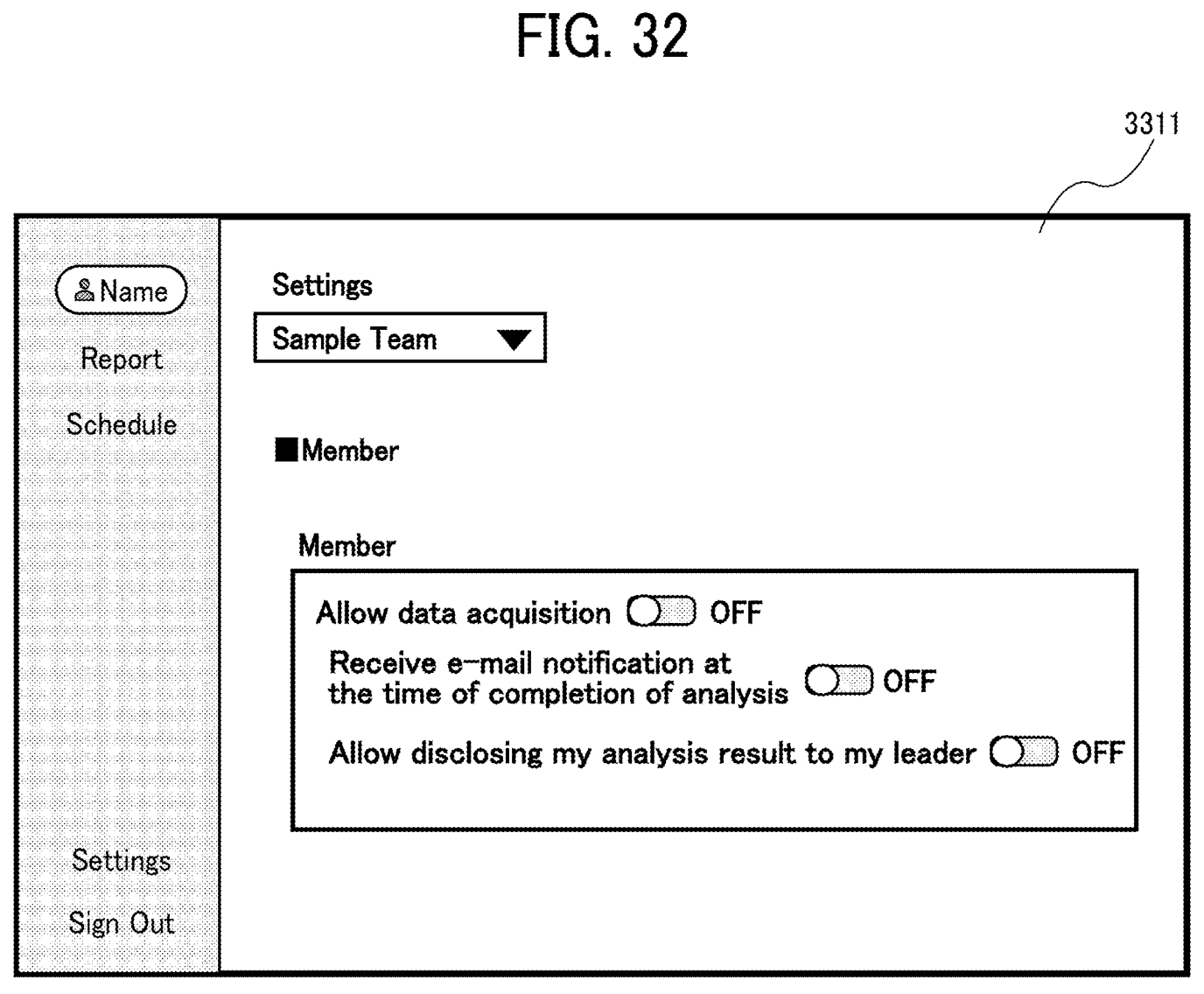

Settings

Sample Team ▶

■Member

Member

Allow data acquisition ◯▢ OFF

Receive e-mail notification at
the time of completion of analysis ◯▢ OFF

Allow disclosing my analysis result to my leader ◯▢ OFF

&Name

Report

Schedule

Settings

Sign Out

INFORMATION ANALYSIS SYSTEM, INFORMATION ANALYSIS METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-191494, filed on Nov. 30, 2022, and 2023-086826, filed on May 26, 2023, in the Japan Patent Office, the entire disclosure of which is hereby incorporated by reference herein.

BACKGROUND

Technical Field

The present disclosure relates to an information analysis system, an information analysis method, and a non-transitory recording medium.

Related Art

A mechanism for obtaining and outputting an activity level of an individual member of a group based on the utterance of the individual member has been known.

As such a technique, a technique of obtaining an activity level related to the utterance of each of multiple individual members in a group, setting a reference value related to the utterance of each of the individual members in the group based on the obtained activity level related to the utterance of each of the individual members, and outputting a result of comparison between the set reference value and the obtained activity level related to the utterance of each of the individuals has been known.

Further, with the diversification of how people work, an online method using a remote environment such as a web meeting has been widely used in alternative to a method in which people hold a meeting using the same physical space.

SUMMARY

An embodiment of the disclosure includes an information analysis system including a communication terminal including first circuitry and an information analysis apparatus including second circuitry. The first circuitry acquires image information and voice information of a plurality of participants participating in an online event and transmits, to the information analysis apparatus, the image information and the voice information. The second circuitry performs analysis on a state of the plurality of participants based on the image information and the voice information transmitted from the communication terminal, and generates, based on the state of the plurality of participants, a state notification to be displayed on the communication terminal.

An embodiment of the disclosure includes an information analysis method including performing analysis on a state of a plurality of participants participating in an online event, based on image information and voice information of the plurality of participants. The image information and the voice information are transmitted from a communication terminal that acquires the image information and the voice information. The method includes generating, based on the analyzed state of the plurality of participants, a state notification to be displayed on the communication terminal.

An embodiment of the disclosure includes a non-transitory recording medium storing a plurality of instructions which, when executed by one or more processors, causes the processors to perform a method. The method includes performing analysis on a state of a plurality of participants participating in an online event, based on image information and voice information of the plurality of participants. The image information and the voice information are transmitted from a communication terminal that acquires the image information and the voice information. The method includes generating, based on the analyzed state of the plurality of participants, a state notification to be displayed on the communication terminal.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 7 is a conceptual diagram illustrating a user information management table according to some embodiments of the disclosure;

FIG. 8 is a conceptual diagram illustrating an analysis record management table according to some embodiments of the disclosure;

FIG. 9 is a conceptual diagram illustrating an individual vitality level management table according to some embodiments of the disclosure;

FIG. 10 is a conceptual diagram illustrating a group activity level management table according to some embodiments of the disclosure;

FIG. 11 is a sequence diagram illustrating a process for participant information notification and member registration and authentication according to some embodiments of the disclosure;

FIG. 15 is a diagram illustrating a report display screen (morning meeting score) displayed on the communication terminal according to some embodiments of the disclosure;

FIG. 16 is a diagram illustrating a report display screen (vitality score) displayed on the communication terminal according to some embodiments of disclosure;

FIG. 20 is a diagram illustrating a report display screen (for utterance ratio) displayed on the communication terminal according to some embodiments of the disclosure;

FIG. 21 is a diagram illustrating a report display screen (for speakers) displayed on the communication terminal according to some embodiments of the disclosure;

FIG. 26 is a diagram illustrating a functional configuration of an information analysis system according to a third embodiment of the disclosure;

FIG. 27 is a conceptual diagram illustrating an individual data usage management table according to the third embodiment of the disclosure;

FIG. 31 is a diagram illustrating a registration screen related to confirmation and agreement displayed on the communication terminal according to the third embodiment of the disclosure;

FIG. 32 is a diagram illustrating a user setting screen displayed on the communication terminal according to the third embodiment of the disclosure;

Figure 1:
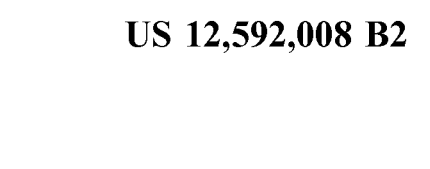
FIG. 1 is a diagram illustrating an overall configuration of an information analysis system according to some embodiments of the disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the description of the drawings, the same components are denoted by the same reference numerals, and redundant descriptions thereof are omitted.

First Embodiment

Overall Configuration of Information Analysis System

FIG. 1 is a diagram illustrating the overall configuration of an information analysis system according to an embodiment. As illustrated in FIG. 1, an information analysis system 1 includes devices (apparatuses) and terminals including a communication terminal 3 and an information analysis apparatus 5. A web meeting (for example, an online morning meeting or an online meeting) is held between the communication terminal 3 and the information analysis apparatus 5 in an online event space that is enclosed in a dotted line in FIG. 1. The online event space is illustrated for convenience as representing a virtual space where a web meeting using online is held. Further, in the information analysis system 1, the communication terminal 3 and the information analysis apparatus 5 are connected to each other via a communication network 100. The communication terminal 3 may be connected to the information analysis apparatus 5 via a firewall provided inside the communication network 100.

The communication network 100 is a communication network through which an unspecified number of communications are established, and is implemented by, for example, the Internet, an intranet, or a local area network (LAN). The communication network 100 may be a wired communication network or a wireless communication network in compliance with, for example, the fourth generation (4G), the fifth generation (5G), Worldwide Interoperability for Microwave Access (WiMAX), or Long Term Evolution (LTE).

Communication Terminal

The communication terminal 3 is a communication terminal that is used by a user (for example, a participant or a leader) who uses the information analysis system 1 and can acquire information related to multiple participants who participate in a predetermined event that is an event held online (online event). The communication terminal 3 is implemented by an information processing apparatus (computer system) in which a general-purpose operating system is installed and performs communication. The communication terminal 3 is one of the components included in the information analysis system 1. Further, the communication terminal 3 installs and stores, in a storage device, a communication application for communicating with the information analysis apparatus 5, an online meeting application that is an application for holding an online meeting.

The communication terminal 3 has a communication function and includes, for example, a general-purpose personal computer (PC), a portable laptop computer, a portable phone, a smartphone, a tablet terminal, and a wearable terminal (for example, a sunglass type or a wristwatch type). In addition to the communication function, the communication terminal 3 may have an image acquisition device to capture and acquire an image or a voice acquisition device to collect and acquire voice (sound). Further, as the communication terminal 3, a communication device or a communication terminal that can run software such as browser software or various applications may be used.

Information Analysis Apparatus

The information analysis apparatus 5 is an apparatus that performs analysis of information transmitted from the communication terminal 3. Further, the information analysis apparatus 5 is implemented by one or more information processing apparatuses (computer systems) in which a general-purpose server OS is installed. Further, the information analysis apparatus 5 installs and stores, in a storage device, a communication application for communicating with another apparatus such as a communication terminal.

The information analysis apparatus 5 may be implemented by a single computer such as a general-purpose PC or a portable laptop computer, or may be implemented by multiple computers to which divided functions or functional units, such as a storage unit, are allocated as desired. All or a part of the functions of the information analysis apparatus 5 may be implemented by a server computer residing on a cloud network or a server computer residing on an on-premises network. Alternatively, the information analysis apparatus 5 may be a communication apparatus or a communication terminal that can run software such as browser software.

The information analysis apparatus 5 may have an environment in which a system (for example, Amazon Web Services (AWS)) available in a web service using a known cloud can be used.

When transmitting, for example, a report to the communication terminal 3, the information analysis apparatus 5 may report (transmit) data (information) by a push notification (transmission). In this case, the information analysis apparatus 5 performs a push notification via, for example, Firebase Cloud Messaging (FCM) that serves as a push notification server.

Terminologies

In the description of embodiments, a term, event, is used as a generic term for activity performed by multiple participants sharing a topic or an agenda at a predetermined date and time. The event includes, for example, a conference, a morning meeting, an afternoon meeting, an evening meeting, and meeting. The description of embodiments is given on the assumption that such an event is held online using a web service. Based on such an assumption, a "predetermined event that is an online event" in the description of embodiments is regarded as, for example, an "online communication." The communication includes image information (image data) and voice information (voice data). The image information represents at least one of information related to nodding and information related to smiling included in an image of each of multiple participants participating a predetermined event. The image is captured during the predetermined event. The voice information represents information related to utterance of each of the multiple participants in the predetermined event.

Further, in the description of embodiments, a user refers to each participant who participates in an online event using the communication terminal 3 or an administrator (for example, a leader) who manages or supervises each participant. In the description of embodiments, the participant and the leader may be collectively referred to as a "user" for convenience.

Nod Detection

Figure 2:
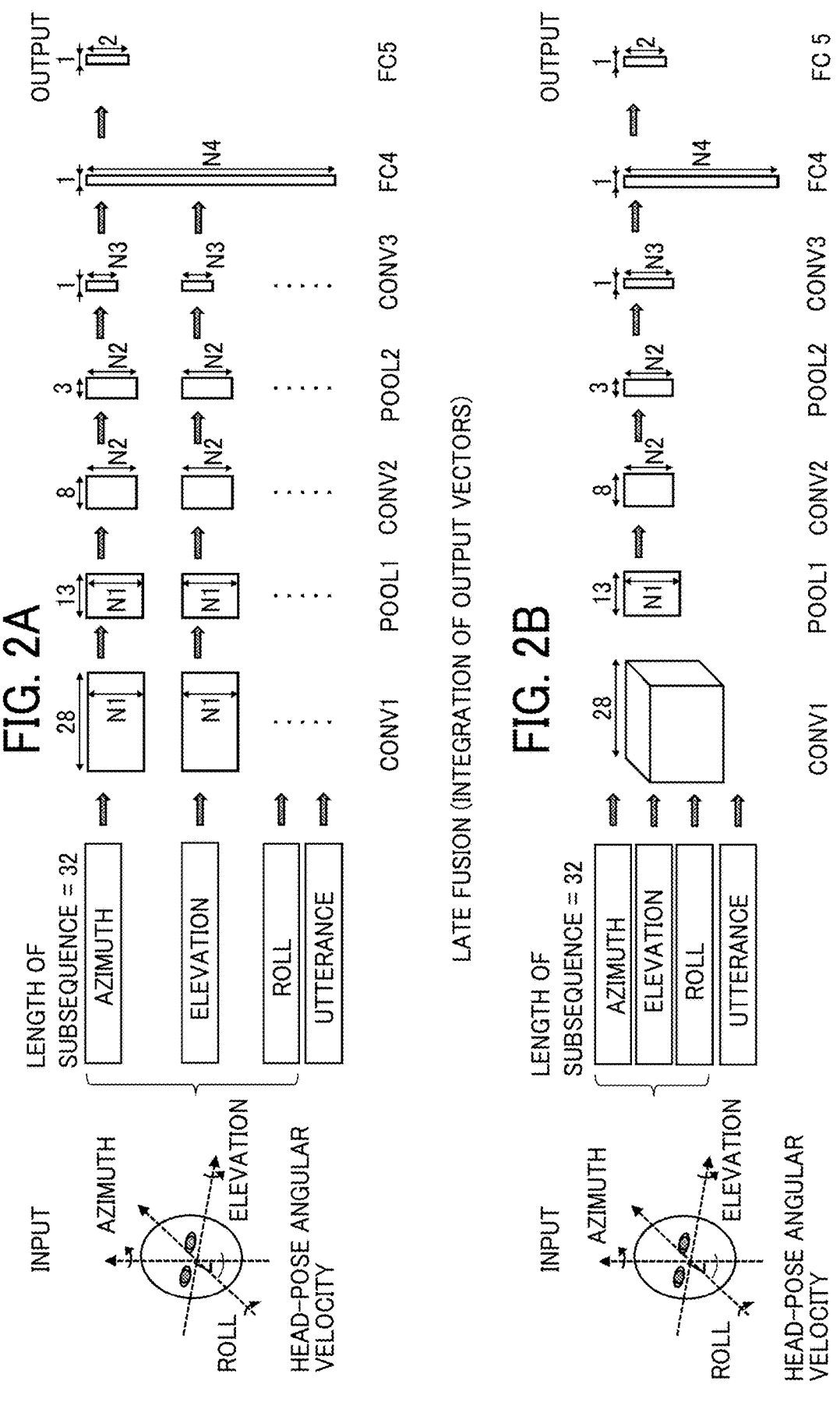
FIG. 2A is conceptual diagram illustrating a convolutional neural network and nod detection in Late fusion according to some embodiments of the disclosure.
FIG. 2B is conceptual diagram illustrating a convolutional neural network and nod detection in Early fusion according to some embodiments of the disclosure.

A method of detecting a "nod" of a participant who participates in an online event according to the present embodiment is described below. FIGS. 2A and 2B are conceptual diagrams each illustrating a convolutional neural network according to the present embodiment. FIG. 2A illustrates nod detection in Late fusion according to the present embodiment. FIG. 2B illustrates nod detection in Early fusion according to the present embodiment. The conceptual diagrams of FIGS. 2A and 2B of machine learning models related to nod detection are indicated by simplifying figures included in the following Reference Document 1. In FIGS. 2A and 2B, a machine learning model without the utterance section can be used.

> Reference Document 1: Kazuhiro Otsuka, Masahiro Tsumori, "Analyzing Multifunctionality of Head Movements in Face-to-Face Conversations Using Deep Convolutional Neural Networks", IEEE Access volume 8

The above-described reference is hereby incorporated by reference herein.

As a convolutional neural network (CNN) model, FIG. 2A illustrates a late-fusion model, and FIG. 2B illustrates an early-fusion model. Both models consist of a convolutional layer (conv1) and a pooling layer (pool1), a second convolutional layer (conv2) and a second pooling layer (pool2), a third convolutional layer (conv3), a fully connected layer (fc4), and a final fully connected layer (fc5). For details, Reference Document 1 is to be referred to, and a description thereof is omitted.

In the present embodiment, for example, the following procedure is presented as a process of nod detection.

Step 1: Data Collection

In the data collection, moving image data indicating a nod (nodding) with respect to the entire moving image and moving image data recorded in a predetermined online event are collected.

Step 2: Annotation

In the annotation, a nod is annotated with respect to Step 1, and teacher data is created (generated).

Step 3: Feature Extraction from Dataset

In the feature extraction from a dataset, facial key points are acquired by an existing library (for example, a Media-Pipe library). Then, the head movement is calculated based on the acquired key points.

Step 4: Model Creation (Generation)

In the model creation (generation), a model is constructed based on the existing publication information (Reference Document 1).

For the nod detection, information in the following Reference Document 2 may be used.

Reference Document 2: Shunsuke Ota, Seiko Taki, Mitsuru Jindai, Toshiyuki Yasuda "Nodding detection system based on head motion and voice rhythm", Japan Society of Mechanical Engineers, volume 15

The above-described reference is hereby incorporated by reference herein.

Step 5: Model Evaluation

In the model evaluation, the constructed model is evaluated.

Steps 1 to 5 described above may be used to detect "nods" of a participant based on image data acquired in an online event.

Smile Detection

Figure 3:
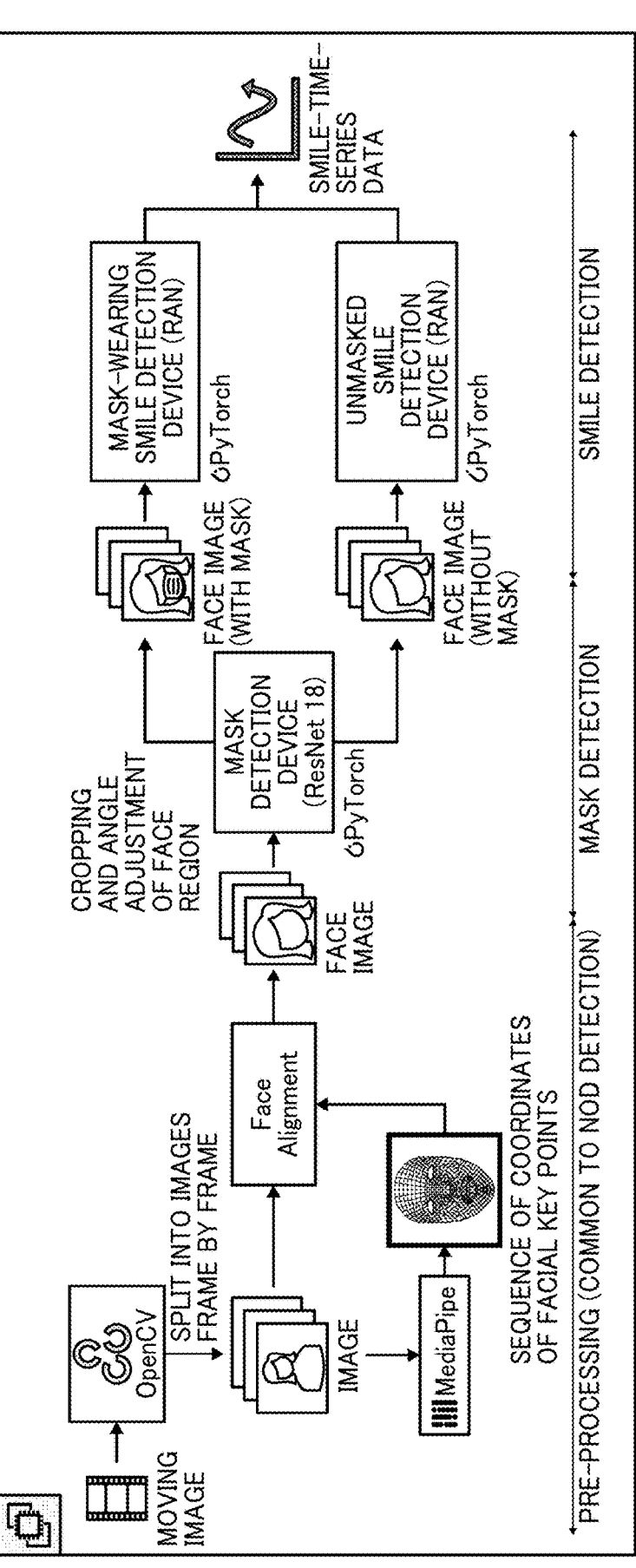
FIG. 3 is a conceptual diagram illustrating smile detection according to some embodiments of the disclosure.

A method for detecting a "smile" of a participant who participates in a predetermined online event is described below. FIG. 3 is a conceptual diagram illustrating smile detection according to the present embodiment. In the present embodiment, as illustrated in FIG. 3, the smile detection is performed according to whether the participant wears a mask. Based on this, region attention networks (RAN) that are enclosed in a square in FIG. 3 is described. Descriptions of the other processing steps illustrated in FIG. 3 is omitted.

In the RAN, several kinds of cropped images obtained by cutting out a part of an input image are generated, each of the generated cropped images is input to a neural network, and a final evaluation (smiling face or not) is output by taking into account "importance" of each cropped image. The "importance" of each cropped image is also calculated by the neural network. With such a configuration, inference by focusing on a portion related to facial expression recognition in the face image can be performed, and robust inference can be performed even when a part of the face is hidden.

Mask Wearing Determination

Mask wearing determination is described below. The mask wearing determination is performed by a mask-wearing determination model that receives an input of a face image of a person and outputs binary information indicating whether a mask is worn on the face of the person in the face image. The mask-wearing determination model is generated by using a known machine learning algorithm such as a convolutional neural network (CNN) through supervised machine learning using training data including pairs of a face image of a person and binary information indicating whether a mask is worn on the face of the person in the face image.

Mask-Wearing Smile Detection/Unmasked Smile Detection

Smile detection including mask-wearing smile detection and unmasked smile detection is described below. The smile detection is performed by a smile detection model that receives an input of a face image of a person and outputs binary information indicating whether the face of the person in the face image is smiling. When the input image is a face image of a person wearing a mask (with a mask), the smile detection is performed using the mask-wearing smile detection model, and when the input image is a face image of a person who is not wearing a mask (without a mask), the smile detection is performed using an unmasked smile detection model. Both the mask-wearing smile detection model and the unmasked smile detection model are generated by supervised machine learning using training data including a pair of a face image of a person and binary information indicating whether the face of the person captured in the face image is a smile by using the RAN. The training data used to generate the mask-wearing smile detection model is configured using face images of persons wearing masks, and the training data used to generate the unmasked smile detection model is configured using face images of persons who are without masks.

Evaluation Indicators

The concept of evaluation indicators in the present embodiment is described below. In the following, an "individual vitality level" indicating the vitality level of an individual participant participating in an online event and a "group activity level" indicating the activity level of a group (team) of multiple participants are defined as evaluation indicators.

Calculation of Individual Vitality Level

An overview of calculation of the "individual vitality level" executed in the present embodiment is described below.

The vitality level of each participant participating in the online event (referred to as an "individual vitality level") is calculated using image data alone. Specifically, the time of "nodding" (nod time) and the time of "smiling" (smile time) are detected. In order to calculate the individual vitality level, an indicator to be used is one that is likely to appear as a behavior of the participant in the online event such as a morning meeting (simply referred to as an "online event"). In particular, "nodding" and "smiling" are likely to appear as changes in the behavior of the participant in the online event. Accordingly, "nodding (nods)" and "smiling (smiles)" are used to calculate the individual vitality level.

If the individual vitality level is evaluated by the absolute value, the difference becomes large depending on the personality of the participant, and calculating the individual vitality level for each participant is difficult. To cope with this, data from at least past several times (for example, past three times) may be used.

Calculation of Group Activity Level of Group (Team)

An overview of the calculation of the "group activity level" executed in the present embodiment is described below.

When the online event is performed, the activity level of a group (team) (referred to as a "group activity level") is calculated using image data and voice data of each participant. Specifically, the time of "nodding" (nod time) and the time of "smiling" (smile time) of each participant is detected using the image data. Further, an utterance ratio of each participant (who spoke at what proportion), a speaker ratio (who spoke), and the number of expressions of appreciation are detected by using the voice data.

In the present embodiment, each of the items of "nods," "smiles," "utterance ratio," "speaker ratio," and "appreciation" is scored, and the total score of the items is displayed as the group activity level (score) of the group (team). As will be described later, each of the items of "nods," "smiles," "utterance ratio," "speaker ratio," and "appreciation" is evaluated, for example, based on a maximum of 20 points, but the ratio of the points may be changed. Further, the group activity level of the group (team) may be displayed by, for example, a symbol or a mark in alternative to the score.

Further, ensuring psychological safety is helpful in order to enhance the group activity level of the group (team). In order to ensure psychological safety, "nods" and "smiles" are useful indicators.

In a place (space) where a predetermined event including an online event is performed, empathy of participants can be created by increasing the number of "nods" of the participants, and increasing the number of "nods" of a participant can give a feeling of security to another participant. Further, since an increase in the number of smiles of one person can be transmitted to surrounding persons, the "smiling" is a useful indicator for creating a good atmosphere in the group (team). Further, because being easily detectable from a moving image, "nods" and "smiles" are used in the present embodiment.

Further, "appreciation" is also an indicator for ensuring psychological safety. In an organization without appreciation, there may be a risk that "basic rights" and "common practices" are applied to more than necessary. Accordingly, by converting "appreciation" into a language, for example, psychological safety of the group (team), or a sense of unity of the group (team) are created.

Further, even in a short online meeting such as a morning meeting, a state in which a specific person is speaking alone is not preferable in order to facilitate communication. Accordingly, measuring and visualizing a ratio of how many participants other than a specific person (facilitator such as a leader) speaks and providing information on such the ratio allows the leader to attempt to increase the number of times that the leader prompt other participants to speak out. However, since a state in which a specific member other than the leader is speaking most of the time is also not preferable. To cope with this, in the present embodiment, who has spoken is visualized, and this allows the leader or the participant to prompt the other participants to equally speak out.

The information analysis system according to the present embodiment defines the above-described evaluation indicators, calculates the "individual vitality level" of each participant participating in a predetermined event that is an online event and the "group activity level" in the online event, and provides the result as a report. As a result, even in an online event, namely, in an environment in which it is difficult to directly grasp the facial expression of each participant, a state of the participant can be grasped based on the facial expression in addition to the utterance (speech), and information obtained based on the utterance and the facial expression can be utilized.

Hardware Configurations

Figure 4:
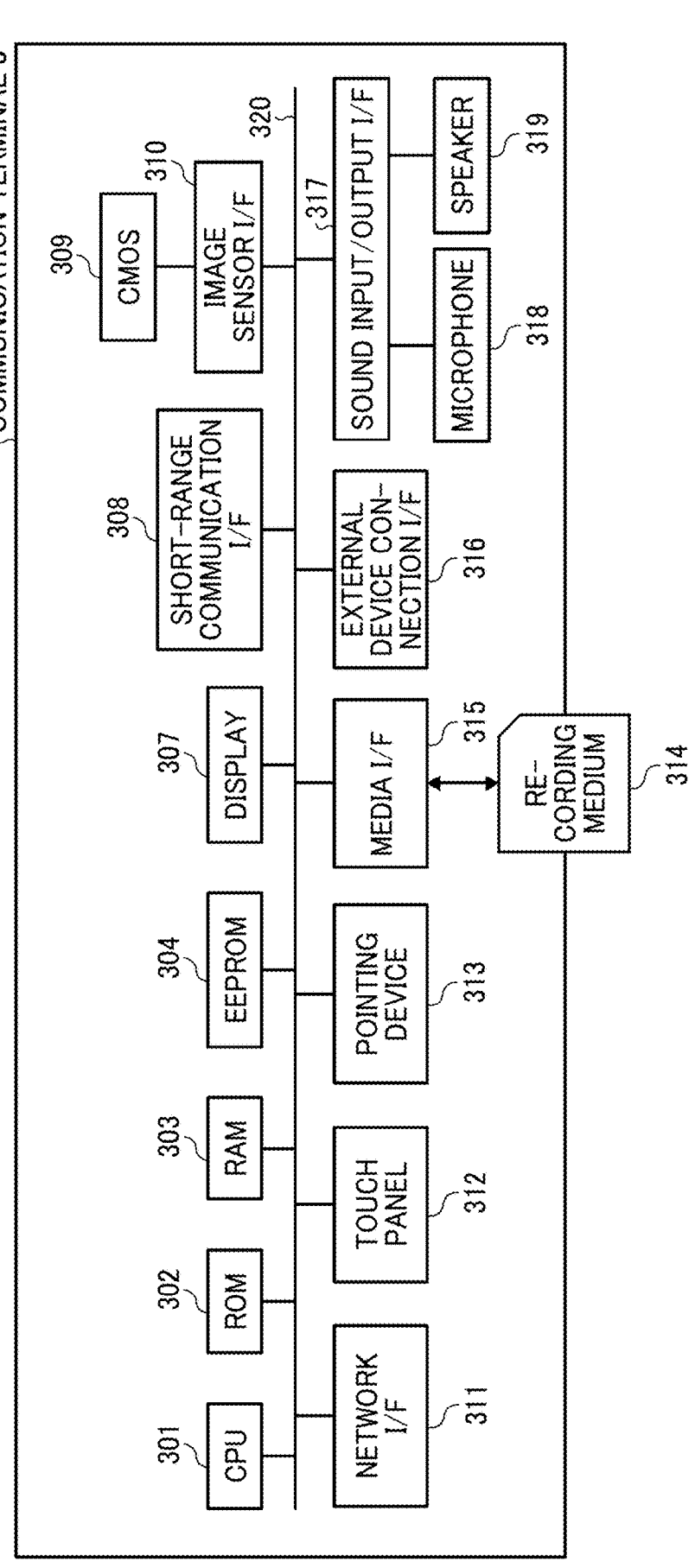
FIG. 4 is a block diagram illustrating a hardware configuration of a communication terminal according to some embodiments of the disclosure.
Figure 5:
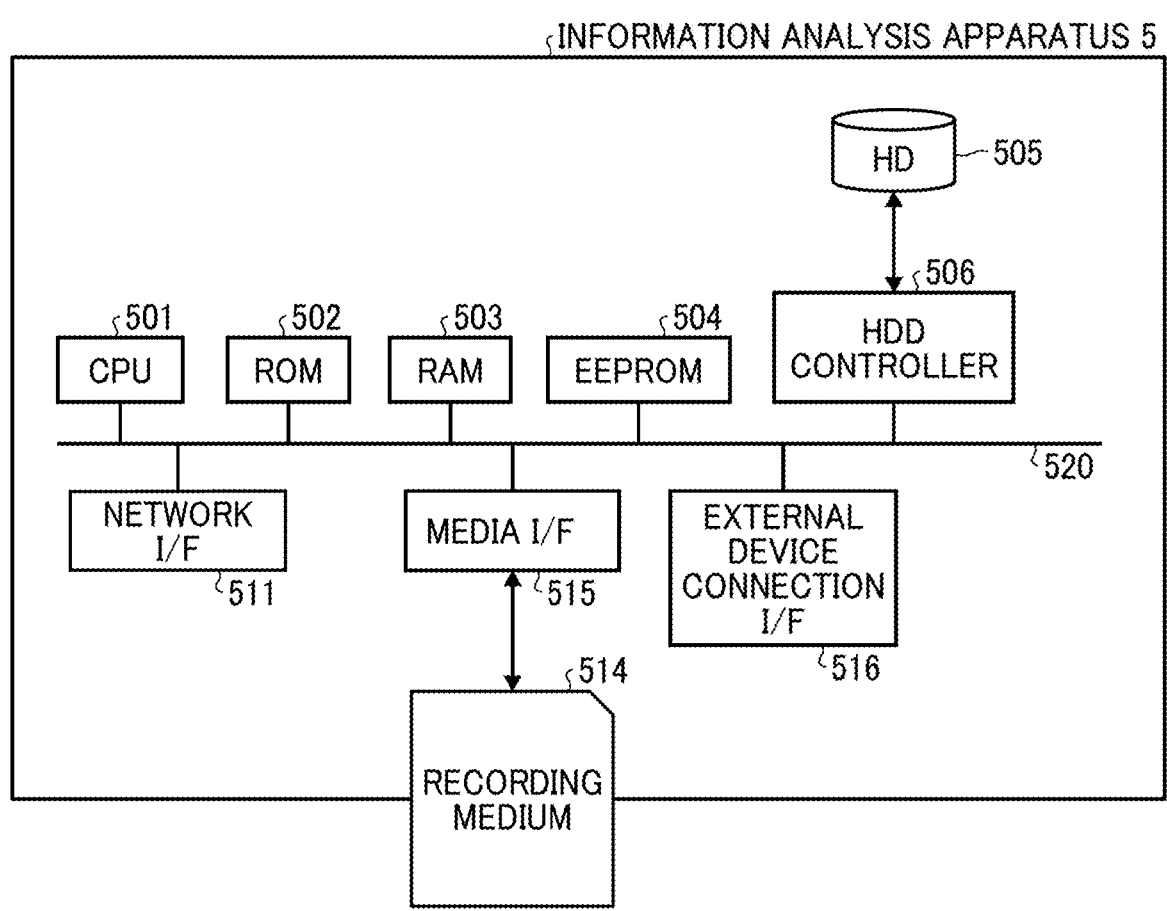
FIG. 5 is a block diagram illustrating a hardware configuration of an information analysis apparatus according to some embodiments of the disclosure.

Referring to FIGS. 4 and 5, hardware configurations of the communication terminal and the information analysis apparatus included in the information analysis system according to the present embodiment are described below. In the hardware configurations of the communication terminal and the information analysis apparatus illustrated in FIGS. 4 and 5, a component may be added or deleted as appropriate.

Hardware Configuration of Communication Terminal

FIG. 4 is a block diagram illustrating a hardware configuration of the communication terminal according to the present embodiment. As illustrated in FIG. 4, the communication terminal 3 is implemented by, for example, a computer and includes a central processing unit (CPU) 301, a read only memory (ROM) 302, a random access memory (RAM) 303, an electrically erasable programmable read only memory (EEPROM) 304, a display 307, a short-range communication interface (I/F) 308, a complementary metal oxide semiconductor (CMOS) sensor 309, and an image sensor I/F 310. The communication terminal 3 further includes a network I/F 311, a touch panel 312, a pointing device 313, a media I/F 315, an external device connection I/F 316, a sound input/output I/F 317, a microphone 318, a speaker 319, and a bus line 320. However, the CMOS sensor 309 or the image sensor I/F 310 serving as functions of an image acquisition unit such as a web camera, and the sound input/output I/F 317 or the microphone 318 serving as functions of a voice acquisition unit such as a microphone may be detachably attached to the communication terminal 3.

The CPU 301 controls entire operation of the communication terminal 3. The ROM 302 stores a control program for driving the CPU 301. The RAM 303 is used as a work area for the CPU 301. The EEPROM 304 reads or writes various data of, for example, an application under control of the CPU 301. The display 307 displays various information such as a cursor, a menu, a window, a character, or an image. The display 307 serves as a display device according to the present embodiment. The short-range communication I/F 308 is a communication circuit for performing data communication with communication devices or communication terminals including a wireless communication interface in compliance with the near field communication (NFC), BLUETOOTH, or WIRELESS FIDELITY (WI-FI). The CMOS sensor 309 serves as a built-in imaging device to obtain image data or video data by capturing a subject, under control of the CPU 301. In alternative to a CMOS sensor, an imaging device may be a charge-coupled device (CCD) sensor. The image sensor I/F 310 is a circuit that controls the drive of the CMOS sensor 309.

The network I/F 311 is an interface for data communication via the communication network 100. The touch panel 412 serves as an input device that allows a user to press, click, or tap a button, or an icon on a screen of the display 307, to operate the communication terminal 3. The pointing device 313 serves as an input device that allows a user to select or execute various instructions, select a target for processing, or move a cursor being displayed. The communication terminal 3 may include an input device using at least one of a touch panel and a keyboard in alternative to or in addition to the pointing device 313. The media I/F 315 reads or writes (stores) data from or to a recording medium 314 such as a flash memory. The external device connection I/F 416 is an interface for connecting to various external devices (apparatuses). The external device in this case is, for example, a universal serial bus (USB) memory. The sound input/output I/F 317 is a circuit for controlling input and output of sound signals between the microphone 318 and the speaker 319 under control of the CPU 301. The microphone 318 is a built-in circuit that converts sound into electric signals. The microphone 318 acquires sound and sound waves emitted from an external speaker, etc., and acquires information using electrical signals. The speaker 319 is a built-in circuit that converts electric signals into physical vibration, thereby generating sound such as music or voice. The bus line 320 is an address bus, a data bus, or the like for electrically connecting each component such as the CPU 301.

Hardware Configuration of Information Analysis Apparatus

FIG. 5 is a block diagram illustrating a hardware configuration of an information analysis apparatus according to the present embodiment. As illustrated in FIG. 5, the information analysis apparatus 5 that is implemented by a computer and includes a CPU 501, a ROM 502, a RAM 503, an EEPROM 504, a hard disk (HD) 505, a hard disk drive (HDD) controller 506, a network I/F 511, a media I/F 515, an external device connection I/F 516, and a bus line 520. The above-described hardware resources are substantially the same as the hardware resources of the communication terminal 3, namely, the CPU 301, the ROM 302, the RAM 303, the EEPROM 304, the network I/F 311, the media I/F 315, the external device connection I/F 316, and the bus line 320, and redundant descriptions are omitted.

The HD 505 stores various data such as a program. The HDD controller 506 reads or writes various data from and to the HD 505 under control of the CPU 501. The information analysis apparatus 5 may have a hardware configuration that includes a solid state drive (SSD) in alternative to the HD 505 and the HDD controller 506.

For example, any one of the above-described programs is recorded in a file in a format installable or executable on a computer-readable recording medium for distribution. The recording medium includes, for example, a compact disc-recordable (CD-R), a digital versatile disc (DVD), a BLU-RAY disc, a secure digital (SD) card, and a USB memory. Further, such recording medium may be provided in the form of a program product to users within a certain country or outside that country. For example, the information analysis apparatus 5 executing a program according to one or more embodiments of the disclosure, to implement an information analysis method according to one or more embodiments of the disclosure.

Functional Configuration of Information Analysis System

Figure 6:
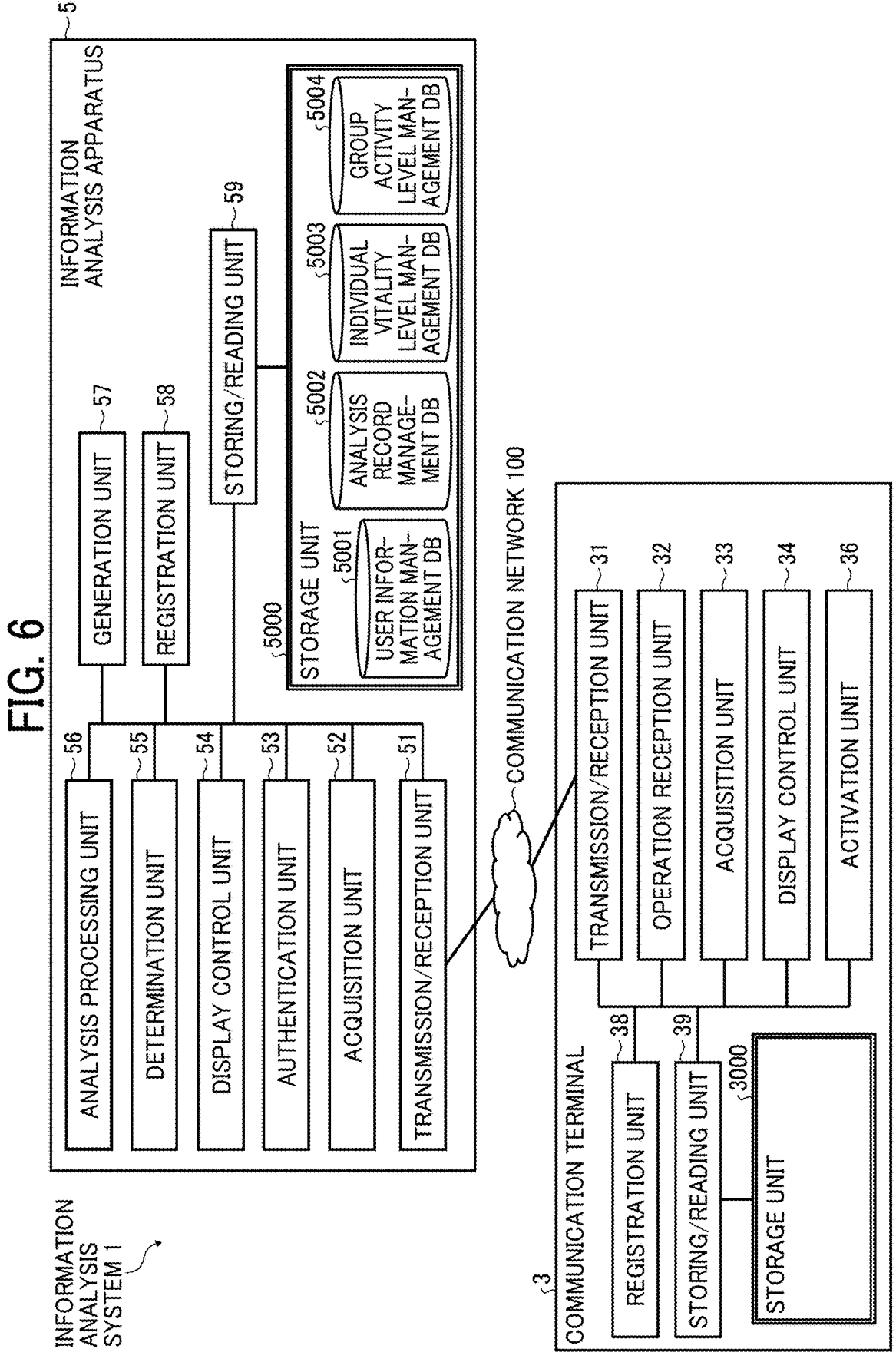
FIG. 6 is a block diagram illustrating a functional configuration of an information analysis system according to some embodiments of the disclosure.

Referring to FIGS. 6 to 10, a functional configuration of the information analysis system according to the present embodiment is described below. FIG. 6 is a block diagram illustrating a functional configuration of the information analysis system according to the present embodiment. FIG. 6 illustrates functional components of the communication terminal 3 and the information analysis apparatus 5 illustrated in FIG. 1, and the illustrated functional components are related to processing or operation to be described later.

Functional Configuration of Communication Terminal

A functional configuration of the communication terminal 3 is described below. As illustrated in FIG. 6, the communication terminal 3 includes a transmission/reception unit 31, an operation reception unit 32, an acquisition unit 33, a display control unit 34, an activation unit 36, a registration unit 38, and a storing/reading unit 39. Each of the functional units is implemented by one or more of the hardware resources illustrated in FIG. 4 that operate in response to an instruction from the CPU 301 according to a program for the communication terminal 3 loaded into the RAM 303 from at least one of the ROM 302, the EEPROM 304, and the recording medium 314. The communication terminal 3 further includes a storage unit 3000 implemented by at least one of the ROM 302, the EEPROM 304, and the recording medium 314 illustrated in FIG. 4. Further, in the storage unit 3000, a communication program (communication application) for performing communication with apparatuses and terminals via the communication network 100, a browser application, and a video conference application for performing, for example, an online meeting and an online morning meeting are installed and stored.

Functional Configuration of Communication Terminal

A detailed description is given below of the functional configuration of the communication terminal 3. The transmission/reception unit 31 of the communication terminal 3 illustrated in FIG. 6 is implemented by, for example, processing performed by the CPU 301 with respect to the short-range communication I/F 308 and the network I/F 311 illustrated in FIG. 4. The transmission/reception unit 31 transmits and receives various data (or information) to and from the information analysis apparatus 5 via the communication network 100. Further, the transmission/reception unit 31 transmits the acquired image information and voice information to the information analysis apparatus. The transmission/reception unit 31 further transmits various information including face image data of the participant and an electronic mail address of the participant to the information analysis apparatus 5 as a participant information notification. In the present embodiment, the transmission/reception unit 31 serves as at least one of a first transmission unit and a first reception unit.

The operation reception unit 32 is implemented by, for example, the CPU 301 processing signals generated by various operations received by at least one of the display 307, the touch panel 312 and the pointing device 313. The operation reception unit 32 may use signals generated by various operations received by an input unit such as a keyboard in alternative to the display 307, the touch panel 312, and the pointing device 313. The display 307 and the touch panel 312 may share hardware resources and functions. Further, in an event such as online morning meeting, the operation reception unit 32 receives a start operation and an end operation of the online morning meeting by each participant or the leader. In the present embodiment, the operation reception unit 32 serves as a reception unit.

The acquisition unit 33 is implemented by, for example, processing performed by the CPU 301, and acquires various types of information received by the transmission/reception unit 31. Further, the acquisition unit 33 acquires face image data and utterance (spoken voice) data of each participant in an event such as an online morning meeting by using the corresponding hardware resource.

The face image data is a type of image information (visual information), and the utterance (spoken voice) data is a type of voice information. The acquisition unit 33 further acquires report data (for example, a state notification) including predetermined content transmitted by the information analysis apparatus 5 via the transmission/reception unit 31. In the present embodiment, the acquisition unit 33 serves as an acquisition unit.

The display control unit 34 is implemented by, for example, processing performed by the CPU 301 with respect to the display 307, and performs display control of various screens and information on the communication terminal 3. Further, the display control unit 34 displays the report data related to a state of the multiple participants transmitted by the information analysis apparatus 5 on the display 307. In the present embodiment, the "state of the participants" includes a facial expression state detected for each of the multiple participants based on at least one of the number of nods and the number of smiles of the corresponding participant, and a state of an activity level of all of the multiple participants based on the facial expression state detected for each of the multiple participants. The detected facial expression state includes a state of smile detection and a state of nod detection, which are described later.

Further, the state of the activity level for all the participants includes a group activity level, which is described later. In the present embodiment, in alternative to or in addition to the display control unit 34, the display control unit 54 of the information analysis apparatus 5 may have a function of causing the display 307 (serving as a display unit) to display a screen corresponding to selection of a first option and a second option on an analysis result screen represented by the report data. Further, the display control unit 34 displays a display screen generated by, for example, hypertext makeup language (HTML) on the display 307 using, for example, a browser. In the present embodiment, the display control unit 34 serves as a display control unit.

The activation unit 36 is implemented by, for example, the processing performed by the CPU 301, and activates various applications including the video conference application on the communication terminal 3. In the present embodiment, the activation unit 36 serves as an activation unit.

The registration unit 38 is implemented by, for example, processing performed by the CPU 301, and registers various types of information in the communication terminal 3. In the present embodiment, the registration unit 38 serves as a registration unit.

The storing/reading unit 39 is implemented by, for example, processing performed by the CPU 301 with respect to at least one of the ROM 302, the EEPROM 304, and the recording medium 314. The storing/reading unit 39 stores or reads various data (or information) in or from the storage unit 3000. In the present embodiment, the storing/reading unit 39 serves as a storing/reading unit.

Functional Configuration of Information Analysis Apparatus

A detailed description is given of the functional configuration of the information analysis apparatus 5. As illustrated in FIG. 6, the information analysis apparatus 5 includes a transmission/reception unit 51, an acquisition unit 52, an authentication unit 53, a display control unit 54, a determination unit 55, an analysis processing unit 56, a generation unit 57, a registration unit 58, and a storing/reading unit 59. Each of the functional units is implemented by one or more of the hardware resources illustrated in FIG. 5 that operate in response to an instruction from the CPU 501 according to a program for the information analysis apparatus 5 loaded into the RAM 503 from at least one of the ROM 502, the EEPROM 504, the HD 505, and the recording medium 514. The information analysis apparatus 5 further includes a storage unit 5000 implemented by at least one of the ROM 502, the EEPROM 504, the HD 505, and the recording medium 514 illustrated in FIG. 5. Further, for example, a communication program (communication application) for performing communication with the communication terminal 3 via the communication network 100 and a browser application are installed and stored in the storage unit 5000.

Functional Configuration of Information Analysis Apparatus

A detailed description is given of the functional configuration of the information analysis apparatus 5. The transmission/reception unit 51 of the information analysis apparatus 5 illustrated in FIG. 6 is implemented by processing performed by the CPU 501 with respect to the short-range communication I/F 508 and the network I/F 511 illustrated in FIG. 5. The transmission/reception unit 51 transmits and receives various data (or information) to and from the communication terminal 3 via the communication network 100. Further, the transmission/reception unit 51 transmits report data (for example, a state notification) related to a state of the multiple participants generated by the generation unit 57 described below to the communication terminal 3. In the present embodiment, the transmission/reception unit 51 serves as at least one of a second transmission unit and a second reception unit.

The acquisition unit 52 is implemented by, for example, processing performed by the CPU 501, and acquires, for example, a posted document (file) transmitted (posted) by the communication terminal 3. Further, the acquisition unit 52 acquires various types of information including face image data (image information) of each participant, voice data (voice information) related to utterance of each participant, and an electronic mail address of each participant via the transmission/reception unit 51 as the participant information notification transmitted by the communication terminal 3. The acquisition unit 52 acquires either the image information and the voice information transmitted by the communication terminal 3 used by a specific participant among the multiple participants or the image information and the voice information transmitted by the communication terminal 3 used by each of the multiple participants. The image information includes information on "nods" and "smiles" of the participant as facial expression image. Further, the voice information includes "speech content" and "expressions of appreciation" as the utterance (spoken voice) of the participant. In the present embodiment, the acquisition unit 52 serves as an acquisition unit.

The authentication unit 53 is implemented by, for example, processing performed by the CPU 501, and executes authentication processing based on the face image and electronic mail address of the participant (member) transmitted by the communication terminal 3. The authentication unit 53 performs password management and user management of each participant when an online event is performed. In the present embodiment, the authentication unit 53 serves as an authentication unit or a processing unit.

The display control unit 54 is implemented by, for example, processing performed by the CPU 501 with respect to the display 307 of the communication terminal 3, and performs display controls of various screens and information on the communication terminal 3.

Further, the display control unit 54 displays a display screen generated by, for example, HTML on the display 307 of the communication terminal 3 using, for example, a browser. In the present embodiment, the display control unit 54 serves as a display control unit.

The determination unit 55 is implemented by, for example, processing performed by the CPU 501, and performs various determination processes in the information analysis apparatus 5. In the present embodiment, the determination unit 55 serves as a determination unit.

The analysis processing unit 56 is implemented by, for example, processing performed by the CPU 501, and performs a series of information analyses using a machine learning model in the information analysis apparatus 5. Further, the analysis processing unit 56 perform analysis on a state of the multiple participants based on the image information and the voice information transmitted by the communication terminal 3. Further, the analysis processing unit 56 performs analysis on the state of the multiple participants based on at least one of the information related to the nods of each of the multiple participants and the information related to the smiles of each of the multiple participants and the information related to the utterance of each of the multiple participants. The analysis processing unit 56 further performs analysis on the state of the multiple participants by performing analysis using the machine learning model on at least one of the information related to the nods and the information related to the smiles. The analysis processing unit 56 further performs analysis on the state of the multiple participants based on either the image information and the voice information transmitted by the communication terminal 3 used by a specific participant among the multiple participants or the image information and the voice information transmitted by the communication terminal 3 used by each of the multiple participants. In the present embodiment, the analysis processing unit 56 serves as an analysis processing unit. The above-described AWS may be used for the analysis processing unit 56.

The generation unit 57 is implemented by, for example, processing performed by the CPU 501, and generates various types of information (data) in the information analysis apparatus 5. Further, the generation unit 57 generates report data (for example, a state notification) as a state notification that can be displayed on the communication terminal 3 based on the analyzed state of the multiple participants. The generation unit 57 generates a state notification based on the facial expression state detected for each of the multiple participants and the state of the activity level. Further, the generation unit 57 generates, as the state notification, a chart (for example, in a graph format or a table format) as a result of visually representing the facial expression state detected for each of the multiple participants and the state of the activity level, and a comment on the result to a specific participant among the multiple participants. In the present embodiment, the generation unit 57 serves as a generation unit. The generation unit 57 may generate, as the state notification, one of a chart and a comment to be displayed. In other words, the state notification may include one of a chart and a comment.

The registration unit 58 is implemented by, for example, processing performed by the CPU 501, and registers information in various data tables managed by the information analysis apparatus 5. Further, the registration unit 58 registers in advance before a predetermined event is carried out, as participant information for the predetermined event, image information (face image data) of the multiple participants who are to participate in the predetermined event and an electronic mail address of each participant in a user information management database (DB) (an example of a user information management unit) that manages user information, which will be described later. Further, the registration unit 58 registers user identifiers (IDs) (e-mail addresses) of the multiple participants who are registered and authenticated in advance before the predetermined event is carried out and participate in the predetermined event, in addition to the image information of each participant. In the present embodiment, the registration unit 58 serves as a registration unit.

The storing/reading unit 59 is implemented by, for example, processing performed by the CPU 501 with respect to at least one of the ROM 502, the EEPROM 504, the HD 505, and the recording medium 514. The storing/reading unit 59 stores or reads various data (or information) in or from the storage unit 5000. In the present embodiment, the storing/reading unit 59 serves as a storing/reading unit.

User Information Management Table

FIG. 7 is a conceptual diagram illustrating a user information management table according to the present embodiment. The structure of the data table described below is an example, and the present disclosure is not limited to this. The storage unit 5000 includes a user information management DB 5001 implemented by the user information management table as illustrated in FIG. 7. In the user information management table, a group (team) name, a leader flag, and a user name are stored and managed in association with each other for each user ID (e-mail address). The user ID is identification information of a participant (including a leader who is, for example, a specific participant) who participates in a predetermined event such as an online morning meeting, and is, for example, an e-mail address. The group (team) name is a name of a group or team to which the participant belongs. The leader flag is a flag indicating whether the user is a leader of the group or team, and "True" indicates that the user is a leader. The user name is a name of the user associated with the user ID. In the present embodiment, the term "ID" includes the meaning of "identification information."

In the present embodiment, the user information management table (user information management DB 5001) serves as a user information management unit.

Analysis Record Management Table

FIG. 8 is a conceptual diagram illustrating an analysis record management table according to the present embodiment. The data table described below is an example, and the present disclosure is not limited to this. The storage unit 5000 includes an analysis record management DB 5002 implemented by the analysis record management table as illustrated in FIG. 8. In the analysis record management table, for each user ID, a group (team) name, a date and time, an event content, a participation flag, a report generation flag, an undetected time in the image, a nod time, a smile time, an utterance time, the number of expressions of appreciation, and a total time are stored and managed in association with each other. The date and time indicates a date and time when an event including an online event is held. The event content is a title such as an online morning meeting. The participation flag is a flag indicating whether a participant indicated by the user ID has participated in the corresponding event, and "True" indicates that the participant has participated in the event. The report generation flag is a flag indicating whether a report for the corresponding event has been generated, and "True" indicates that the report has been generated. The undetected time in the image indicates a time, in units of seconds, for which a participant associated with the user ID is not detected in the image (video) obtained by recording the event. When the value of the undetected time in the image is excessively longer than the time for another participant, this serves as an indicator for generating a report indicating an alert to the participant.

The nod time indicates a time for which the participant associated with the user ID is detected as nodding in the event, in units of [seconds]. The smile time indicates a time for which the participant associated with the user ID is detected as smiling in the event in units of [seconds]. The utterance time indicates a time for which the participant associated with the user ID has made a speech (uttered) in the event in units of [seconds]. The number of expressions of appreciation indicates the number of times that the participant associated with the user ID spoke (uttered) a word of appreciation in the event. The total time is a time from the start to the end of the event such as an online morning meeting. In the analysis record management table, the management items described above are accumulated and managed as a record for each user ID.

In the present embodiment, the analysis record management table (analysis record management DB 5002) serves as an analysis record management unit.

Individual Vitality Management Table

FIG. 9 is a conceptual diagram illustrating an individual vitality level management table according to the present embodiment. The data table described below is an example, and the present disclosure is not limited to this. The storage unit 5000 includes an individual vitality level management DB 5003 implemented by the individual vitality level management table as illustrated in FIG. 9. In the individual vitality management table, a date and time, an event content, a nod time [seconds], a smile time [seconds], and an individual vitality level are stored and managed in association with each other for each tab having a user ID.

The date and time indicates a date and time when the event is held. The event content includes, for example an online morning meeting, a name of an online meeting, and an agenda. The event may be periodic, such as daily, weekly, or monthly. The nod time is a time in seconds during which the nodding of each participant in the predetermined event is detected. The smile time is a time in seconds during which the smiling of each participant in the predetermined event is detected. The individual vitality level is calculated using a machine learning model based on the nod time and the smile time, and is obtained by quantifying the degree of facial expression of the individual participant in the predetermined event. The individual vitality level may be indicated by, for example, points from 0 point to 20 points.

In the present embodiment, the individual vitality level management table (individual vitality level management DB 5003) serves as an individual vitality level management unit.
Group Activity Level Management Table FIG. 10 is a conceptual diagram illustrating a group activity level management table according to the present embodiment. The data table described below is an example, and the present disclosure is not limited to this. The storage unit 5000 includes a group activity level management DB 5004 implemented by the group activity level management table as illustrated in FIG. 10. In the group activity level management table, members, a date and time, and event scores are stored and managed in association with each other for each tab having a group ID.

The members are members of a group (team). Since the members are all members in the group (team), the members do not necessarily coincide with the participants in a case where there is an absent person in the predetermined that is an online event. The event score is a score of such as a morning meeting (morning meeting score) held online. The event score is a score calculated based on the individual vitality of each member (each participant indicated by each user ID) described above. The event score represents the group activity level in a report transmitted to the communication terminal 3 described later.

In the present embodiment, the group activity level management table (group activity level management DB 5004) serves as a group activity level management unit.
Processes or Operation Referring to FIGS. 11 to 22, processes and operations in the information analysis system are described below.
Participant Information Notification, Member Registration and Authentication Participant information notification and member registration and authentication processing are described below. FIG. 11 is a sequence diagram illustrating a process for participant information notification and member registration and authentication according to the present embodiment. As illustrated in FIG. 11, according to an operation performed by the user who uses the information analysis system 1, the communication terminal 3 activates an online meeting application or starts a web browser by accessing a predetermined Uniform Resource Locator (URL) (Step S11).

Subsequently, the transmission/reception unit 31 of the communication terminal 3 transmits a participant information notification to the information analysis apparatus 5 (Step S12). Accordingly, the transmission/reception unit 51 of the information analysis apparatus 5 receives the participant information notification transmitted from the communication terminal 3. The participant information notification includes a name of each participant, face image data of each participant, and an e-mail address of each participant. The face image data of each participant may be data of a face image captured in advance for each participant (for example, photograph data of the employee ID card).

Subsequently, the registration unit 58 of the information analysis apparatus 5 executes member registration processing (Step S13). Specifically, the registration unit 58 registers the e-mail address of each participant included in the participant information notification received in Step S12 as the user ID in the user information management DB 5001 (see FIG. 7).

In the member registration processing in Step S13 described above, in alternative to transmitting the participant information from the communication terminal 3, the participant information may be registered in a predetermined database on the AWS that can be accessed by the information analysis apparatus 5. Further, the member registration processing may be performed, in substantially the same manner as another known web service, by each participant in a manner that each participant registers himself or herself or by the leader in a manner that the leader registers all members of the group (team) collectively.

Further, an executor of a service including information analysis may receive the participant information related to each participant and perform the user registration.

Subsequently, the authentication unit 53 executes authentication processing (Step S14). Specifically, the authentication unit 53 compares the information on the member registered in Step S13 with the information on each participant participating in the online event to be held, and when there is no registered information, the service related to the online event is not provided.

Figure 12:
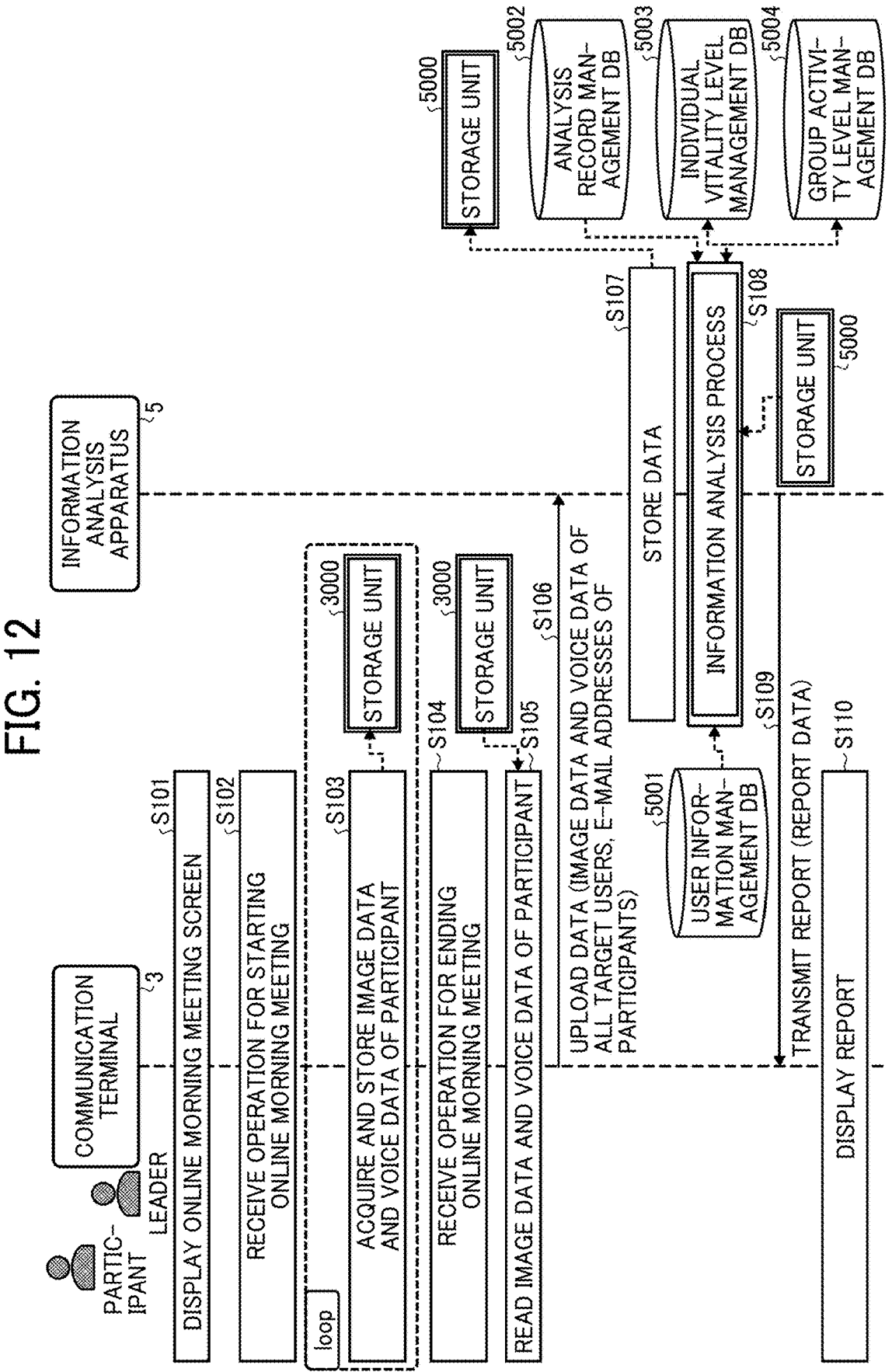
FIG. 12 is a sequence diagram illustrating an information analysis process in an online event according to some embodiments of the disclosure.
Figure 13:
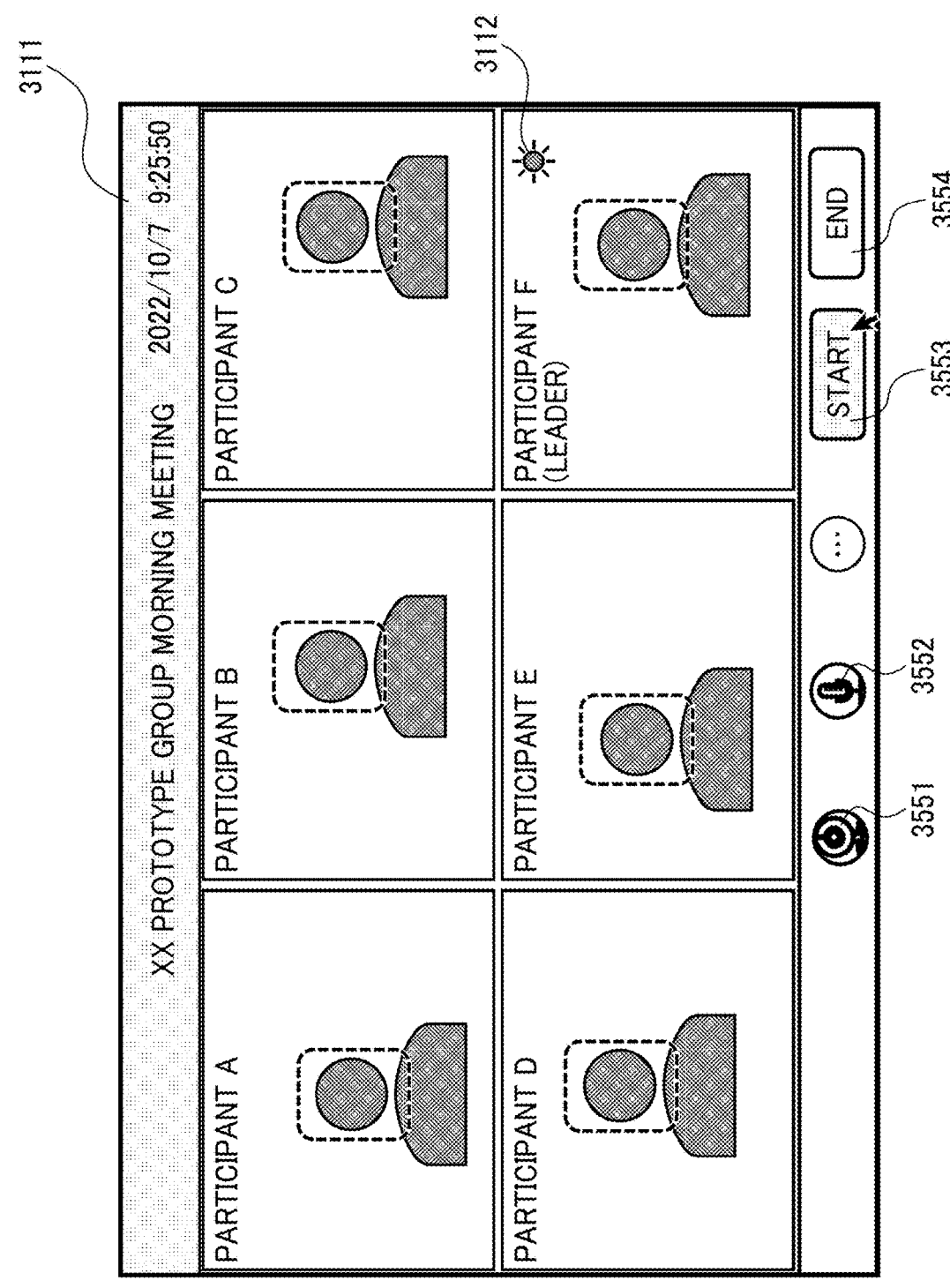
FIG. 13 is a diagram illustrating a display screen displayed on the communication terminal in an online event according to some embodiments of the disclosure.

The processing in Steps S11 to S14 described above may be performed once at the first time when the online meeting application or the online meeting web browser is activated or started. In this case, the communication terminal 3 has completed each processing of the above-described steps and has been communicably connected to the information analysis apparatus 5 for communications described below.
Information Analysis Process in Online Event Information analysis process in an online event is described below. FIG. 12 is a sequence diagram illustrating an information analysis process in an online event according to the present embodiment. As illustrated in FIG. 12, the display control unit 34 of the communication terminal 3 causes the display 307 to display an online morning meeting screen in response to the activation of the online meeting application in Step S11 of FIG. 11 (Step S101).
Screen Display A display screen on the communication terminal 3 is described below. FIG. 13 is a diagram illustrating a display screen displayed on the communication terminal when the predetermined event is held according to the present embodiment. The display control unit 34 of the communication terminal 3 displays an online morning meeting screen 3111 as illustrated in FIG. 13 on the display 307 of the communication terminal 3. The online meeting application activated on the communication terminal 3 may be a widely known meeting tool that is used online. In this case, a morning meeting (event) to be held is designated according to an operation of the user, and an online morning meeting screen is displayed on the display 307 of the communication terminal 3 in response to an operation performed with respect to, for example, an entry (participation) button or icon. On the online morning meeting screen 3111, pieces of face image data (still images or moving images) corresponding to the participants (participants A, B, C, D, E, and F (leader)) participating in the online morning meeting are arranged in order of a Z-shape from the upper left. As described above, by associating the positions of the images of the participants displayed on the communication terminal 3 with the participant information managed by the information analysis apparatus 5, the information analysis apparatus 5 can easily identify the participant included in each piece of the image data transmitted from the communication terminal 3. An image record button 3551, a voice record button 3552, a start button 3553, and an end button 3554 are displayed on the task bar. The participant can operate the above-described buttons by using, for example, a cursor to perform operations for image recording, voice recording, starting, and ending in relation to the online morning meeting. The operations are performable with the communication terminal 3 used by the leader of the group (team) participating in the online morning meeting on behalf of the other members. Alternatively, each member of the group (team) participating in the online morning meeting can perform the operations with the communication terminal 3 used by the member. Further, on the online morning meeting screen 3111, the display control unit 34 displays a speaking mark 3112 in the frame of the speaker who is currently speaking. This allows the members to visually recognize who is making a speech, or utterance, (speaking) among the members participating in the online morning meeting. On the online morning meeting screen 3111, the display control unit 34 may further display a facial expression detection monitor (a rectangular dotted line frame) that follows the movement of the face of each participant to monitor the facial expression of each participant in real time. In the present embodiment, the term "button" includes an "icon" displayed on the display 307.

Referring back to FIG. 12, the operation reception unit 32 of the communication terminal 3 receives an operation for staring an online morning meeting (Step S102). Specifically, the operation reception unit 32 receives an operation performed on the start button 3553 illustrated in FIG. 13 by the participant or the leader.

Subsequently, the acquisition unit 33 acquires image data and voice data of the participant and the storing/reading unit 39 stores the image data and the voice data (Step S103). Specifically, the acquisition unit 33 of each of the communication terminals 3 used by the corresponding participant participating in the online morning meeting acquires the image data that is related to an image including the face of the participant using the communication terminal 3 by an image acquisition unit implemented by, for example, a web camera, and the voice data that is related to an utterance of the participant by a voice acquisition unit implemented by, for example, a microphone. Subsequently, the storing/reading unit 39 stores and saves the image data and the voice data, which are acquired, in a predetermined area of the storage unit 3000. At this time, the storing/reading unit 39 of each of the communication terminals 3 used by corresponding one of the participants may individually store and save the image data and the voice data, or the storing/reading unit 39 of the communication terminal 3 used by the leader may collectively store and save the image data and the voice data. As another method, the storing/reading unit 39 may store and save the image data and the voice data using a dedicated database in alternative to the predetermined area of the storage unit 3000. While the online morning meeting is held, the storing/reading unit 39 of the communication terminal 3 may repeatedly execute the processing of Step S103 at predetermined time intervals (for example, at intervals of 5 seconds) until the next online operation that is an operation for ending the morning meeting is received, using the image acquisition unit and the voice acquisition unit described above (execution of loop processing).

Subsequently, the operation reception unit 32 receives an operation for ending the online morning meeting (Step S104). Specifically, the operation reception unit 32 receives an operation on the end button 3554 illustrated in FIG. 13.

Subsequently, the storing/reading unit 39 reads the image data and the voice data of the participant (Step S105). Specifically, the storing/reading unit 39 reads the image data and the voice data stored in Step S103 from the predetermined area of the storage unit 3000 of the communication terminal 3. At this time, the storing/reading unit 39 converts the read image data into a predetermined image (moving image) data format (for example, mp4), and converts the read voice data into a predetermined voice data format (for example, wav). Subsequently, the storing/reading unit 39 cooperates with the generation unit 57 to generate a folder for the user ID of each participant with respect to the image data and the voice data on which the format conversion has been performed.

Subsequently, the transmission/reception unit 31 transmits (uploads) the image data and the voice data of the multiple participants acquired in Step S105 to the information analysis apparatus 5 (Step S106).

Accordingly, the transmission/reception unit 51 of the information analysis apparatus 5 receives the data transmitted from the communication terminal 3. At this time, the received data includes the image data and the voice data of all users whose data is to be uploaded (all target users), and the folder generated by the e-mail address of each participant. The data to be uploaded may be recorded image and voice data that is recorded during the morning meeting by the online meeting application or the online meeting tool.

Subsequently, the storing/reading unit 59 of the information analysis apparatus 5 performs data storing processing (Step S107). Specifically, the storing/reading unit 59 stores and saves the image data and the voice data of all users whose data is to be uploaded (all target users) received in Step S106 in a predetermined area of the storage unit 5000. More specifically, the storing/reading unit 59 adds a received value to a predetermined job queue, checks a list in relation to the group (team) and an index of the result at a timing when a designated time comes, and adds the job queue. At this time, attributes of the queue include, for example, a user ID, a group (team) name, additional date and time, and attendance information indicating presence or absence of each participant.

Subsequently, the analysis processing unit 56 performs an information analysis process (Step S108). Specifically, the analysis processing unit 56 performs analysis on the state of the multiple participants who participate in the predetermined online event based on the image information (image data) and the voice information (voice data) transmitted from the communication terminal 3. Subsequently, based on the analyzed state of the multiple participants, the generation unit 57 generates report data (an example of a state notification) as a state notification that can be displayed on the communication terminal 3. The information analysis process of Step S108 is described below in detail.

Details of Information Analysis Process

Figure 14A:
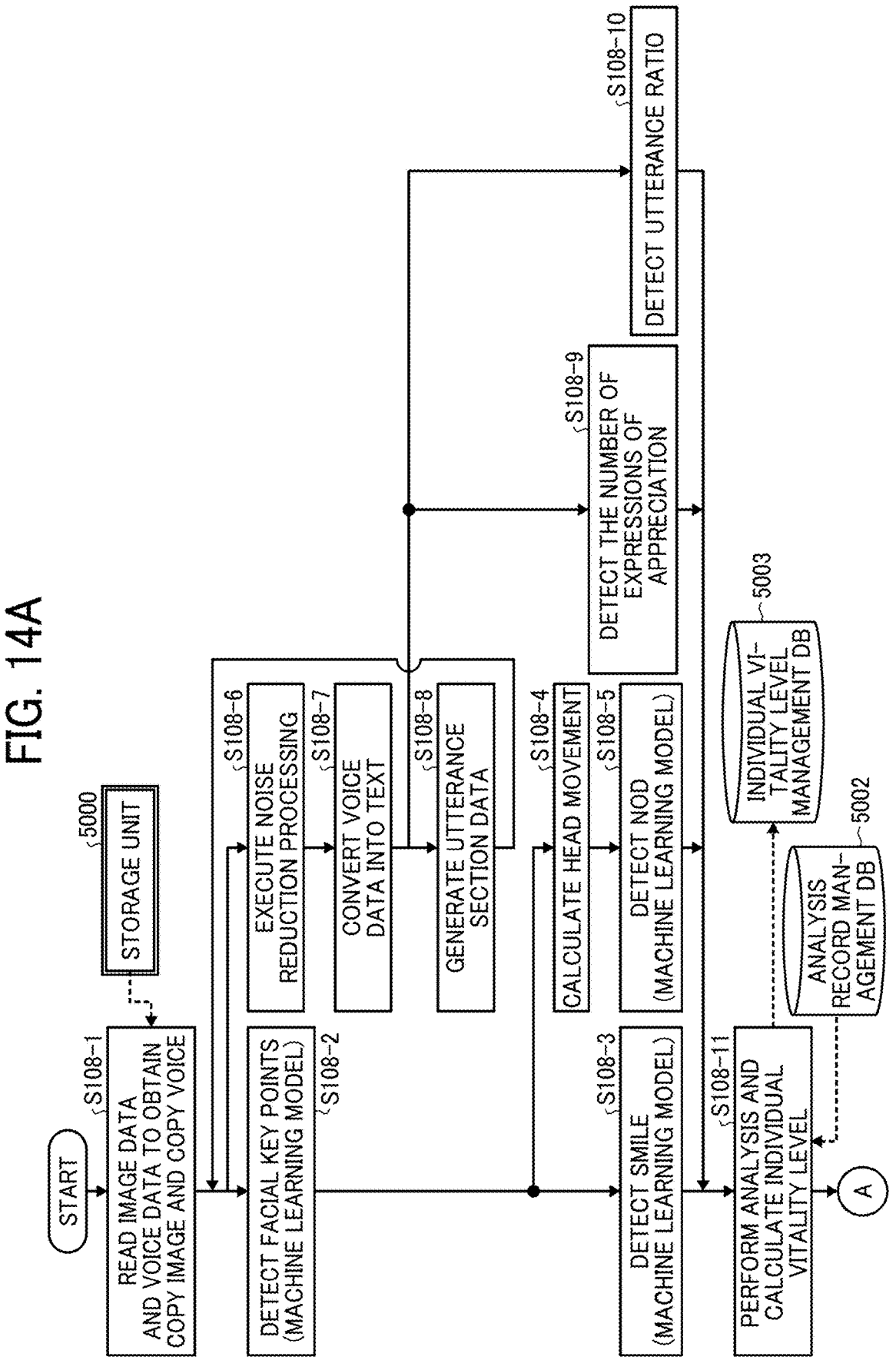
FIG. 14A is a flowchart of an information analysis process in an online event according to some embodiments of the disclosure.
Figure 14B:
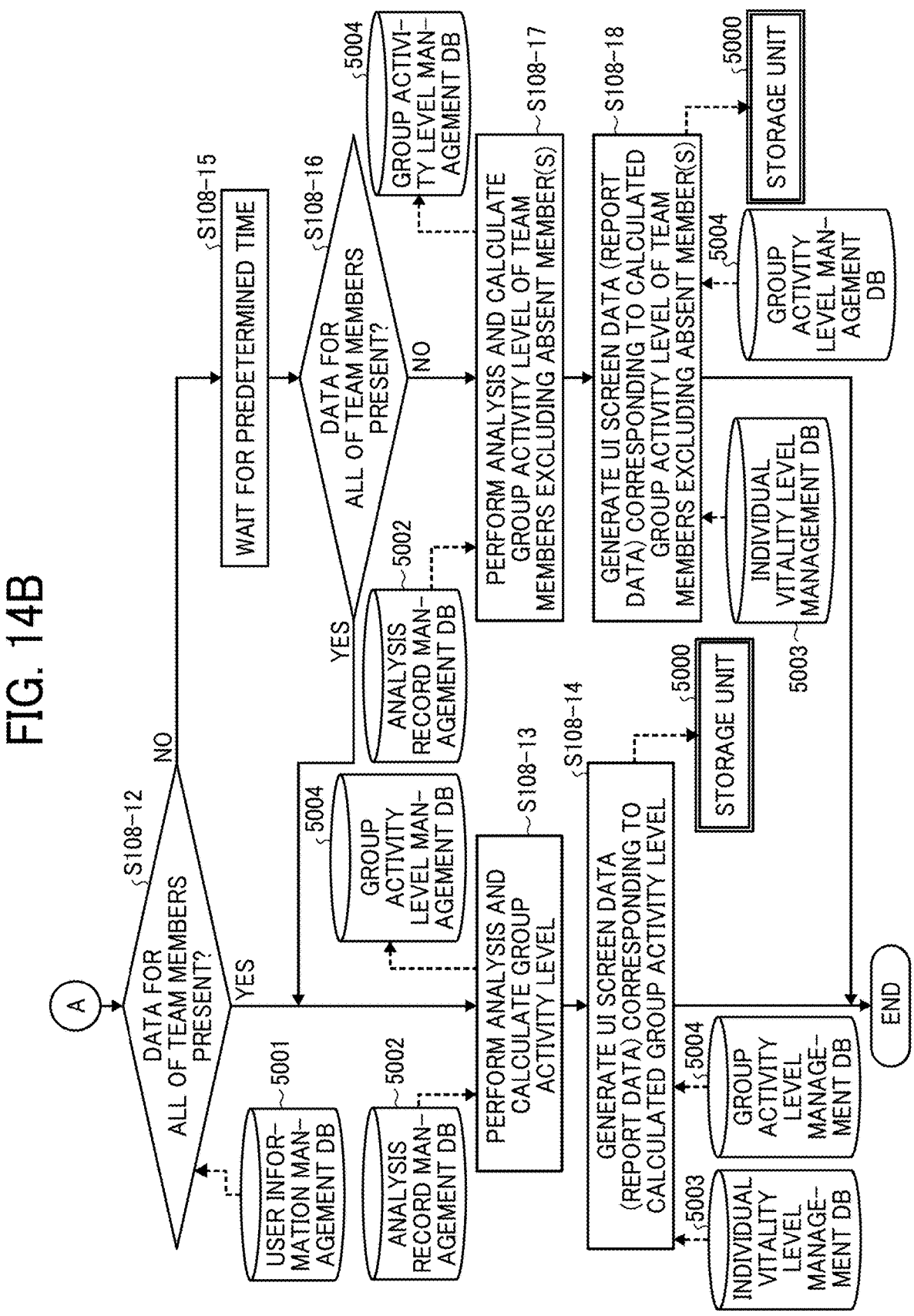
FIG. 14B is a flowchart of an information analysis process in an online event according to some embodiments of the disclosure.

Details of the information analysis process are described below. FIG. 14A and FIG. 14B are flowcharts of an information analysis process in an online event according to the present embodiment. The processing steps described below are an example of the information analysis process and are not limited thereto. In FIG. 14A, the acquisition unit 52 reads the acquired image data (image recorded date) and the voice data (voice recorded date) via the storing/reading unit 59, and acquires a copy image and a copy voice (Step S108-1). Copy image data representing the acquired copy image is used for detecting at least one of the number of nods, the number of smiles, which are described later. Further, copy voice data representing the acquired copy voice is used for detecting an utterance ratio, determining presence or absence of a speaker, and detecting expressions of appreciation, which are described later.

Subsequently, the analysis processing unit 56 detects facial key points of each participant using the machine learning model with respect to the copy image data representing the acquired copy image (Step S108-2).

Specifically, the analysis processing unit 56 detects the facial key points of each participant using a known moving image analysis package (for example, FaceMesh) for extracting a face.

Subsequently, the analysis processing unit 56 detects a smile using the machine learning model (Step S108-3). Specifically, the analysis processing unit 56 detects a smile from a face image of each participant using the facial key points detected in Step S108-2 and the trained neural network.

After executing the processing of Step S108-2, the analysis processing unit 56 calculates head movement of each participant as additional processing (Step S108-4). Specifically, the analysis processing unit 56 calculates the head movement of each participant based on the facial key points detected in Step S108-2.

Subsequently, the analysis processing unit 56 detects a nod using the machine learning model (Step S108-5). Specifically, the analysis processing unit 56 detects a nod from the face image of each participant using the calculated value of the head movement detected in Step S108-4 and the trained neural network.

After executing the processing of Step S108-1, the analysis processing unit 56 further executes noise reduction processing as additional processing (Step S108-6). Specifically, the analysis processing unit 56 executes the noise reduction processing on the copy voice data representing the acquired copy voice.

Subsequently, the analysis processing unit 56 converts the voice data into text (Step S108-7). Specifically, after executing the noise reduction processing in Step S108-6, the analysis processing unit 56 executes, for example, processing of transcribing (transcription) by a known method for transcription, namely converting from, for example, voice or sign language to characters.

Subsequently, the analysis processing unit 56 generates utterance section data in cooperation with the generation unit 57 (Step S108-8), and then the process returns to Step S108-2.

After executing the processing of Step S108-7, the analysis processing unit 56 executes, as additional processing, each of detection of the number of expressions of appreciation (Step S108-9) and detection of the utterance ratio (Step S108-10).

The smiles, the nods, the numbers of expressions of appreciation, and the utterance ratio detected in the processing of Steps S108-3, S108-5, S108-9, and S108-10, respectively, described above may be temporarily stored in a predetermined area of the storage unit 5000.

After executing the processing of each of Steps S108-3, S108-5, S108-9, and S108-10, the analysis processing unit 56 performs analysis on the individual vitality level to calculates, or obtains, the individual vitality level (Step S108-11). Specifically, the analysis processing unit 56 executes the above-described processing including the smile detection, nod detection, the detection of the number of expressions of appreciation, and the detection of the utterance ratio, and then searches the analysis record management DB 5002 (see FIG. 8) using the user ID (e-mail address) of each participant as a search key to read the corresponding smile time and the corresponding nod time. Subsequently, the analysis processing unit 56 performs analysis and calculate the individual vitality level by referring to each value detected in the above-described Steps S108-3 and S108-5 and the read values as reference values in the past record of each participant. More specifically, for example, when performing analysis to calculate the individual vitality level based on the smile of a certain participant, the analysis processing unit 56 refers to the smile time and the nod time of the participant that are managed in the analysis record management DB 5002. At this time, the analysis processing unit 56 preferably refers to a smile time and a nod time in a past event (for example, "weekly work progress" performed in the past) of which the content is the same or similar to the event (for example, "weekly work progress") to be analyzed this time.

The above-described method is an example, and the analysis processing unit 56 performs analysis of each of the smile and the nods of each participant for the calculations using such as the above-described machine learning model (trained neural network). Subsequently, the storing/reading unit 59 stores and saves the calculated individual vitality level in the item of individual vitality level for the corresponding user ID in the individual vitality level management DB 5003 (see FIG. 9). Subsequently, the process performed by the information analysis apparatus 5 transitions to the subsequent processing "circle A."

Following "circle A" in FIG. 14B, the determination unit 55 determines whether the data for all team members is present or prepared (Step S108-12). Specifically, the determination unit 55 searches the user information management DB 5001 (see FIG. 7), via the storing/reading unit 59, using the e-mail address of each participant received in Step S106 as a search key. Subsequently, the determination unit 55 compares all the participants of the group (team) participating in the event to be analyzed with the user IDs registered in the user information management DB 5001 and belonging to the group (team), and determines whether there is the data for all participants except for a pre-arranged absent member.

When it is determined that the data for all the team members is present (Step S108-12: YES), the analysis processing unit 56 performs analysis and calculates the group activity level (Step S108-13). Specifically, the analysis processing unit 56 performs analysis and calculates the group activity level based on the number of expressions of appreciation detected in Step S108-9 and the number of utterances, the utterance time, and the utterance ratio detected in Step S108-10. More specifically, the analysis processing unit 56 performs analysis and calculates the group activity level based on the individual vitality level calculated in Step S108-11, the number of utterances, the utterance time, and calculated utterance ratio managed in the analysis record management DB 5002. When the group activity level is calculated, in substantially the same manner as performing analysis and calculating the individual vitality level, the number of expressions of appreciation, the number of utterances, an utterance time, and an utterance ratio in a past event (for example, "weekly work progress" performed in the past) of which the content is the same or similar to the event (for example, "weekly work progress") to be analyzed this time are preferably referred to. The above-described method is an example, and the analysis processing unit 56 performs analysis and calculate the group activity level based on the analysis results for all team members, using such as the above-described machine learning model (trained neural network). Subsequently, the storing/reading unit 59 stores and saves the calculated group activity level in the item of the event score in the group activity level management DB 5004 (see FIG. 10).

Subsequently, the generation unit 57 generates user interface (UI) screen data (report data) corresponding to the calculated group activity level (Step S108-14). Specifically, the generation unit 57 refers to the individual vitality level management DB 5003 (see FIG. 9) and the group activity level management DB 5004 (see FIG. 10), and generates report data corresponding to the individual vitality level calculated in Step S108-11 and the event score (group activity level) calculated in Step S108-13. The report data includes a feedback comment to each participant or the leader of the group (team) participating in the online morning meeting. The feedback comment included in the report data may be generated by the information analysis apparatus 5 as appropriate based on each calculated score or may be selected from multiple comments prepared in advance.

Subsequently, the storing/reading unit 59 stores the generated report data in a predetermined area of the storage unit 5000, and the process ends. At this time, the process may end after the analysis processing unit 56 deletes from the job queue the target job that has been completed. The information analysis process including the determination processing of Step S108-12 is performed every time data for each individual member is registered in the batch processing.

When it is determined that a part or all of the data for all team members is not present, or prepared, (Step S108-12: NO), the analysis processing unit 56 waits for a predetermined time (Step S108-15), and then the determination unit 55 determines again whether the data for all team members is present, or prepared (Step S108-16).

When the data for all team members is present, or prepared, after waiting for the predetermined time (Step S108-16: YES), the determination unit 55 executes the processing of the above-described Steps S108-13 and S108-14, and then the process ends.

On the other hand, when a part of or all of the data for all team members is not present, or prepared, even after waiting for the predetermined time (Step S108-16: NO), the analysis processing unit 56 performs analysis and calculates the group activity level excluding an absent member (Step S108-17). Specifically, the analysis processing unit 56 performs analysis and calculates the group activity level with respect to participants for each of which the data is currently present, or has been prepared, based on the data for the number of expressions of appreciation detected in Step S108-9 and the number of utterances, the utterance time, and the utterance ratio detected in Step S108-10. More specifically, the analysis processing unit 56 performs analysis and calculates the group activity level with respect to the participants for each of which the data is currently present, or has been prepared, based on the individual vitality level calculated in Step S108-11, the number of utterances, the utterance time, and calculated utterance ratio managed in the analysis record management DB 5002. Since the method of the processing at this time is substantially the same as the method in Step S108-13 described above, the redundant description is omitted.

Subsequently, the generation unit 57 generates UI screen data (report data, for example, a portable document format (PDF)) (Step S108-18). The report data generation in Step S108-18 may be performed in substantially the same manner as that described in Step S108-14. Subsequently, the storing/reading unit 59 stores the generated report data in a predetermined area of the storage unit 5000, and the process ends.

In the above-described Step S108-15, the information analysis apparatus 5 may set a predetermined deadline (predetermined time) in advance, and may execute the processing of Step S108-17 and the subsequent processing steps by regarding a participant (member) whose data is absent at the time of deadline as an absent member. Further, the information analysis apparatus 5 may repeat the determination processing of Step S108-16 for a predetermined time (perform loop processing) in alternative to the determination processing of Step S108-16 performed after waiting for the predetermined time of Step S108-15.

Referring back to FIG. 12, the transmission/reception unit 51 of the information analysis apparatus 5 transmits the report data generated in Step S108 for each case to the communication terminal 3 (Step S109). As a result, the transmission/reception unit 31 of the communication terminal 3 receives the report data transmitted from the information analysis apparatus 5.

Transmitting the report from the information analysis apparatus 5 in Step S109 may be executed in the middle of the event (before the event ends).

The information analysis apparatus 5 may generate the report in the following manner in Step S108 in alternative to transmitting the report to the communication terminal 3 in Step S109, which is described above. For example, the information analysis apparatus 5 may generate the report that can be displayed on a web browser operated on the communication terminal 3 in response to an operation of accessing the web browser by the participant (user) who uses the communication terminal 3. More specifically, after generating such a report, in alternative to automatically transmitting the report to the participant (for example, the leader) by, for example, e-mail, the information analysis apparatus 5 may store the generated report on a web browser and display the generated report on the web browser when the leader accesses the web browser. In this case, for example, the following process may be performed to provide and display the generated report.

After the analysis on the online morning meeting is completed, a generated report is stored in the information analysis apparatus 5 or a dedicated server.

The web browser is accessed by the user included in the participants participating in the online morning meeting.

The report is delivered from a database (DB) managed by the information analysis apparatus 5 or the dedicated server, and the report is displayed on the web browser.

Subsequently, the display control unit 34 of the communication terminal 3 displays the report received in Step S109 on the display 307 (Step S110). At this time, the display control unit 34 may display the e-mail transmitted by the information analysis apparatus 5 on the display 307 of the communication terminal 3 as a report, or may display the details of the report on the web browser.

Screen Display

A report display screen displayed on the communication terminal 3 according to the present embodiment is described below. Regarding displaying a screen on the communication terminal 3, a known screen display method may be used to display a predetermined image on the display 307 of the communication terminal 3. The report included in a UI screen illustrated in FIG. 15 or subsequent figures presents, for example, an overall summary including a morning meeting score and a vitality score (individual vitality level) in the online morning meeting, and then presents detailed information including information on nods and smiles of each participant. The contents and display modes of the report illustrated in FIGS. 15 to 22 are merely examples, and the present disclosure is not limited thereto.

Morning Meeting Score (Group Activity Level)

FIG. 15 is a diagram illustrating a report display screen (morning meeting score) displayed on the communication terminal according to the present embodiment. As illustrated in FIG. 15, the display control unit 34 of the communication terminal 3 displays a morning meeting score screen 3121 on the display 307 of the communication terminal 3. The morning meeting score screen 3121 displays the group activity level (morning meeting score) based on the individual vitality level of each participant calculated in Step S108-11.

The details include the score for nods, the score for smiles, the score for speakers, the score for utterance ratio, and the score for appreciation, and each of the scores is represented by, for example, out of a maximum of 20 points. Then, the total score out of the highest points (100 points) is displayed as a total evaluation score. The morning meeting score screen 3121 includes a comment in addition to the score as a summarized evaluation. This allows each participant or the leader of the group (team) who has received the report to refer to the points and the comment that have been notified and utilize the information including the scores and the comment for the next online morning meeting of the group (team). In FIG. 15, the group activity level is represented by the numeral value of the score, but may be given by, for example, a symbol or a mark in alternative to the score. For example, a mark or symbol indicating sun, clouds, or rain may be used. Such a display mode can be applied to each of all items displayed as a score below.

Vitality Level (Individual Vitality Level)

FIG. 16 is a diagram illustrating a report display screen (vitality score) on the communication terminal according to the present embodiment. As illustrated in FIG. 16, the display control unit 34 of the communication terminal 3 displays a vitality score screen 3131 on the display 307 of the communication terminal 3. The vitality score based on the individual vitality level calculated in Step S108-11 is displayed on the vitality score screen 3131. The details of the vitality score screen 3131 include the vitality score of each participant in the event (for example, a morning meeting) held on a certain date and time, and the vitality score is represented by, for example, a score out of 10 points. On the vitality score screen 3131, a comment on the score of the participants is further added as a summarized evaluation. This allows each participant or the leader of the group (team) who has received the report to grasp the individual vitality of each participant at a time. In particular, when there is a participant with a low score, an alert can be made in relation to the participant with the low score to prompt the leader to communicate with the participant with the low score.

In FIGS. 15 and 16, from the viewpoint of individual information protection (personal information protection), the individual information (personal information) of each member is not returned to all the participants or the leader as it is, but only the score of the entire team and the result of the score of the participant may be returned the corresponding participant.

Past Online Morning Meeting Score

Figure 17:
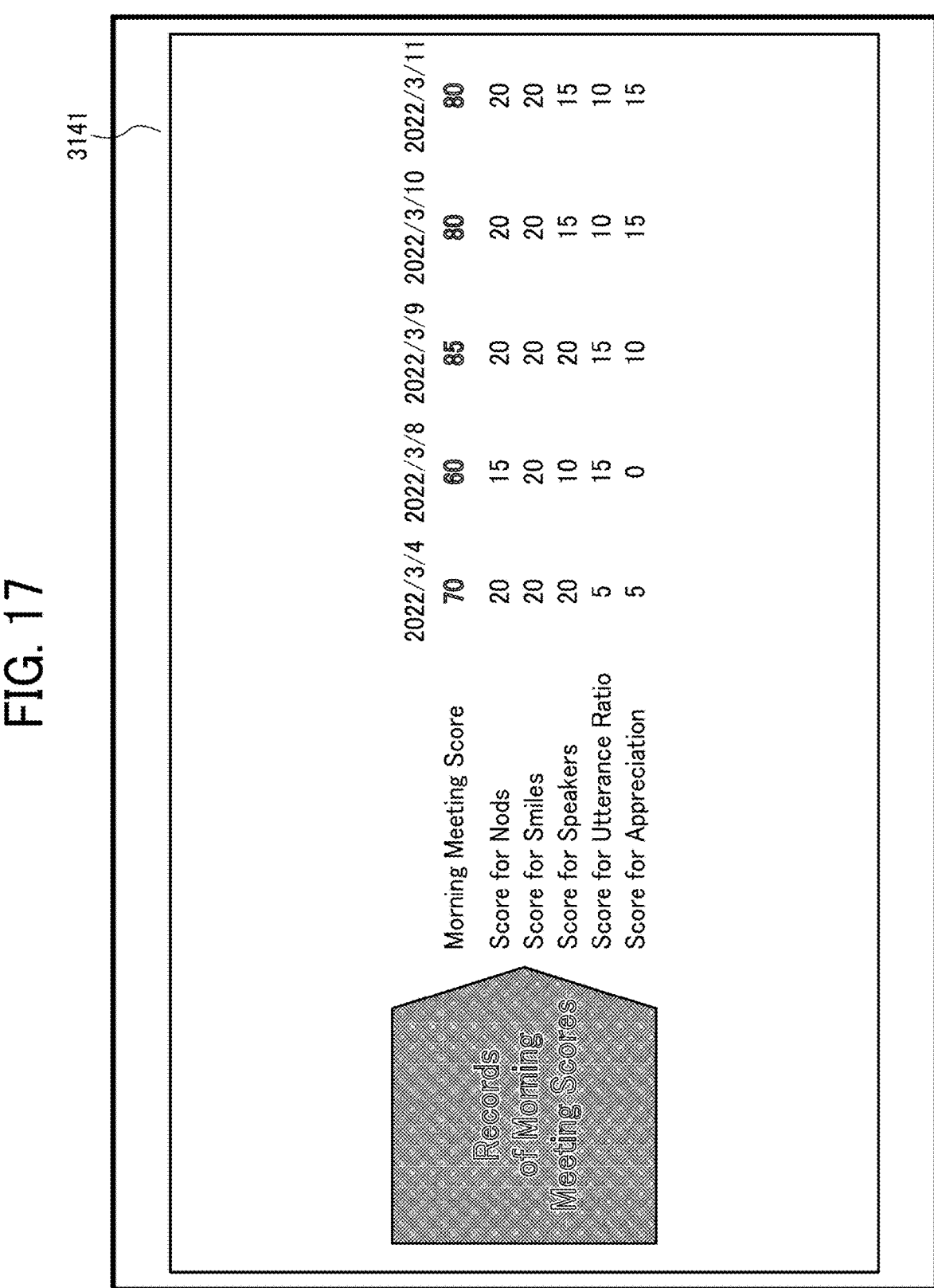
FIG. 17 is a diagram illustrating a report display screen (records of online morning meeting score) displayed on the communication terminal according to some embodiments of the disclosure.

FIG. 17 is a diagram illustrating a report display screen (records of online morning meeting score) displayed on the communication terminal according to the present embodiment. As illustrated in FIG. 17, the display control unit 34 of the communication terminal 3 displays a past morning meeting score screen 3141 on the display 307 of the communication terminal 3. The past morning meeting score screen 3141 displays records of morning meeting scores based on the individual vitality level of each participant calculated in Step S108-11. The details of the past morning meeting score screen 3141 include the score for nods, the score for smiles, the score for speakers, the score for utterance ratio, and the score for appreciation of the group (team) in the past several morning meetings including the latest morning meeting. Each of the score for nods, the score for smiles, the score for speakers, the score for utterance ratio, and the score for appreciation are represented by a score out of 20 points. The result on the past morning meeting score screen 3141 may be displayed in a chart (for example, a graph format or a table format) in which the date and time of the past online morning meeting is associated with each point. This allows each participant or the leader of the group (team) who has received the report to grasp the scores of the participant in the past online morning meetings at once, and speculate a change in the participant in relation to the factors such as a change in date and time and the content of the morning meeting.

Score for Nods

Figure 18:
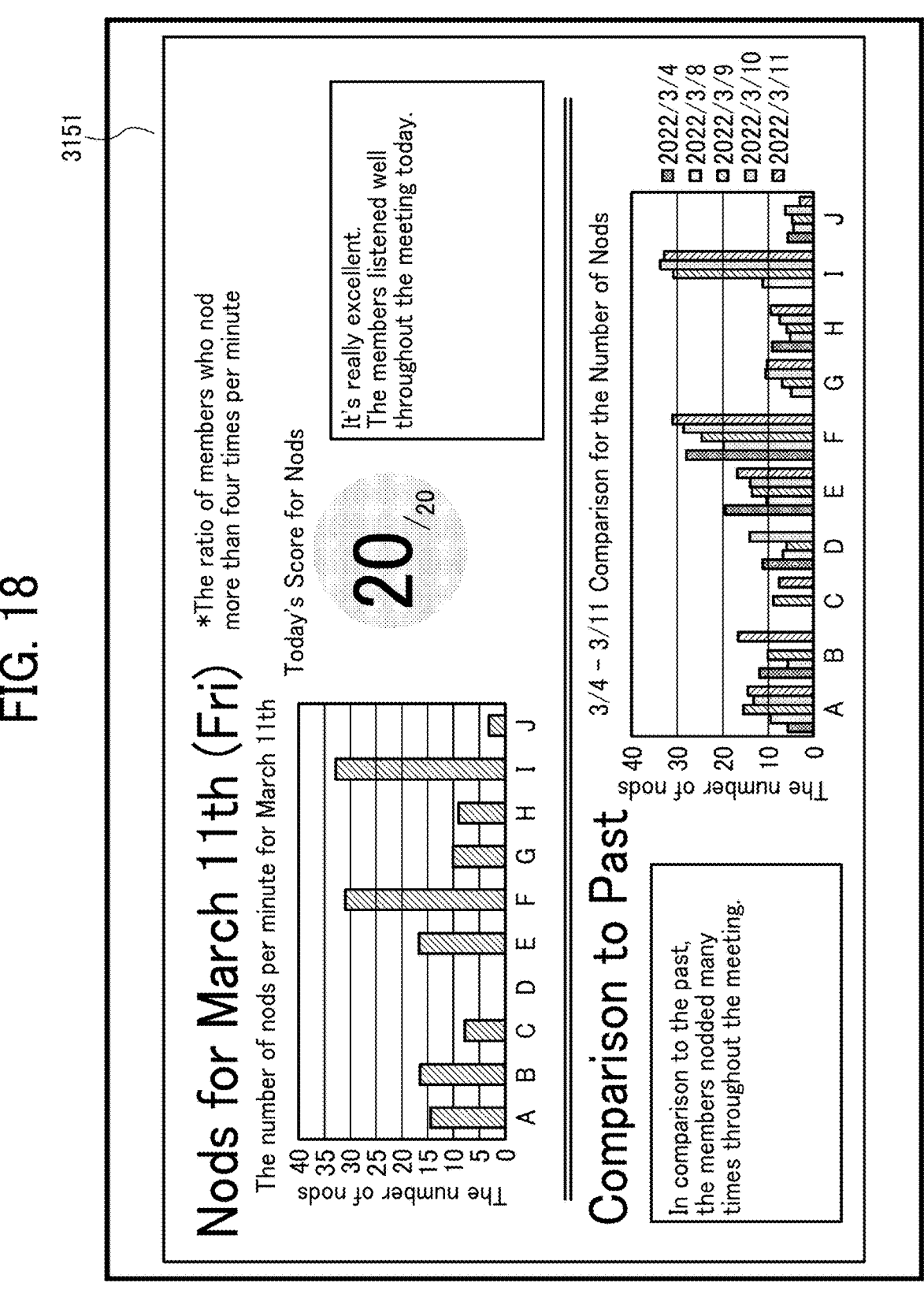
FIG. 18 is a diagram illustrating a report display screen (for nod detection) displayed on the communication terminal according to some embodiments of the disclosure.

FIG. 18 is a diagram illustrating a report display screen (for nod detection) on the communication terminal according to the present embodiment.

As illustrated in FIG. 18, the display control unit 34 of the communication terminal 3 displays a nod score screen (screen for displaying a score for nods) 3151 on the display 307 of the communication terminal 3. On the nod score screen 3151, the number of nods (the number of times of nodding) and the score for nods corresponding to the participant whose number of nods per minute is four or more based on the individual vitality level calculated in Step S108-11 are displayed in a graph format and as a score. The upper graph on the nod score screen 3151 illustrates a result of the analysis on the meeting this time, and the lower graph illustrates a result of comparison with the past. Further, a comment corresponding to the score for nods and a comment based on the comparison with the past are displayed as feedback on the nod score screen 3151. This allows each participant or the leader of the group (team) who has received the report to easily grasp the result of the event and compare the result of the analysis on the event this time and another result of analysis on another event in the past. In the present embodiment, the number of nods (the number of times of nodding) is counted to be analyzed. In some embodiments, a nod time (total period of nodding) is used to be analyzed in alternative to the number of nods.

Score for Smiles

Figure 19:
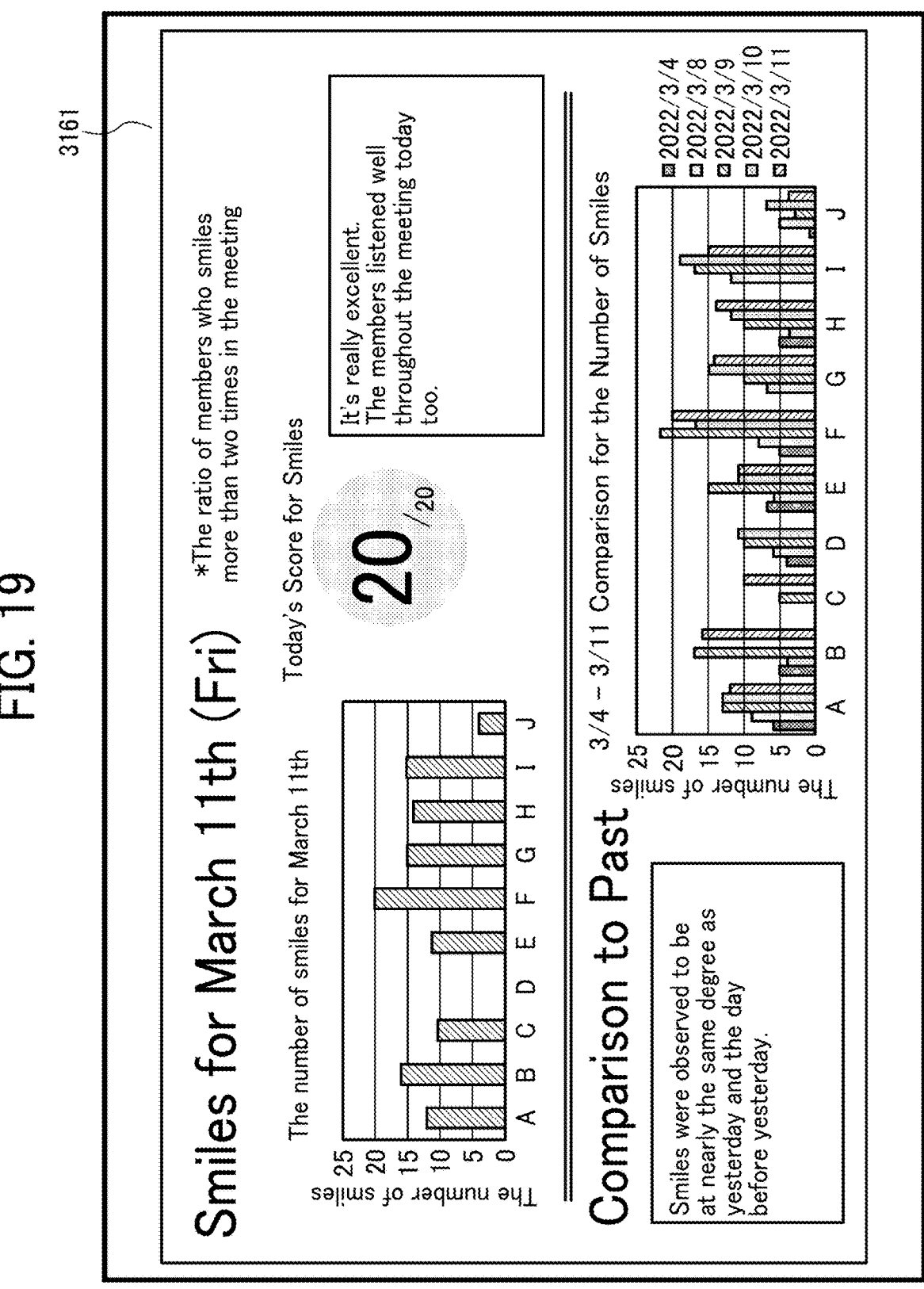
FIG. 19 is a diagram illustrating a report display screen (for smile detection) displayed on the communication terminal according to some embodiments of the disclosure.

FIG. 19 is a diagram illustrating a report display screen (for smile detection) on the communication terminal according to the present embodiment.

As illustrated in FIG. 19, the display control unit 34 of the communication terminal 3 displays a smile score screen (screen for displaying a score for smiles) 3161 on the display 307 of the communication terminal 3. On the smile score screen 3161, the number of smiles (the number of times of smiling) and the score for smiles corresponding to the participant whose number of smiles is two or more based on the individual vitality level calculated in Step S108-11 are displayed in a graph format and as a score. The upper graph on the smile score screen 3161 illustrates a result of the analysis on the meeting this time, and the lower graph illustrates a result of comparison with the past. Further, a comment corresponding to the score for smiles and a comment based on the comparison with the past are displayed as feedback on the smile score screen 3161. This allows each participant or the leader of the group (team) who has received the report to easily grasp the result of the event and compare the result of the analysis on the event this time and another result of analysis on another event in the past. In the present embodiment, the number of smiles (the number of times of smiling) is counted to be analyzed. In some embodiments, a smile time (total period of smiling) is used to be analyzed in alternative to the number of smiles.

Score for Utterance Ratio

FIG. 20 is a diagram illustrating a report display screen (for utterance ratio) on the communication terminal according to the present embodiment. As illustrated in FIG. 20, the display control unit 34 of the communication terminal 3 displays an utterance ratio score screen (screen for displaying a score for utterance ratio) 3171 on the display 307 of the communication terminal 3. On the utterance ratio score screen 3171, the utterance time of the participants other than the facilitator, which is for example, the leader, as the utterance ratio of the facilitator based on the individual vitality level calculated in Step S108-11 is displayed in a graph format and as a score. The upper graph on the utterance ratio score screen 3171 illustrates a result of the analysis on the meeting this time, and the lower graph illustrates a result of comparison with the past. Further, a comment corresponding to the score for utterance ratio and a comment based on the comparison with the past are displayed as feedback on the utterance ratio score screen 3171. This allows each participant or the leader of the group (team) who has received the report to easily grasp the relationship between utterance times of the participants other than the facilitator and compare the utterance times.

Score for Speakers

FIG. 21 is a diagram illustrating a report display screen (for speakers) displayed on the communication terminal according to the present embodiment. As illustrated in FIG. 21, the display control unit 34 of the communication terminal 3 displays a speaker score screen (screen for displaying a score for speakers) 3181 on the display 307 of the communication terminal 3. On the speaker score screen 3181, results related to the number of speakers based on the individual vitality level calculated in Step S108-11 is displayed by using check mark.

The table in the upper part of the speaker score screen 3181 illustrates a result of the analysis on the meeting this time, and the graph in the lower part illustrates a result of comparison with the past. Further, a comment corresponding to the result in relation to utterances (speaking, speeches) of speakers and a comment based on the comparison with the past are displayed as feedback on the speaker score screen 3181. This allows each participant or the leader of the group (team) who has received the report to easily grasp the state in relation to the utterance of the participants and compare between the participants other than the facilitator in relation to the utterances. Further, for example, if a greeting at the beginning of the meeting is counted as an utterance, or a speech, almost all participants are counted as speakers. Accordingly, a threshold value (for example, more than 6 seconds) is set to be counted as a single speech, or a single utterance. Accordingly, a simple greeting or a short answer or reply to a question is not recognized as a speech, or an utterance. In the present embodiment, the score for speakers is indicated by using a check mark. In some embodiments the score for speakers is indicated by, for example, a bar graph.

Score for Appreciation

Figure 22:
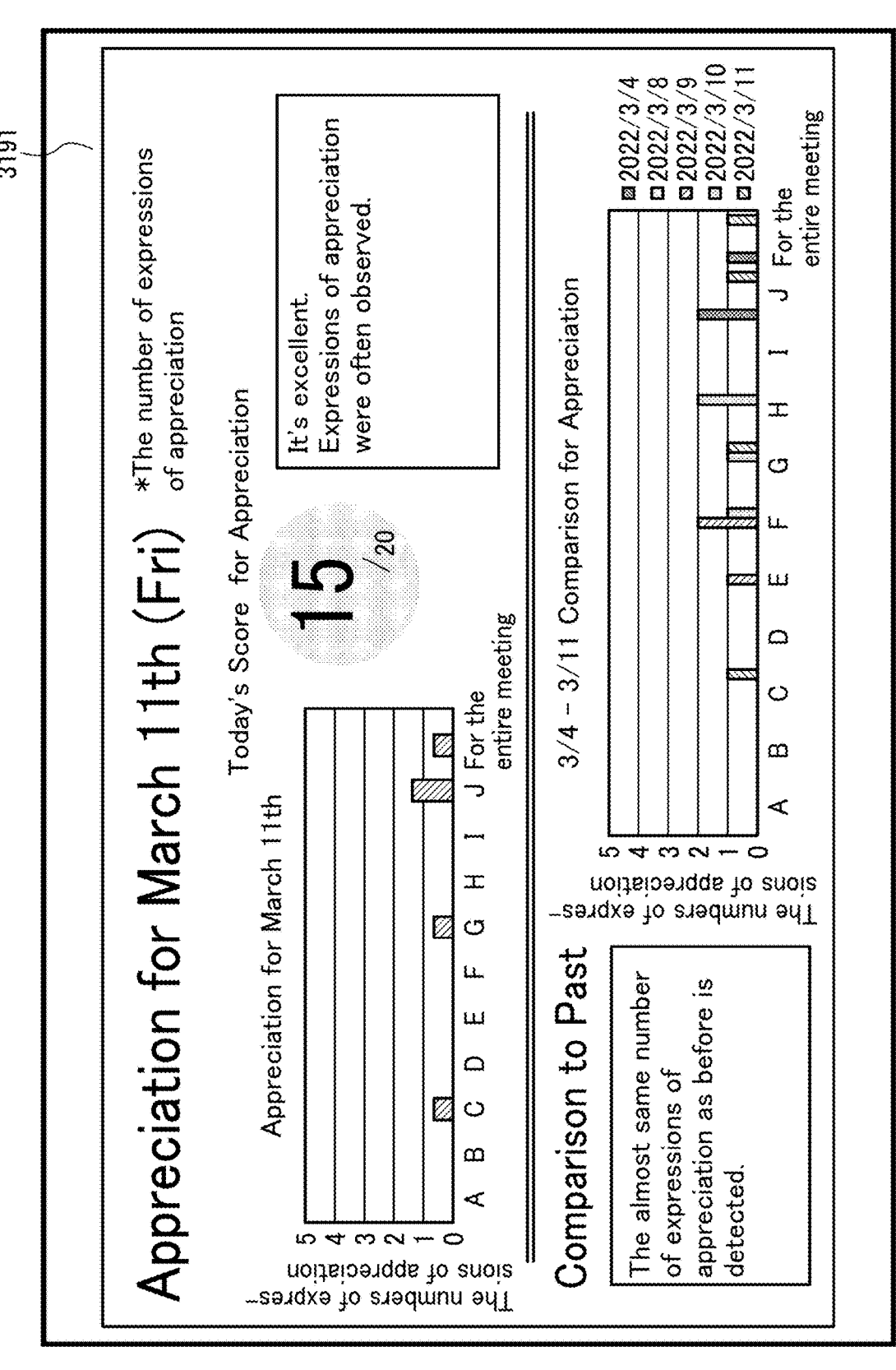
FIG. 22 is a diagram illustrating a report display screen (for detection of expression of appreciation) displayed on the communication terminal according to some embodiments of the disclosure.

FIG. 22 is a diagram illustrating a report display screen (for detection of expression of appreciation) on the communication terminal according to the present embodiment. As illustrated in FIG. 22, the display control unit 34 of the communication terminal 3 displays an appreciation score screen (screen for displaying a score for appreciation) 3191 on the display 307 of the communication terminal 3. On the appreciation score screen 3191, the number of expressions of appreciation based on the individual vitality level calculated in Step S108-11 is displayed in a graph format and as a score. The expressions of appreciation in this case may be, for example, words such as "thank you," "It was helpful," and "Thanks to XXX" with respect to the utterance, and may include expressions, or words, of appreciation not only in English or Japanese but also in another foreign language. The table in the upper part of the appreciation score screen 3191 illustrates a result of the analysis on the meeting this time, and the graph in the lower part illustrates a result of comparison with the past. Further, a comment corresponding to the number of expression of appreciation between the participants and a comment based on the comparison with the past are displayed as feedback on the appreciation score screen 3191. This allows each participant or the leader of the group (team) who has received the report to easily grasp how much degree of appreciation each participants has.

In the information analysis system according to the present embodiment, for example, when the processing of each of Steps S106 and S109 described above is executed, another device may be present between the communication terminal 3 and the information analysis apparatus 5. In other words, the information (data) transmitted or received between the communication terminal 3 and the information analysis apparatus 5 may be transmitted and received via another device. The above-described configuration can be applied to a case where another processing step exists between the communication terminal 3 and the information analysis apparatus 5.

According to the first embodiment described above, the communication terminal 3 in the information analysis system 1 acquires the image data including the face of each participant using, for example, a web camera and the voice data related to the utterance of each participant using, for example, a microphone (Step S103), and transmits the acquired image data and the voice data of the multiple participants to the information analysis apparatus 5 (Step S106).

The information analysis apparatus 5 performs analysis on the state of the multiple participants based on the image data and the voice data transmitted from the communication terminal 3, and generates a report related to an analysis result that can be displayed on the communication terminal 3 (Step S108). Accordingly, even in an online event, the state of the participants can be grasped based on not only the utterance but also the facial expression, and information obtained based on the utterance and the facial expression can be utilized.

Second Embodiment

A second embodiment is described below. In the second embodiment, each of the multiple communication terminals 3 used by corresponding one of multiple participants participating in an online morning meeting, which is an example of an online event, performs video recording and voice recording for the corresponding one of the multiple participants, and individually transmits video record data and voice record data to the information analysis apparatus 5. Accordingly, the hardware resources included in the communication terminal 3 and the information analysis apparatus 5 included in the information analysis system 1 are substantially the same as those in the first embodiment, and thus the redundant description is omitted. Further, the functional configurations of the communication terminal 3 and the information analysis apparatus 5 are also substantially the same as those in the first embodiment, and the redundant description is omitted.

Information Analysis Process in Online Event

Figure 23:
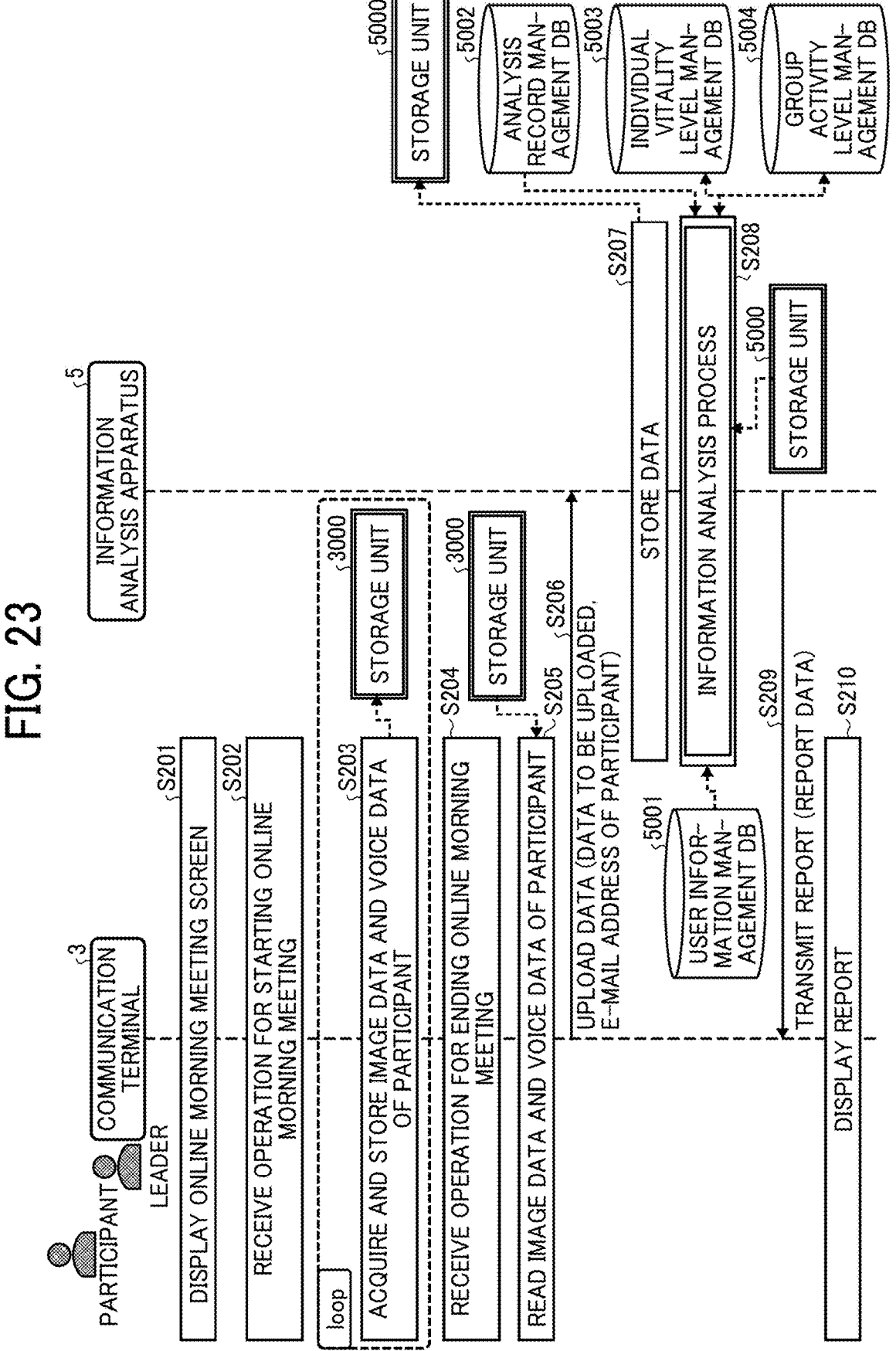
FIG. 23 is a sequence diagram illustrating an information analysis process in an online event according to a second embodiment of the disclosure.

Information analysis process in an online event is described below. FIG. 23 is a sequence diagram illustrating an information analysis process in an online event according to the second embodiment. The processing of Step S201 (displaying an online morning meeting screen) and the processing of S202 (receiving an operation for starting the online morning meeting) illustrated in FIG. 23 are substantially the same as the processing of Step S101 and the processing of S102 described in the first embodiment. The online event in the second embodiment is an online morning meeting as well as the first embodiment.

Screen Display

Figure 24:
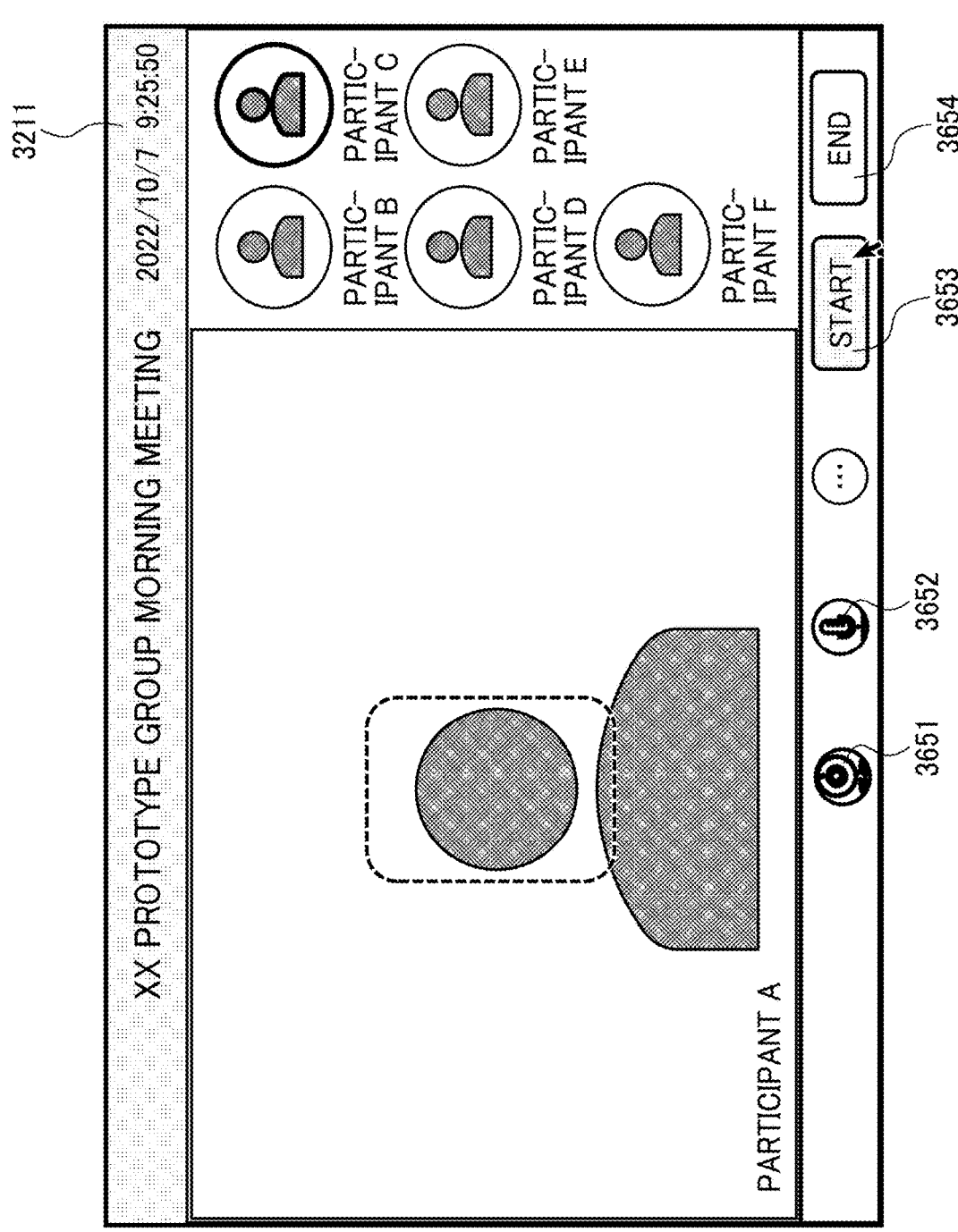
FIG. 24 is a diagram illustrating a display screen displayed on the communication terminal in an online event according to the second embodiment of the disclosure.

A display screen on the communication terminal 3 is described below. FIG. 24 is a diagram illustrating a display screen displayed on the communication terminal in the online event according to the second embodiment. The display control unit 34 of the communication terminal 3 displays an online morning meeting screen 3211 as illustrated in FIG. 24 on the display 307 of the communication terminal 3. The online meeting application activated on the communication terminal 3 may be a widely known meeting tool that is used online. In the present embodiment, the morning meeting (event) to be held is designated according to an operation of each of users who are to participate in the online morning meeting, and an online morning meeting screen is displayed on the display 307 of each of the communication terminals 3 in response to an operation performed with respect to, for example, an entry (participation) button or icon. On the online morning meeting screen 3211, face image data (still image or moving image) of a participant A participating in the online morning meeting is displayed. At this time, images of the other participants B, C, D, E, and F are displayed beside the image of the participant A in a size smaller than the face image of the participant A. Accordingly, the facial expression detection monitor is activated for the facial expression of the participant A in a display mode of the present embodiment. An image record button 3651, a voice record button 3652, a start button 3653, and an end button 3654 are displayed on the task bar. Each participant can operate the above-described buttons displayed on the display 307 of the corresponding communication terminal 3 by using, for example, a cursor to perform operations for image recording, voice recording, starting, and ending in relation to the online morning meeting at his or her desired timing. Further, the display control unit 34 may display the online morning meeting screen 3211 in a manner that a frame of a speaker who is speaking is displayed thick or in a blink manner. This allows the members to visually recognize who is making a speech, or utterance, (speaking) among the members participating in the online morning meeting.

Referring back to FIG. 23, the acquisition unit 33 acquires image data and voice data of the participant, and the storing/reading unit 39 stores the image data and the voice data (Step S203). Specifically, the acquisition unit 33 of each of the communication terminals 3 used by the participants participating in the online morning meeting acquires the image data representing an image including the face of the corresponding participant using the communication terminal 3 by an image acquisition unit implemented by, for example, a web camera, and the voice data related to the utterance of the corresponding participant using the communication terminal 3 by a voice acquisition unit implemented by, for example, a microphone. Subsequently, the storing/reading unit 39 stores and saves the image data and the voice data, which are acquired, in a predetermined area of the storage unit 3000. While the online morning meeting is being held, the storing/reading unit 39 of the communication terminal 3 may repeatedly execute the processing of Step S203 at predetermined time intervals (for example, at intervals of 5 seconds) until the next operation for ending the online morning meeting is received, using the image acquisition unit and the voice acquisition unit, which are described above (execution of loop processing).

The processing in the subsequent Step S204 is substantially the same as the processing of Step S104 described in the first embodiment.

Subsequently, the storing/reading unit 39 reads the image data and the voice data of the participant (Step S205). Specifically, the storing/reading unit 39 reads the image data and the voice data stored in Step S203 from the predetermined area of the storage unit 3000 of the communication terminal 3. At this time, the storing/reading unit 39 converts the read image data into a predetermined image (moving image) data format (for example, mp4), and converts the read voice data into a predetermined voice data format (for example, wav). Subsequently, the storing/reading unit 39 cooperates with the generation unit 57 to generate a folder for the user ID of each participant with respect to the image data and the voice data on which the format conversion has been performed.

Subsequently, the transmission/reception unit 31 of each of the communication terminals 3 transmits (uploads) the data acquired in Step S205 to the information analysis apparatus 5 at a desired timing determined by the communication terminal 3 (Step S206). Accordingly, the transmission/reception unit 51 of the information analysis apparatus 5 receives the data transmitted by each of the communication terminals 3. At this time, the received data transmitted from each of the communication terminals 3 includes the image data and the voice data of the corresponding participant whose data is to be uploaded, and the folder generated by the e-mail address of the participant. The data to be uploaded may be recorded image and voice data that is recorded during the morning meeting by the online meeting application or the online meeting tool that is activated or started by each of the communication terminals 3.

The processing from Step S207 to Step S210 is the same as the processing from Step S107 to Step S110 described in the first embodiment, and the redundant description is omitted.

Regarding the above-described embodiments, a desired combination between the method for acquiring and storing the image data and voice data and the method for uploading the data in the first embodiment and the method for acquiring and storing the image data and voice data and the method for uploading the data in the second embodiment may be used.

According to the second embodiment described above, each of the communication terminals 3 in the information analysis system 1 acquires image data and voice data of the corresponding participant at a desired timing of the participant, and uploads the image data and the voice data, which are acquired, to the information analysis apparatus 5 at a desired timing. Accordingly, in addition to the effect of the first embodiment, this prevents a specific person such as the leader of the group (team) to carrying the load alone such as acquiring the image data and the voice data of the participants and uploading the data. This reduces the load of the specific person such as the leader of the group (team) to which each of the participants belongs to.

Modification of Embodiment

One of the modifications of the above-described embodiments of the disclosure is described below. In the present modification of the above-described embodiments, a system configuration, a hardware configuration, and a functional configuration are substantially the same as those of the first embodiment in the first embodiment and the second embodiment, and thus the redundant description is omitted. In the present modification, the image data and the voice data of each participant acquired by the communication terminal 3 are transmitted (uploaded) to the information analysis apparatus 5 in the middle of the online event without waiting for the end of the online event.

Information Analysis Process in Online Event

Figure 25:
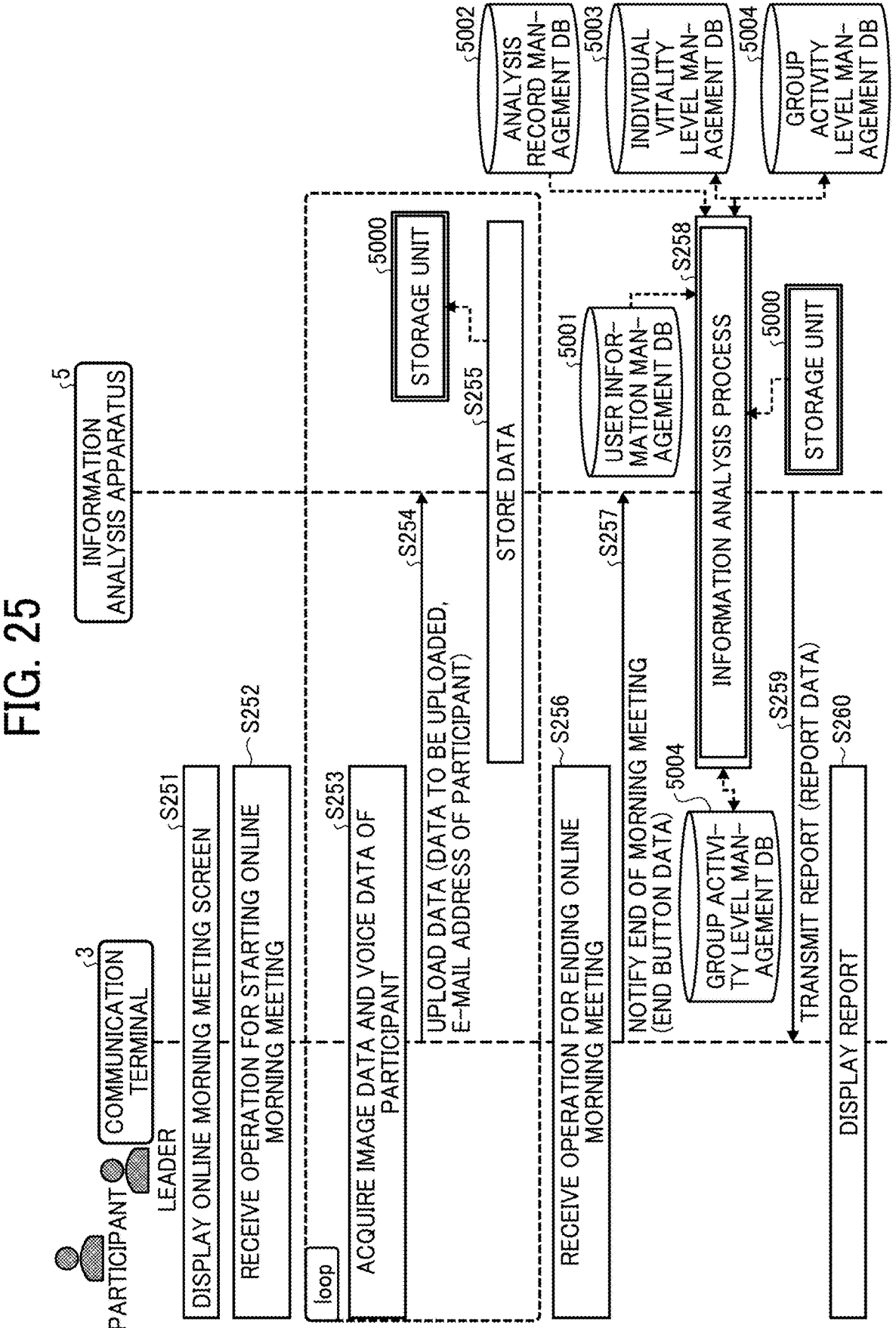
FIG. 25 is a sequence diagram illustrating an information analysis process in an online event according to one of the modifications of embodiments of the disclosure.

An information analysis process in an online event is described below. FIG. 25 is a sequence diagram illustrating an information analysis process in an online event according to the one of the modifications of the above-described embodiments. The processing of Step S251 (displaying an online morning meeting screen) and the processing of S252 (receiving an operation for starting the online morning meeting) illustrated in FIG. 25 are substantially the same as the processing of Step S101 and the processing of S102 described in the first embodiment. The online event in the present modification is an online morning meeting as well as the first embodiment.

Subsequently, the acquisition unit 33 acquires the image data and the voice data of the participant (Step S253). Specifically, the acquisition unit 33 of each of the communication terminals 3 used by the corresponding participant participating in the online morning meeting acquires the image data that is related to an image including the face of the participant using the communication terminal 3 by an image acquisition unit implemented by, for example, a web camera, and the voice data that is related to an utterance of the participant by a voice acquisition unit implemented by, for example, a microphone.

Subsequently, the transmission/reception unit 31 of the communication terminal 3 transmits (uploads) the data acquired in Step S253 to the information analysis apparatus 5 (Step S254). Accordingly, the transmission/reception unit 51 of the information analysis apparatus 5 receives the data transmitted from each communication terminal 3. At this time, the received data includes the image data and the voice data of each participant whose data is to be uploaded, and a folder generated by an e-mail address of the participant. The data to be uploaded may be recorded image and voice data that is recorded during the morning meeting by the online meeting application or the online meeting tool that is activated or started by each of the communication terminals 3.

Since the processing of Step S255 is the same as the processing of Step S107 described in the first embodiment, the redundant description is omitted. The processing of Steps S253 to S255 may be repeatedly executed at predetermined time intervals (for example, at intervals of 5 seconds) until the next operation for ending the online morning meeting is received (execution of loop processing).

The operation reception unit 32 of the communication terminal 3 receives an operation for ending the online morning meeting (Step S256).

Subsequently, the transmission/reception unit 31 transmits a morning meeting end notification to the information analysis apparatus 5 (Step S257). Accordingly, the transmission/reception unit 51 of the information analysis apparatus 5 receives the morning meeting end notification transmitted by the communication terminal 3. At this time, the morning meeting end notification includes end notification button information indicating the end of the morning meeting.

Since the subsequent processing that is from Step S258 to Step S260 is the same as the processing from Step S108 to Step S110 in the first embodiment, the redundant description is omitted.

According to the present modification described above, the communication terminal 3 acquires the image data representing an image including the face of each participant using the communication terminal 3 by the image acquisition unit implemented by, for example, a web camera and the voice data related to the utterance of each participant using the communication terminal 3 by the voice acquisition unit implemented by, for example, a microphone, and transmits (uploads) the image data and the voice data to the information analysis apparatus 5. Accordingly, the communication terminal 3 does not need to store the acquired image data and the acquired voice data of the participant. Accordingly, participation in an online event without considering the influence on the performance and cost due to the increase of the storage unit of the communication terminal 3 can be achieved.

Third Embodiment

A third embodiment of the present disclosure is described below. In the third embodiment, with respect to the first embodiment, the second embodiment, and the modification of the above-described embodiments described above, the information analysis apparatus 5 determines whether data related to each participant participating in the online morning meeting is acquired, and determines in relation to data handling for an analysis result of each participant. Specifically, in the third embodiment, a way of data handling for the acquired data related to each participant is set in advance in accordance with content of an input operation performed on a dashboard of each participant, which is described later. Accordingly, an agreement on the data handling for the data (information) related to each of the multiple participants who participate in the predetermined that is an online event is obtained for each participant.

In the third embodiment, the hardware resources included in the communication terminal 3 and the information analysis apparatus 5 included in the information analysis system 1 are the same as those in the first embodiment, and thus the redundant description is omitted. Further, the functional configurations of the communication terminal 3 and the information analysis apparatus 5 are also substantially the same as those in the first embodiment, and the redundant description is omitted.

However, the information analysis apparatus 5 additionally includes an individual data usage management DB 5005, which is described later.

Functional Configuration of Information Analysis System

Figure 26:
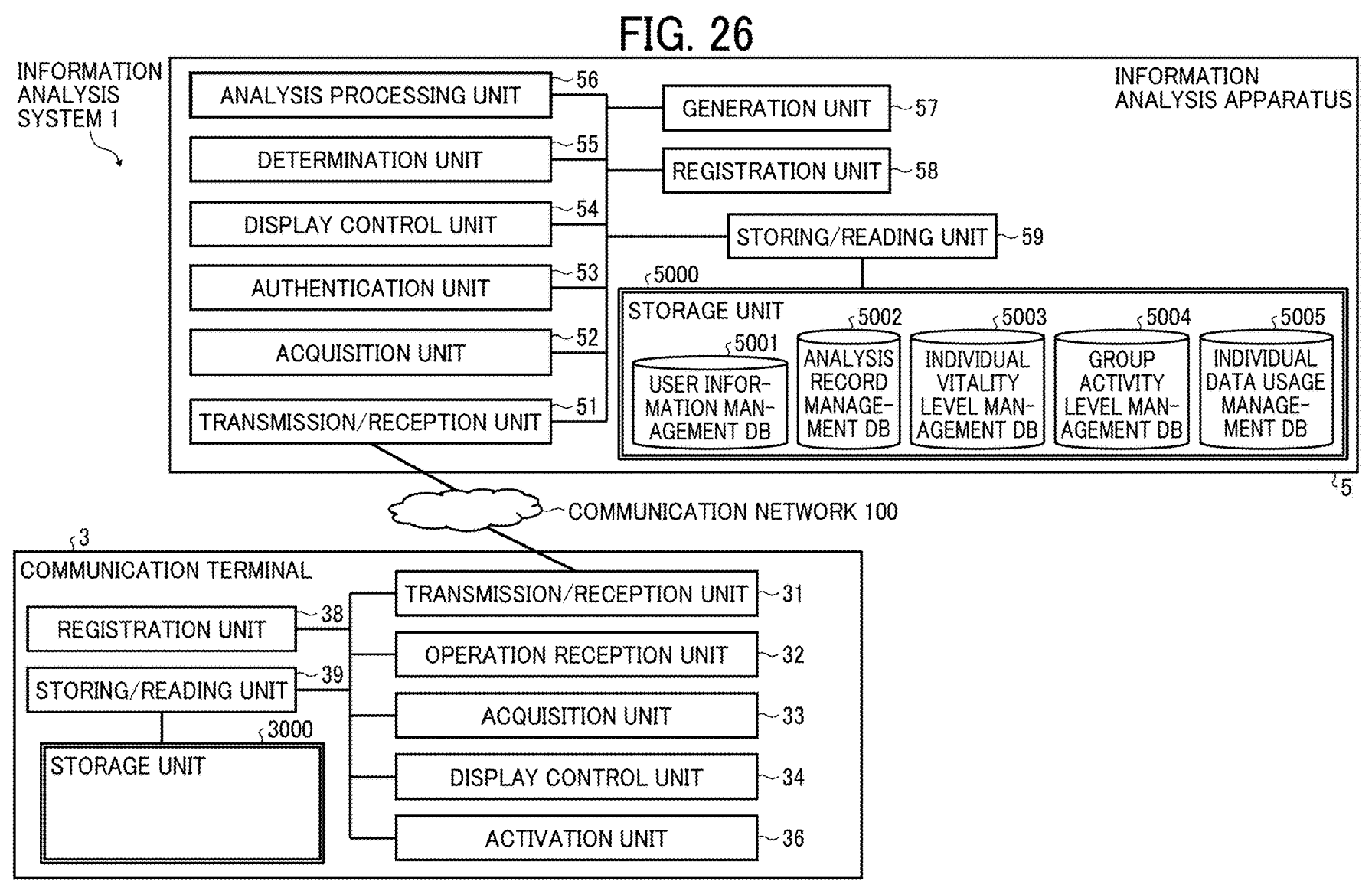

A functional configuration of the third embodiment is described with reference to FIGS. 26 and 27. FIG. 26 is a diagram illustrating a functional configuration of the information analysis system according to the third embodiment. Some functions of the communication terminal 3 and the functional configuration of the information analysis apparatus 5 are the same as the first embodiment, and the redundant description is omitted.

Functional Configuration of Communication Terminal

Among the functional units of the communication terminal 3 according to the third embodiment, the display control unit 34 causes the display 307 to display an icon for reproducing (playing) an explanatory video for informing each participant of the purpose of performing analysis on the state of the multiple participants. After the explanatory video is reproduced (played), the display control unit 34 causes the display 307 to display an acquisition permission selection component for selecting whether to permit data acquisition for analysis. The display control unit 34 may omit the display of the icon for reproducing (playing) the explanatory video described above. In this case, the communication terminal 3 may omit reproducing (playing) the explanatory video. Further, after the analysis is performed by the analysis processing unit 56, the display control unit 34 causes the display 307 to display a notification reception selection component for selecting whether to receive the notification related to an analysis result. The display control unit 34 further causes the display 307 to display a disclosure permission selection component for selecting whether to permit disclosure of the analysis result related to a certain participant to the leader (the specific participant).

Functional Configuration of Information Analysis Apparatus

In the information analysis apparatus 5 according to the third embodiment, an individual data usage management table (individual data usage management DB 5005), which is describe below, is added. The individual data usage management table is described below.

Individual Data Usage Management Table

FIG. 27 is a conceptual diagram illustrating an individual data usage management table according to the third embodiment. The structure of the data table described below is an example, and the present disclosure is not limited to this. The storage unit 5000 includes the individual data usage management DB 5005 implemented by the individual data usage management table as illustrated in FIG. 27. In the individual data usage management table, items of, for example, user ID, group (team) name, user name, permission for data acquisition, notification reception, and permission for data disclosure are stored and managed in association with each other for each tab having an event ID (or an event content).

Among the above-described items, the item of permission for data acquisition is for managing whether to permit acquisition of analysis data related to the participant who participates in the online morning meeting. The item of notification reception is for managing whether to receive a notification by, for example, an e-mail at the time of analysis completion. The item of permission for data disclosure is for managing whether to permit disclosure of an analysis result related to the participant to the leader. As described above, the individual data usage management table may be used as a data table for managing various permission/rejection information related to the participants (members) other than the leader of the predetermined event.

Regarding whether to permit data acquisition, whether to receive a notification, and whether to permit data disclosure, contents selected and input on a user setting screen displayed on the dashboard of the communication terminal 3 of each participant, which is described later, are set in association with each user ID.

In the present embodiment, the individual data usage management table (individual data usage management DB 5005) serves as an individual data usage management unit.

Configuring Individual Data Usage Settings

Figure 28:
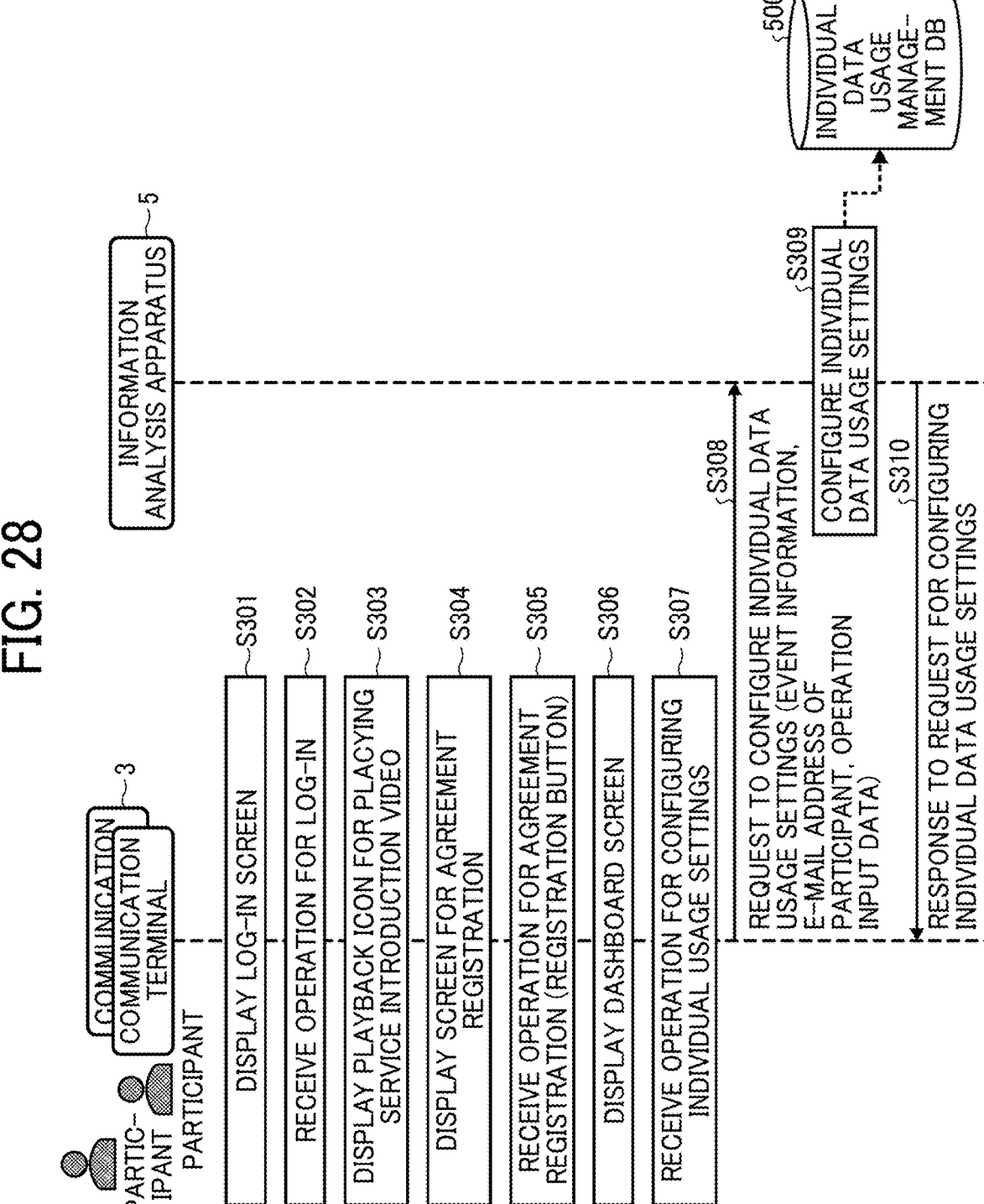
FIG. 28 is a sequence diagram illustrating a process for configuring individual data usage settings according to the third embodiment of the disclosure.

Configuring individual data usage is described below. FIG. 28 is a sequence diagram illustrating a process for configuring individual data usage settings according to the third embodiment. As illustrated in FIG. 28, the user (participant in the online morning meeting) using the information analysis system 1 activates a web browser by accessing an online meeting application or a predetermined URL using the communication terminal 3. Accordingly, the display control unit 34 of the communication terminal 3 displays a login (sign-in) screen on the display 307 of the communication terminal 3 (Step S301).

Subsequently, a login (sign-in) operation is performed by the participant of the online morning meeting. Accordingly, the operation reception unit 32 receives the login (sign-in) operation performed by the participant (Step S302).

Screen Display

Figure 29:
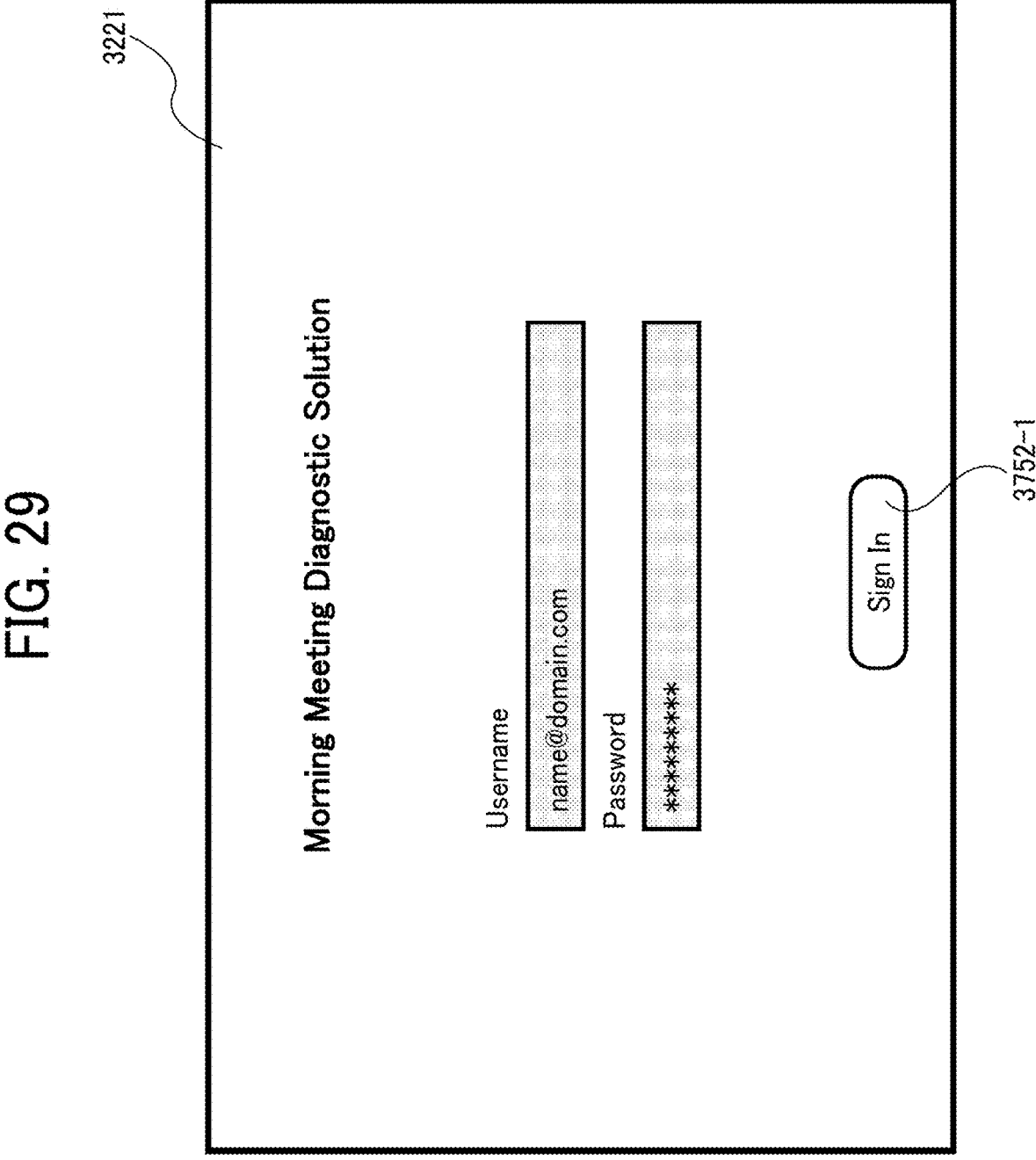
FIG. 29 is a diagram illustrating a sign-in screen displayed on a communication terminal according to the third embodiment of the disclosure.

A display screen on the communication terminal 3 is described below. FIG. 29 is a diagram illustrating a sign-in screen displayed on the communication terminal according to the third embodiment. The display control unit 34 of the communication terminal 3 displays a sign-in screen 3221 as illustrated in FIG. 29 on the display 307 of the communication terminal 3. On the sign-in screen 3221, a title indicating a morning meeting diagnostic solution that is activated in Step S301, input fields for inputting a user name and a password, and a sign-in button 3752-1 for executing sign-in are displayed. Accordingly, each participant who is scheduled to participate in the online morning meeting can sign in using the corresponding communication terminal 3.

Referring back to FIG. 28, the display control unit 34 displays a playback icon for playing a service introduction video (Step S303). Specifically, the display control unit 34 causes the display 307 to display a screen including the playback icon for playing a service introduction video.

Screen Display

Figure 30:
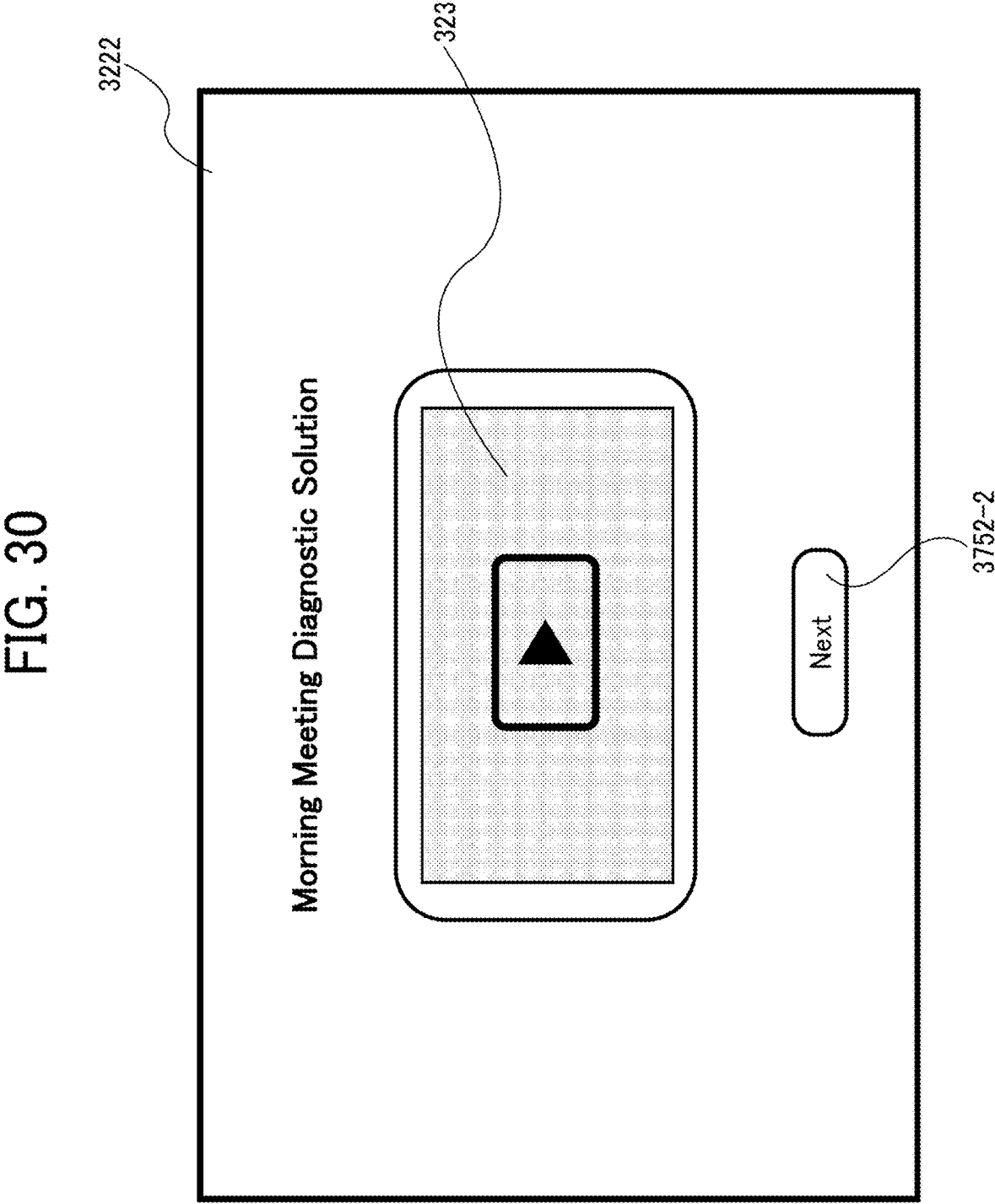
FIG. 30 is a diagram illustrating a video playback screen displayed on the communication terminal according to the third embodiment of the disclosure.

FIG. 30 is a diagram illustrating a video playback screen displayed on the communication terminal according to the third embodiment. The display control unit 34 of the communication terminal 3 displays a service introduction screen 3222 as illustrated in FIG. 30 on the display 307 of the communication terminal 3. On the service introduction screen 3222, the title indicating the morning meeting diagnostic solution that is activated in Step S301 and a playback icon (right-pointing triangle mark in a square) 3231 for playing the service introduction video are displayed.

The service introduction video is, for example, a video for informing each participant of the purpose of analyzing the state of the multiple participants. The provision by video is one of the solution methods in consideration of a user (participant) who agrees with an agreement statement that is provided by text and that includes various kinds of information related to a service, a caution in use, software use permission, without reading the agreement statement to the end. Accordingly, each participant who is scheduled to participate in the online morning meeting can operate the playback icon 3231 to play the video, and can operate a "next" button 3752-2 to transition to another screen at a time point when viewing of the video is finished.

Referring back to FIG. 28, the display control unit 34 displays a screen for agreement registration (Step S304). Specifically, the display control unit 34 causes the display 307 to display a registration screen related to confirmation and agreement.

Screen Display

FIG. 31 is a diagram illustrating a registration screen related to confirmation and agreement displayed on the communication terminal according to the third embodiment. The display control unit 34 of the communication terminal 3 displays a confirmation agreement registration screen 3223 as illustrated in FIG. 31 on the display 307 of the communication terminal 3. On the confirmation agreement registration screen 3223, the title indicating the morning meeting diagnostic solution that is activated in Step S301, user information of the participant (the name of the company to which the participant belongs, the last name, and the first name), a check box for checking that the caution in use has been confirmed (checked), and a check box for checking that the software user license agreement has been accepted are displayed. This allows each participant who is scheduled to participate in the online morning meeting to register that he or she has confirmed, or checked, the caution in use and agreed to the software user license agreement, by operating a "register" button 3752-3 in the information analysis apparatus 5.

Referring back to FIG. 28, the operation reception unit 32 receives an operation for agreement registration (Step S305). Specifically, the operation reception unit 32 receives an input of the user information, a check input indicating that the caution in use is confirmed, or checked, a check input indicating that the software user license agreement is agreed, and an operation on the "register" button 3752-3 on the confirmation agreement registration screen 3223 illustrated in FIG. 31.

Subsequently, the display control unit 34 causes the display 307 to display a dashboard screen (Step S306). Specifically, when the "register" button 3752-3 is operated in Step S305 described above, the display control unit 34 causes the display 307 of the communication terminal 3 of the participant to display the dashboard screen of the participant.

Screen Display

FIG. 32 is a diagram illustrating a user setting screen displayed on the communication terminal according to the third embodiment. The display control unit 34 of the communication terminal 3 displays a dashboard screen 3311 as illustrated in FIG. 32 on the display 307 of the communication terminal 3. On the dashboard screen 3311, a menu tab (Report, Schedule, Settings, Sign Out) including the name of the participant and a setting screen corresponding to the menu tab are displayed. On the dashboard screen 3311 illustrated in FIG. 32, regarding "Settings" in the menu tab, a region in which a team name is selectable by a pull-down key is displayed.

Further, for each member, a sliding switching button for setting to permit data acquisition, a sliding switching button for setting to receive a notification by e-mail at the time of completion of analysis, and a sliding switching button for setting to permit disclosure of an analysis result of the member to the leader are displayed.

The initial state of each selection button is ON ("permit" or "receive" in the permission/rejection selection). Accordingly, for the predetermined event such as an online morning meeting, each participant can freely select whether to permit data acquisition, whether to accept reception of a notification, and whether to permit disclosure of an analysis result to the leader, depending on, for example, his or her physical condition or mental status on the day.

Referring back to FIG. 28, the operation reception unit 32 receives an operation for configuring the individual usage settings (Step S307). Specifically, the operation reception unit 32 receives a selection input of permission or rejection of acquisition of data, a selection input of permission or rejection of notification reception, and a selection input of permission or rejection of disclosure of an analysis result on the dashboard screen 3311 illustrated in FIG. 32.

Subsequently, the transmission/reception unit 31 transmits a request to configure the individual data usage settings to the information analysis apparatus 5 (Step S308). Accordingly, the transmission/reception unit 51 of the information analysis apparatus 5 receives the request to configure the individual data usage settings transmitted from the communication terminal 3. At this time, the request to configure the individual data usage settings includes event information such as an event ID or an event name, an e-mail address of each participant, and operation input data input by each participant on the dashboard screen 3311.

Subsequently, the analysis processing unit 56 of the information analysis apparatus 5 configures the individual data usage settings (Step S309). Specifically, the analysis processing unit 56 sets to the corresponding items managed in the individual data usage management DB 5005 (see FIG. 27) with the information included in the request to configure the individual data usage settings received in Step 308, via the storing/reading unit 59. More specifically, the analysis processing unit 56 sets the event information such as an event ID or an event name, an e-mail address of each participant, and operation input information (permission/rejection of data acquisition, reception of notification, permission/rejection of data disclosure) to the corresponding items of the individual data usage management DB 5005.

Subsequently, the transmission/reception unit 51 transmits a response to the request for configuring the individual data usage settings received in Step S308 to the communication terminal 3 (Step S310). Accordingly, the transmission/reception unit 31 of the communication terminal 3 receives the response in relation to the individual data usage settings transmitted from the information analysis apparatus 5. At this time, the response in relation to the individual data usage settings may include a message or a flag indicating that configuring the individual data usage settings is completed.

The communication terminal 3 in the process for configuring the individual data usage settings illustrated in FIG. 28 is corresponding to each communication terminal used by the corresponding participant who participates in the predetermined event such as an online morning meeting. In other words, the processing from the Step S301 to the Step S310 described above is performed individually by each communication terminal 3.

Information Analysis Process in Online Event

Figure 33:
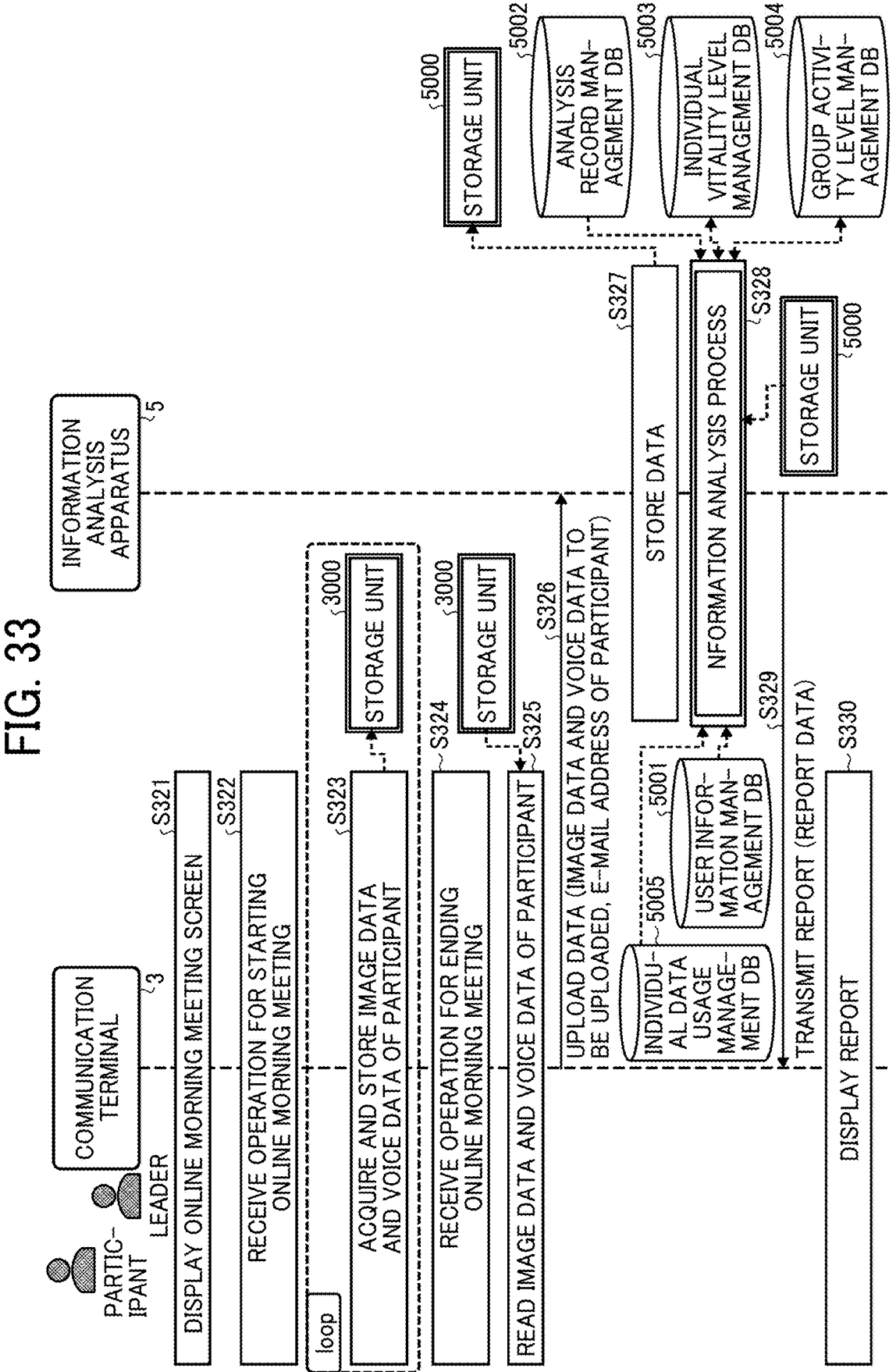
FIG. 33 is a sequence diagram illustrating an information analysis process in an online event according to the third embodiment of the disclosure.

An information analysis process in an online event is described below. FIG. 33 is a sequence diagram illustrating an information analysis process in an online event according to the third embodiment. Since processing of S321 to S330 in FIG. 33 is substantially the same as the processing of S101 to S110 in FIG. 12, the redundant description thereof is omitted. However, in the third embodiment, reading information on the individual data usage settings set to the individual data usage management DB 5005 (see FIG. 27) in Step S309 described above and generating a notification screen according to the result are added to the processing of Step S328.

Details of Information Analysis Process

Figure 34A:
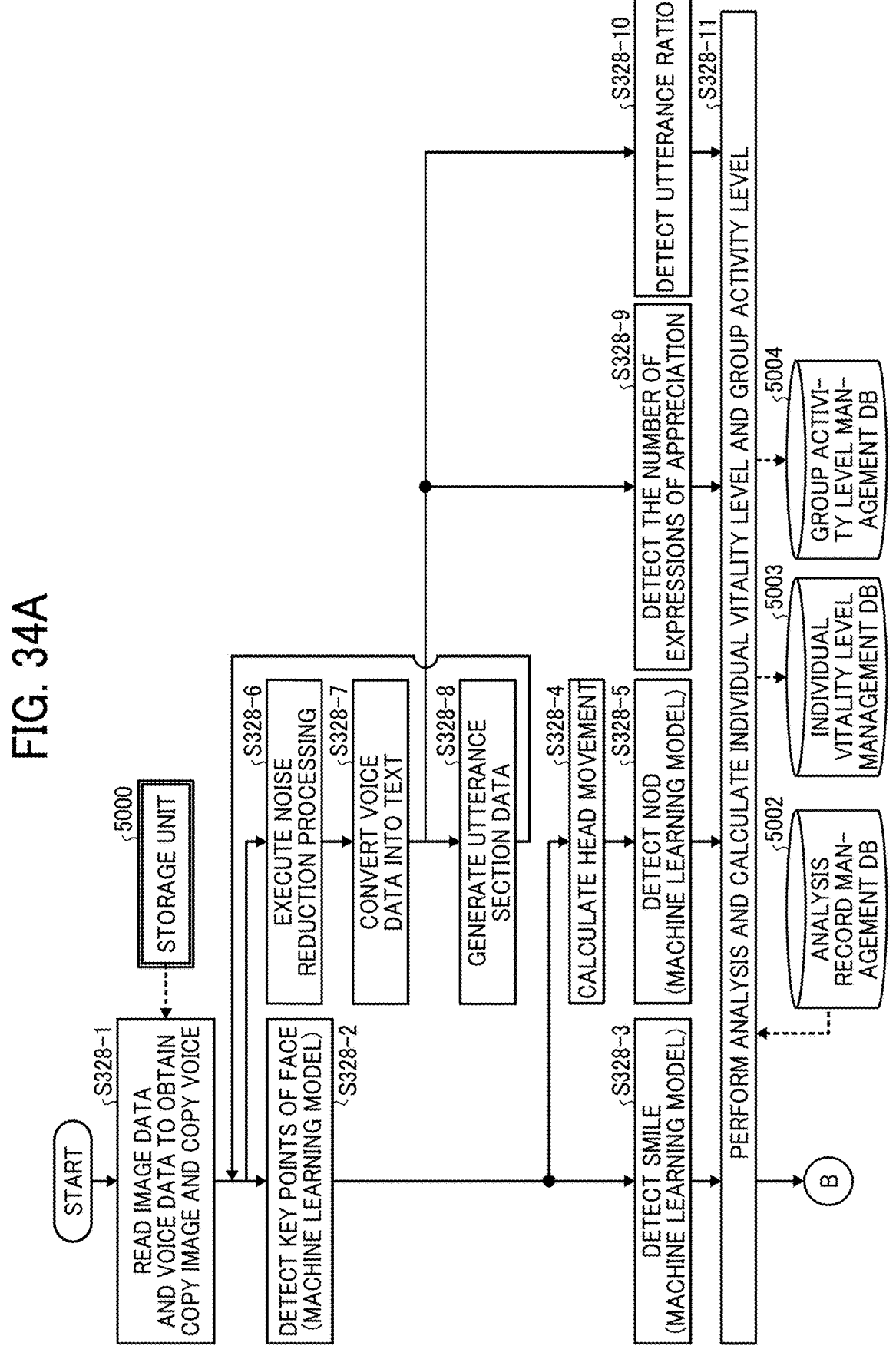
FIG. 34A is a flowchart illustrating details of information analysis process in an online event according to the third embodiment of the disclosure.
Figure 34B:
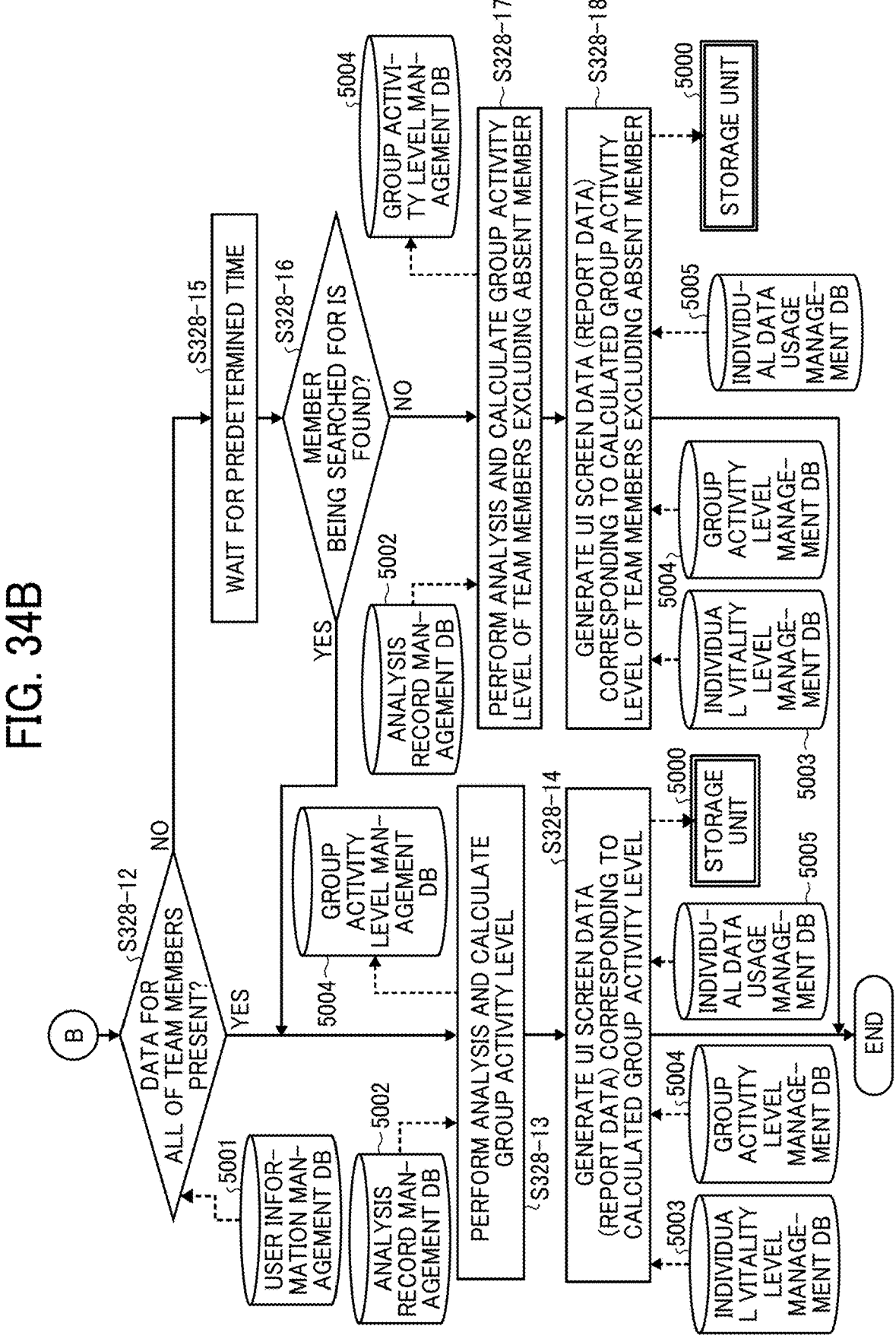
FIG. 34B is a flowchart illustrating details of information analysis process in an online event according to the third embodiment of the disclosure.

Details of the information analysis process are described below. FIG. 34A and FIG. 34B are flowcharts illustrating details of information analysis process in an online event according to the third embodiment. Processing of Steps 328-1 to S328-11 illustrated in FIG. 34A is substantially the same as the processing of Steps S108-1 to S108-11 illustrated in FIG. 14A, and thus the redundant description is omitted.

FIG. 34B is a flowchart illustrating details of information analysis process in an online event according to the third embodiment. Processing of Steps S328-12 to S328-18 illustrated in FIG. 34B is substantially the same as the processing of Steps S108-12 to S108-18 illustrated in FIG. 14A except for Steps S308-14 and S308-18. Accordingly, the detailed (redundant) description is omitted. The processing of Steps S308-14 and the processing of S308-18 are separately described in detail.

Generation of Report Data

Figure 35:
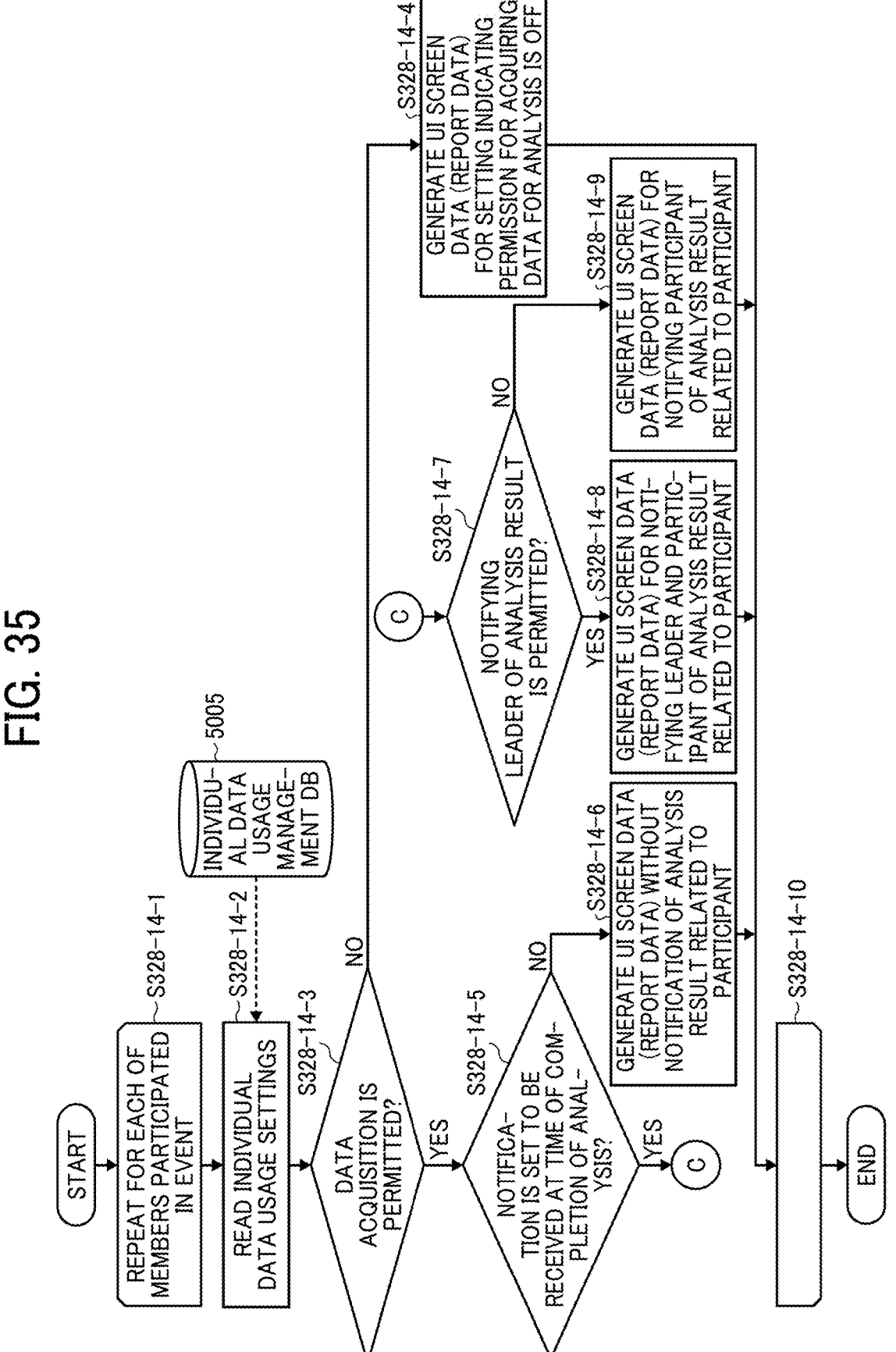
FIG. 35 is a flowchart illustrating details of a process of generating report data according to the third embodiment of the disclosure.

FIG. 35 is a flowchart illustrating details of a process of generating report data according to the third embodiment. The processing steps described below are an example of the information analysis process and are not limited thereto in the third embodiment. As illustrated in FIG. 35, the information analysis apparatus 5 repeatedly executes the processing of the following Steps S328-14-1 to S328-14-10 for all the participants who have participated in the event as the detailed processing related to Step S328-13 illustrated in the FIG. 34B.

The same applies to the detailed process related to Step S328-18 in which there is an absent member. The details of Step S328-14 are described below.

Subsequently, the storing/reading unit 59 reads the usage settings for each individual data (Step S328-14-2). Specifically, the storing/reading unit 59 searches the individual data usage management DB 5005 (see FIG. 27) using the user ID (e-mail address) of the participant who has participated in the event as a search key, thereby reading the pieces of information of permission/rejection of data acquisition, reception of notification, and permission/rejection of data disclosure as the corresponding information for each of the participants.

Subsequently, the determination unit 55 determines whether data acquisition is permitted (Step S328-14-3). Specifically, the determination unit 55 determines whether permission (permitted) (ON) is set for the item of data acquisition permission/rejection in the information relating to a certain participant read in Step S328-14-2 via the storing/reading unit 59.

when the determination indicates that the data acquisition is not permitted (Step S328-14-3: NO), the generation unit 57 generates UI screen data (report data) that does not permit acquisition of the analysis result of the corresponding participant (Step S328-14-4), and then the process proceeds to the processing for another participant via Step S328-14-10.

On the other hand, when the determination indicates that data acquisition is permitted (Step S328-14-3: YES), the determination unit 55 further determines whether a notification is set to be received when analysis is completed (Step S328-14-5). Specifically, the determination unit 55 determines whether reception (ON) is set for the item of notification reception in the information relating to the certain participant read in Step S328-14-2 via the storing/reading unit 59.

When the determination indicates that the notification is not set to be received at the time of completion of the analysis (Step S328-14-5: NO), the generation unit 57 generates a UI screen data (report data) without notification of the analysis result related to the corresponding participant (Step S328-14-6), and then the process proceeds to the processing for another participant via Step S328-14-10.

On the other hand, when the determination indicates that the notification is set to be received when the analysis is completed (Step S328-14-5: YES), the determination unit 55 further determines whether disclosure of the analysis result to the leader is permitted via "circle C" (Step S328-14-7).

Specifically, the determination unit 55 determines whether permission (permitted) (ON) is set to the item of data disclosure permission/rejection in the information relating to the certain participant read in Step S328-14-2 via the storing/reading unit 59.

When the determination indicates that the notification of the analysis result to the leader is permitted (Step S328-14-7: YES), the generation unit 57 generates a UI screen data (report data) for notifying the corresponding participant and the leader of the analysis result of the corresponding participant (Step S328-14-8), and then the process proceeds to the processing for another participant via Step S328-14-10.

On the other hand, when the determination indicates that the disclosure of the analysis result to the leader is not permitted (Step S328-14-7: NO), the generation unit 57 generates a UI screen data (report data) for notifying the corresponding participant alone of the analysis result of the corresponding participant (Step S328-14-9), and then the process proceeds to the processing for another participant via Step S328-14-10.

In this way, the information analysis apparatus 5 executes the processing of Steps S328-14-1 to the processing of S328-14-10 described above for each participant. As a result, the information analysis apparatus 5 repeats the same processing for all participants who has participated in the predetermined event such as an online morning meeting, except for the leader, and provides an analysis result to each participant or the leader according to the information input and set by each participant.

In the process illustrated in the flowchart of FIG. 35, a combination of determinations and an order of processing steps other than the above-described combination of determinations and the order of processing steps may be applied. This also applies to the detailed process (subroutine) in Step S328-16 illustrated in FIG. 34B.

Further, in the present embodiment, the flowchart of FIG. 35 may be executed before Step S328-1 illustrated in FIG. 34A. As a result, based on the information input by each participant in FIG. 32, data acquisition processing for a user who does not permit data acquisition does not need to be performed from the initial stage.

Referring back to FIG. 33, after the processing of Step S329, the display control unit 34 of the communication terminal 3 displays a report (Step S330). Specifically, the display control unit 34 of the communication terminal 3 displays the report data related to the participant transmitted from the information analysis apparatus 5 on the display 307.

Screen Display

Figure 36:
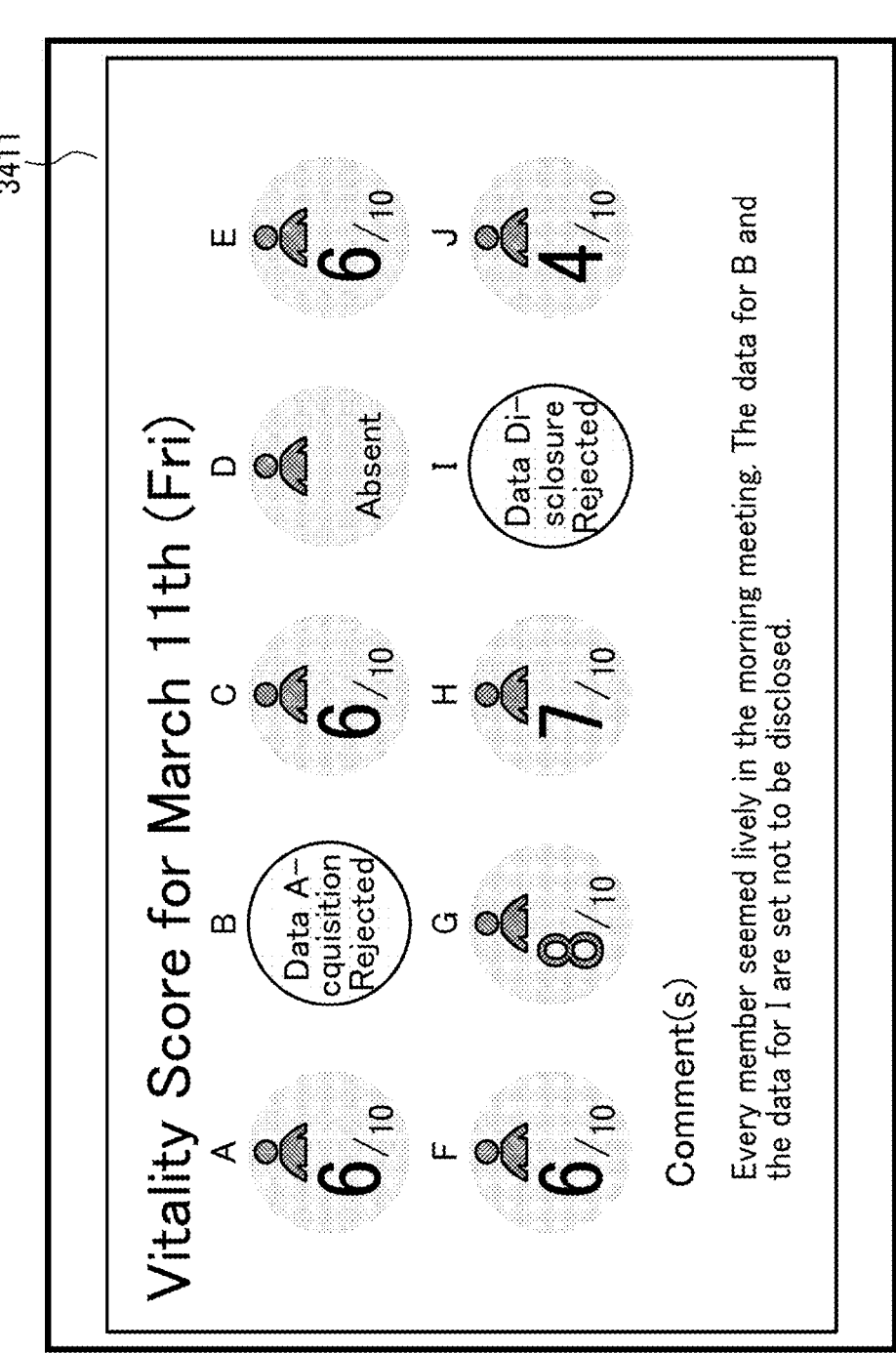
FIG. 36 is a diagram illustrating a report display screen (vitality score) displayed on the communication terminal according to the third embodiment of the disclosure.

FIG. 36 is a diagram illustrating a report display screen (vitality score) displayed on the communication terminal according to the third embodiment. The display control unit 34 of the communication terminal 3 displays a vitality score screen 3411 as illustrated in FIG. 36 on the display 307 of the communication terminal 3. The vitality score screen 3411 is different from the vitality score screen 3131 according to the first embodiment in that the analysis result of the participant B who has set not to permit for data acquisition and the analysis result of the participant I who has set not to permit for disclosure of his or her analysis result to the leader are not displayed. As for the non-display mode, for example, when the data acquisition is set not to be permitted, "Data Acquisition Rejected" may be displayed on the icon of the participant. Further, in a case where data disclosure of the own analysis result to the leader is set not to be permitted, "Data Disclosure Rejected" may be displayed on the icon of the participant. Further, a comment indicating that the data of the participant B and the participant I are not disclosed may be added to the comment as a summarized evaluation. As a result, the privacy of the participant B and the participant I in the online morning meeting is protected, and the leader of the group (team) that has received the report can recognize that the participants B and I do not want to permit data acquisition and data disclosure of the analysis result in relation to the online morning meeting this time.

According to the third embodiment described above, a participant who participates in the predetermined event such as an online morning meeting is confirmed his or her intention in advance, and an analysis result according to a confirmation result (setting content) is disclosed or notified to a permitted person alone. Accordingly, an agreement on data handling for the data (information) related to each of the multiple participants who participate in the predetermined event such as an online morning meeting is obtained for each participant.

Each of the functions according to the described embodiment can be implemented by one or more processing circuits or circuitry. The "processing circuit or circuitry" in the present disclosure includes a device programmed to execute each function by software, such as a processor implemented by an electronic circuit. The device may be, for example, a processor, an application specific integrated circuit (ASIC) designed to perform the functions described above, a digital signal processor (DSP), a field programmable gate array (FPGA), a system on a chip (SOC), a graphics processing unit (GPU), or a conventional circuit module.

Although the information analysis system, the information analysis apparatus, the information analysis method, and the program according to some embodiments of the present disclosure have been described above, the present disclosure is not limited to the above-described embodiments. Within a range conceivable by those skilled in the art, another embodiment may be added, or elements may be added, changed, or omitted. Any of such aspects that provides an action and an effect of the present disclosure is within the scope of the present disclosure.

Aspects of the present disclosure are, for example, as follows.

Aspect 1

An information analysis system 1 (serves as an information analysis system) according to Aspect 1 includes the communication terminal 3 (serves as a communication terminal) configured to acquire information on multiple participants who participate in a predetermined event held online and the information analysis apparatus 5 (serves as an information analysis apparatus) to perform analysis of information transmitted from the communication terminal. The communication terminal 3 includes the acquisition unit 33 (serves as an acquisition unit) to acquire image information and voice information of the multiple participants and the transmission/reception unit 31 to transmit the acquired image information and the acquired voice information to the information analysis apparatus 5. The information analysis apparatus 5 includes an analysis processing unit 56 (serves as an analysis unit) to perform analysis on a state of the multiple participants based on the image information and the voice information transmitted from the communication terminal 3, and the generation unit 57 (serves as a generation unit) to generate a state notification that can be displayed on the communication terminal 3, based on the analyzed state of the multiple participants.

According to Aspect 1, even in an online event, the state of the participants can be grasped based on not only utter-ance but also facial expression of the participants and information obtained based on the utterance and the facial expression can be utilized.

Aspect 2

In the information analysis system 1 according to Aspect 1, the image information includes at least one of information related to nodding or information related to smiling included in an image of each of the multiple participants. The image is obtained during the predetermined event. In the information analysis system 1 according to Aspect 1, the voice information represents information related to utterance of each of the multiple participants in the predetermined event. The analysis processing unit 56 of the information analysis apparatus 5 performs analysis on the state of the multiple participants based on at least one of the information related to the nodding of each of the multiple participants and the information related to the smiling of each of the multiple participants and the information related to the utterance of each of the multiple participants.

According to Aspect 2, it is possible to provide information that gives a positive effect, such as sympathy to each participant and sense of security to another member that are obtained from at least one of the information related to the nodding of the participant and the information related to the smiling of the participant.

Aspect 3

In the information analysis system 1 according to Aspect 2, the analysis processing unit 56 of the information analysis apparatus 5 further analysis on the state of the multiple participants by performing analysis using the machine learning model on at least one of the information related to the nodding and the information related to the smiling.

According to Aspect 3, it is possible to obtain an analysis result with high accuracy by using a pre-trained learning model.

Aspect 4

In the information analysis system 1 according to any one of Aspect 1 to Aspect 3, the analysis processing unit 56 of the information analysis apparatus 5 performs analysis on the state of the multiple participants based on either the image information and the voice information transmitted by the communication terminal 3 used by a specific participant among the multiple participants or the image information and the voice information transmitted by the communication terminal 3 used by each of the multiple participants.

According to Aspect 4, it is possible to increase variations in the form of providing (uploading) the image information and the voice information of the participant.

Aspect 5

In the information analysis system 1 according to any one of Aspect 2 and Aspect 3, the state of the participants includes a facial expression state detected for each of the multiple participants based on at least one of the number of nods and the number of smiles of the corresponding participant, and a state of an activity level of all of the multiple participants based on the facial expression state detected for each of the multiple participants.

According to Aspect 5, not only an indicator for an individual participant but also a group activity level of a group (team) to which each participant belongs can be provided.

Aspect 6

In the information analysis system 1 according to Aspect 5, the generation unit 57 generates, as a state notification, a chart (for example, in a graph format or a table format) as a result of visually representing the facial expression state detected for each of the multiple participants and the state of the activity level, and a comment on the result to a specific participant among the multiple participants.

According to Aspect 6, the visibility of the group activity level can be enhanced.

Aspect 7

In the information analysis system 1 according to any one of Aspect 1 to Aspect 6, the information analysis apparatus 5 includes the registration unit 58 (serving as a registration unit to register, as participant information for the predetermined event, image information (face image data) of the multiple participants who are participate in the predetermined event and an email address of each participant to the user information management DB 5001 (serving as a user information management unit) in advance before the predetermined event is carried out.

According to Aspect 7, the confidentiality of information in the organization can be maintained by limiting calculation and provision of the individual vitality level and the group activity level to the registered members.

Aspect 8

In the information analysis system 1 according to any one of Aspect 1 to Aspect 7, the information analysis apparatus 5 further includes the transmission/reception unit 51 (serves as a second transmission unit) to transmit the generated state information to the communication terminal 3 (serves as a communication terminal) that can acquire information on the multiple participants participating in the predetermined online event.

According to Aspect 8, by transmitting, to the communication terminal of the participant who participated in the online event, feedback related to the participant, the participant can confirm the feedback.

Aspect 9

In the information analysis system 1 according to any one of Aspect 1 to Aspect 8, the communication terminal 3 further includes a display control unit 34 (serves as a display control unit) to display on the display 307 (serves as a display unit) the state notification transmitted from the information analysis apparatus 5.

According to Aspect 9, the confidentiality of personal information can be ensured by displaying feedback to the participant who has participated in the online event on the communication terminal of the participant.

Aspect 10

The information analysis apparatus 5 configured to perform analysis of information on multiple participants who participate in a predetermined online event includes the analysis processing unit 56 (serves as an analysis unit) to perform analysis on a state of the multiple participants based on image information and voice information transmitted from a communication terminal capable of acquiring the information on the multiple participants who participate in the predetermined online event, and the generation unit 57 (serves as a generation unit) to generate a state notification that can be displayed on the communication terminal 3 based on the analyzed state of the multiple participants.

According to Aspect 10, as well as Aspect 1, even in an online event, the state of the participants can be grasped based on not only utterance but also facial expression of the participants and information obtained based on the utterance and the facial expression can be utilized.

Aspect 11

An information analysis method performed by an information analysis apparatus 5 configured to perform analysis of information on multiple participants who participate in a predetermined online event includes performing analysis on a state of the multiple participants based on image information and voice information transmitted from the communication terminal 3 capable of acquiring the information on the multiple participants who participate in the predetermined online event, and generating a state notification that can be displayed on the communication terminal 3 based on the analyzed state of the multiple participants.

According to Aspect 11, as well as Aspect 1, even in an online event, the state of the participants can be grasped based on not only utterance but also facial expression of the participants and information obtained based on the utterance and the facial expression can be utilized.

Aspect 12

A program which, when executed by the information analysis apparatus 5 configured to perform analysis of information on multiple participants who participate in a predetermined online event, causes the processors to perform a method. The method includes performing analysis of information on multiple participants who participate in a predetermined online event includes performing analysis on a state of the multiple participants based on image information and voice information transmitted from the communication terminal 3 capable of acquiring the information on the multiple participants who participate in the predetermined online event, and generating a state notification that can be displayed on the communication terminal 3 based on the analyzed state of the multiple participants.

According to Aspect 12, as well as Aspect 1, even in an online event, the state of the participants can be grasped based on not only utterance but also facial expression of the participants and information obtained based on the utterance and the facial expression can be utilized.

Aspect 13

In the information analysis system 1 according to Aspect 9, the display control unit 34 of the communication terminal 3 displays, on the display 307, an icon capable of reproducing an explanatory video for informing each participant of the purpose of analyzing the state of the multiple participants.

According to Aspect 13, the burden on the participant can be reduced and to understanding of the usage purpose for the participant can be increased.

Aspect 14

In the information analysis system 1 according to Aspect 13, the display control unit 34 of the communication terminal 3 displays, on the display 307, an acquisition permission selection component for selecting whether to permit data acquisition for analysis.

According to Aspect 14, the confidentiality of personal information can be ensured more reliably.

Aspect 15

In the information analysis system 1 according to Aspect 14, the display control unit 34 of the communication terminal 3 displays, on the display 307, a notification reception selection component for selecting whether to receive a notification related to an analysis result after analysis is completed by the analysis processing unit 56.

According to Aspect 15, an analysis result can be provided according to a state or a desire of a participant.

Aspect 16

In the information analysis system 1 according to Aspect 14, the display control unit 34 of the communication terminal 3 displays, on the display 307, a disclosure permission selection component for selecting whether to permit disclosure of the analysis result related to a certain participant to the leader (a specific participant).

According to Aspect 16, sharing the analysis result can be performed in a flexible manner.

In the related art, in an event using online (online event), although a state of a participant can be grasped based on utterance of the participant, it is difficult to grasp a state of the participant based on facial expression of the participant in addition to the utterance and utilize information obtained based on the utterance and the facial expression.

According to one or more embodiments, even in an online event, a state of a participant can be grasped based on not only utterance of the participant, but also facial expression of the participant, and information obtained based on the utterance and the facial expression can be utilized.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information analysis system, comprising:
a communication terminal including first circuitry; and
an information analysis apparatus including second circuitry,
the first circuitry being configured to:
acquire image information and voice information of a plurality of participants participating in an online event; and
transmit, to the information analysis apparatus, the image information and the voice information,
the second circuitry being configured to:
perform analysis on a state of the plurality of participants based on the image information and the voice information transmitted from the communication terminal; and
generate, based on the state of the plurality of participants, a state notification to be displayed on the communication terminal,
wherein the first circuitry is further configured to display, on a display, the state notification, the state notification being transmitted from the information analysis apparatus,
wherein the first circuitry is further configured to display, on the display, an icon for playing an explanatory video for informing each of the plurality of participants of a purpose of performing analysis on the state of the plurality of participants, and

wherein the first circuitry is further configured to display, on the display, an acquisition permission selection component for selecting whether to permit data acquisition for the analysis.

2. The information analysis system of claim 1, wherein the image information includes at least one of information related to nodding or information related to smiling included in an image of each of the plurality of participants, the image being obtained during the online event,
the voice information includes information related to utterance of each of the plurality of participants during the online event, and
the second circuitry is configured to perform the analysis on the state of the plurality of participants based on the information related to the utterance and at least one of the information related to the nodding or the information related to the smiling.

3. The information analysis system of claim 2, wherein the second circuitry is configured to perform the analysis on the state of the plurality of participants with a machine learning model applied to the at least one of the information related to the nodding or the information related to the smiling.

4. The information analysis system of claim 1, wherein the communication terminal includes a plurality of communication terminals communicably connected to each other, and
the second circuitry is configured to perform the analysis on the state of the plurality of participants based on the image information and the voice information transmitted from a specific one of the plurality of communication terminals used by a specific one of the plurality of participants or each of the plurality of communication terminals used by a corresponding one of the plurality of participants.

5. The information analysis system of claim 2, wherein the state of the plurality of participants includes:
a facial expression state detected for each of the plurality of participants based on at least one of a number of nods or a number of smiles; and
a state of activity level of the plurality of participants based on the facial expression state detected for each of the plurality of participants, and wherein
the second circuitry is configured to generate the state notification based on the facial expression state detected for each of the plurality of participants and the state of the activity level.

6. The information analysis system of claim 5, wherein the state notification includes at least one of a chart and a comment, the chart being a result of visually representing the facial expression state detected for each of the plurality of participants and the state of the activity level, the comment being on a result of the analysis and to a specific one of the plurality of participants.

7. The information analysis system of claim 1, wherein the second circuitry is further configured to store, in a memory, face image data of the plurality of participants who is to participate in the online event and an electronic mail address of each of the plurality of participants to register participant information for the online event in advance before the online event is carried out.

8. The information analysis system of claim 1, wherein the second circuitry is further configured to transmit the state notification to the communication terminal.

9. The information analysis system of claim 1, wherein the first circuitry is further configured to display, on the display, a notification reception selection component for selecting whether to receive a notification related to a result of the analysis after the analysis is completed.

10. The information analysis system of claim 1, wherein the first circuitry is further configured to display, on the display, a disclosure permission selection component for selecting whether to permit disclosure of a result of the analysis related to one of the plurality of participants to a specific one of the plurality of participants.

11. An information analysis method, comprising:

performing analysis on a state of a plurality of participants participating in an online event, based on image information and voice information of the plurality of participants, the image information and the voice information being transmitted from a communication terminal acquiring the image information and the voice information; and generating, based on the analyzed state of the plurality of participants, a state notification to be displayed on the communication terminal, wherein the method further comprises:

displaying, on a display, the state notification, the state notification being transmitted from the information analysis apparatus, displaying, on the display, an icon for playing an explanatory video for informing each of the plurality of participants of a purpose of performing analysis on the state of the plurality of participants, and displaying, on the display, an acquisition permission selection component for selecting whether to permit data acquisition for the analysis.

12. A non-transitory recording medium storing a plurality of instructions which, when executed by one or more processors, causes the processors to perform a method, the method comprising:

performing analysis on a state of a plurality of participants participating in an online event, based on image information and voice information of the plurality of participants, the image information and the voice information being transmitted from a communication terminal acquiring the image information and the voice information; and generating, based on the analyzed state of the plurality of participants, a state notification to be displayed on the communication terminal, wherein the method further comprises:

displaying, on a display, the state notification, the state notification being transmitted from the information analysis apparatus, displaying, on the display, an icon for playing an explanatory video for informing each of the plurality of participants of a purpose of performing analysis on the state of the plurality of participants, and displaying, on the display, an acquisition permission selection component for selecting whether to permit data acquisition for the analysis.

* * * * *